US006295300B1

(12) United States Patent
Oyama

(10) Patent No.: US 6,295,300 B1
(45) Date of Patent: Sep. 25, 2001

(54) CIRCUIT AND METHOD FOR SYMMETRIC ASYNCHRONOUS INTERFACE

(75) Inventor: Koji Oyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/362,759

(22) Filed: Jul. 28, 1999

(30) Foreign Application Priority Data

Jul. 30, 1998 (JP) .................................................. 10-215796

(51) Int. Cl.[7] .......................................................... H04J 3/06
(52) U.S. Cl. ............................................................. 370/503
(58) Field of Search .................................... 370/503, 298, 370/521; 375/354–357, 220–222, 377; 712/200–209, 220

(56) References Cited

U.S. PATENT DOCUMENTS 5,602,878 * 2/1997 Cross ................................... 370/503

FOREIGN PATENT DOCUMENTS

| 1-84155 | 6/1989 | (JP) . |
| 3-176757 | 7/1991 | (JP) . |
| 4-33043 | 2/1992 | (JP) . |
| 10-69458 | 3/1998 | (JP) . |

* cited by examiner

Primary Examiner—Wellington Chin
Assistant Examiner—Prenell Jones
(74) Attorney, Agent, or Firm—Ostrolenk, Faber, Gerb & Soffen, LLP

(57) ABSTRACT

A symmetric asynchronous interface circuit for interfacing between two asynchronously operating devices has a first and third synchronization circuits for synchronizing a READY signal outputted by a transmitting device to a clock signal on the side of a receiving device and outputting the synchronized READY signal to the receiving device, first and second delay circuits for delaying a signal corresponding to the synchronized READY signal outputted by the first/third synchronization circuit and outputting the delayed signal as an ACKNOWLEDGE signal, second and fourth synchronization circuits for synchronizing the ACKNOWLEDGE signal outputted by the first/second delay circuit to a clock signal on the side of the transmitting device, and first and second pulse generation circuits for generating a pulse signal when the synchronized ACKNOWLEDGE signal is supplied from the second/fourth synchronization circuit and outputting the pulse signal to the transmitting device as an ACKNOWLEDGE signal.

42 Claims, 36 Drawing Sheets

RD11: READY SIGNAL (IN SYNC WITH CK1)
RD12: READY SIGNAL (IN SYNC WITH CK2)
AC12: ACKNOWLEDGE SIGNAL (IN SYNC WITH CK1)

RD21: READY SIGNAL (IN SYNC WITH CK2)
RD22: READY SIGNAL (IN SYNC WITH CK1)
AC22: ACKNOWLEDGE SIGNAL (IN SYNC WITH CK2)

RD11: READY SIGNAL (IN SYNC WITH CK1)
RD12: READY SIGNAL (IN SYNC WITH CK2)
AC12: ACKNOWLEDGE SIGNAL (IN SYNC WITH CK1)

RD21: READY SIGNAL (IN SYNC WITH CK2)
RD22: READY SIGNAL (IN SYNC WITH CK1)
AC22: ACKNOWLEDGE SIGNAL (IN SYNC WITH CK2)

RD11: READY SIGNAL (IN SYNC WITH CK1)
AC11: ACKNOWLEDGE SIGNAL (IN SYNC WITH CK2)

RD21: READY SIGNAL (IN SYNC WITH CK2)
AC21: ACKNOWLEDGE SIGNAL (IN SYNC WITH CK1)

RD11: READY SIGNAL (IN SYNC WITH CK1)
AC11: ACKNOWLEDGE SIGNAL (IN SYNC WITH CK2)

RD21: READY SIGNAL (IN SYNC WITH CK2)
AC21: ACKNOWLEDGE SIGNAL (IN SYNC WITH CK1)

RD12: READY SIGNAL (IN SYNC WITH CK2)
RD21: READY SIGNAL (IN SYNC WITH CK2)
AC22: ACKNOWLEDGE SIGNAL (IN SYNC WITH CK2)

RD12: READY SIGNAL (IN SYNC WITH CK2)
RD21: READY SIGNAL (IN SYNC WITH CK2)
AC22: ACKNOWLEDGE SIGNAL (IN SYNC WITH CK2)

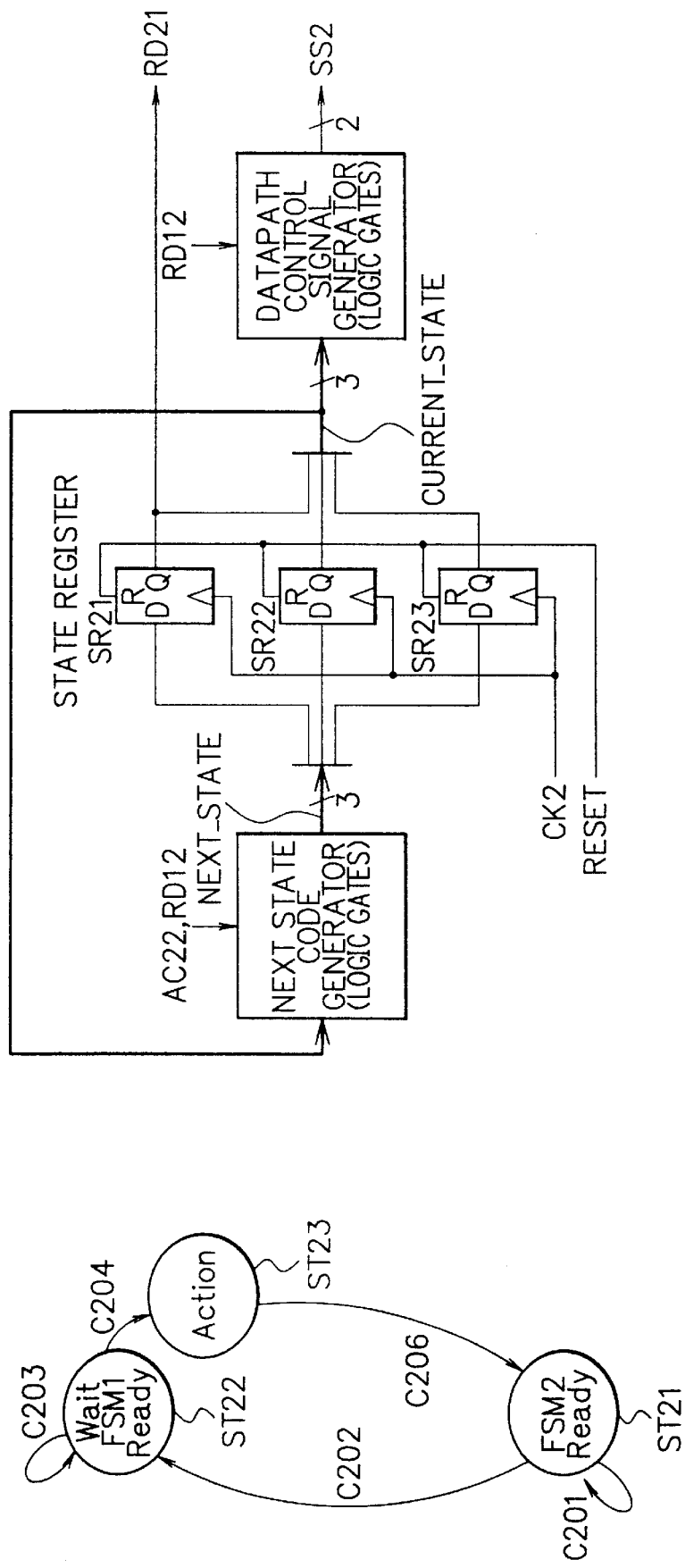
F I G. 22

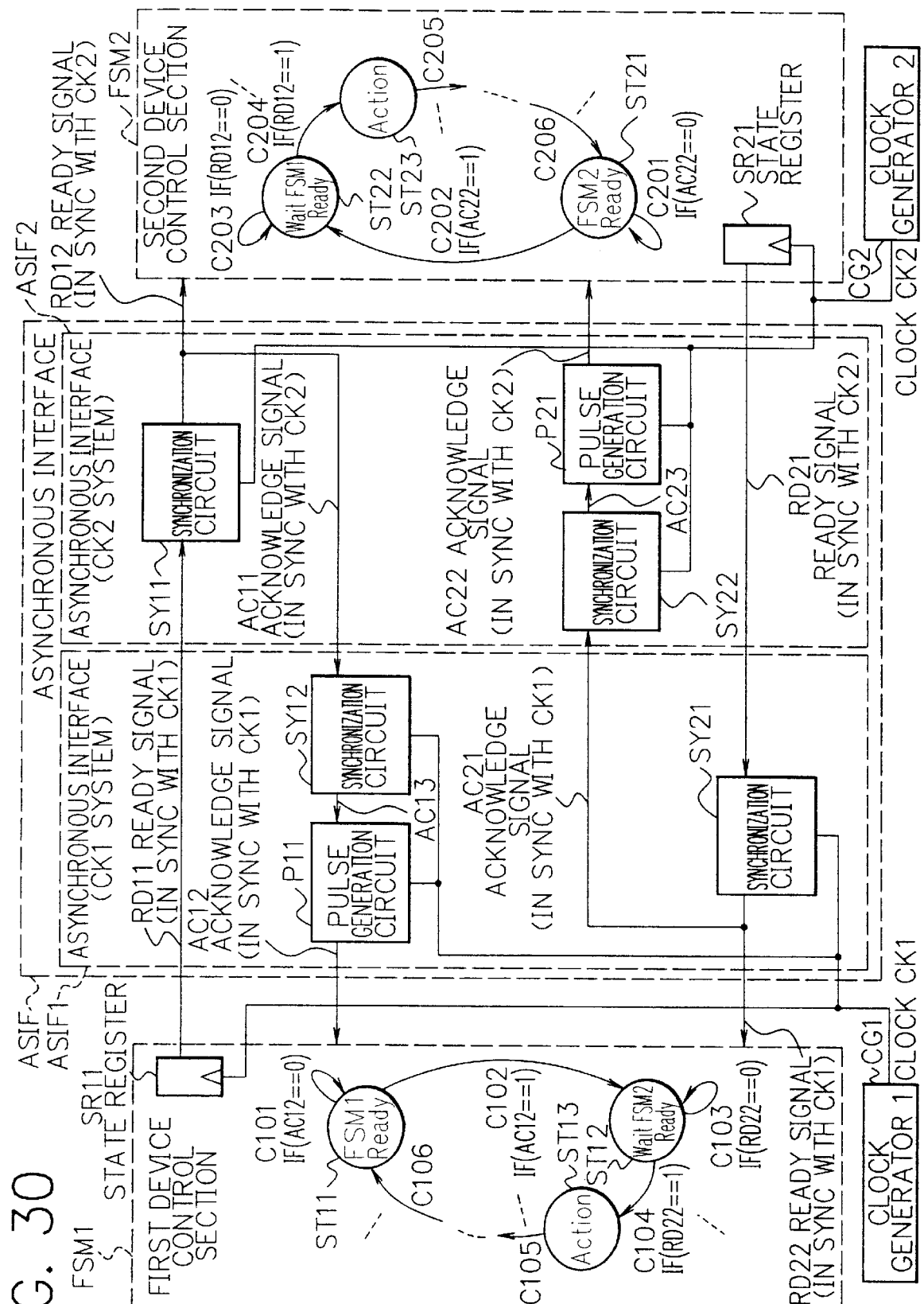
F I G. 30

CIRCUIT AND METHOD FOR SYMMETRIC ASYNCHRONOUS INTERFACE

BACKGROUND OF THE INVENTION

The present invention relates to a symmetric asynchronous interface circuit and a symmetric asynchronous interface method for executing handshaking procedure between two variable-clock devices which operate asynchronously.

DESCRIPTION OF THE PRIOR ART

Symmetric asynchronous interface circuits have been used for executing handshaking procedure between two devices which operate asynchronously. The term "asynchronous" means that the two devices connected by the interface circuit operate in sync with two different (independent) clock systems respectively. The term "symmetric" means that the interface circuit has a symmetric circuit composition so as to handle cases of both frequency relationships: (clock frequency 1)≦(clock frequency 2) and (clock frequency 1)>(clock frequency 2).

FIG. 1 shows a first example of a conventional symmetric asynchronous interface circuit, and FIG. 2 shows the relationship between the clock frequency ratio and the overhead time ratio in the first conventional symmetric asynchronous interface circuit of FIG. 1. The "clock frequency ratio" means a ratio between two clock frequencies of the two devices which are connected by the symmetric asynchronous interface circuit, and the "overhead time ratio" means the ratio of overhead time to the total time in the case where the first conventional symmetric asynchronous interface circuit of FIG. 1 is employed. The "overhead time" means time necessary for executing the handshaking procedure between the two devices.

The first conventional symmetric asynchronous interface circuit shown in FIG. 1 is a two-line interface circuit for handshaking READY signals (which are used for indicating completion of a basic operation such as an arithmetic logic operation, data preparation, etc.) between two devices. The two lines connect a first device control section FSM1 (Finite State Machine 1: a control section of a first device #1) and a second device control section FSM2 (Finite State Machine 2: a control section of a second device #2). In the first example, each of the control sections FSM1 and FSM2 is provided with a counter for counting to a predetermined number so as to determine the length of an active period of the READY signal. A fixed active period of the READY signal is preliminarily calculated with regard to the worst case of the clock frequency ratio, and a number corresponding to the fixed active period is set to the counter. In order to avoid malfunction, a READY signal of one device should not be activated until a READY signal of the other device becomes inactive, therefore, the counters are provided with idle states ST14 and ST24 which are shown in FIG. 1.

FIGS. 3 through 6 show a second example of a conventional symmetric asynchronous interface circuit. FIG. 3 is a circuit diagram of the second conventional symmetric asynchronous interface circuit, and FIG. 4 is a schematic diagram showing the relationship between the clock frequency ratio and the overhead time ratio in the case of the second conventional symmetric asynchronous interface circuit of FIG. 3. FIG. 5 is a timing chart showing a case where the clock frequency ratio f(CK1)/f(CK2) is 2/3 and the duty ratio is 50%, and FIG. 6 is a timing chart showing a case where the clock frequency ratio f(CK1)/f(CK2) is 1/1, the phase difference θ(CK2)−θ(CK1) is π, and the duty ratio is 50%.

The second conventional symmetric asynchronous interface circuit shown in FIG. 3 is a four-line interface circuit employing two two-line handshakes, which handshakes not only the READY signal but also an ACKNOWLEDGE signal for dynamically controlling the active period of the READY signal. By the dynamic setting of the active period of the READY signal, limitations in the driving clock signal frequencies of the two devices are eliminated, and thus general versatility of the symmetric asynchronous interface circuit is increased. As shown in the relationship between the clock frequency ratio and the overhead time ratio in FIG. 4, the overhead time (ratio) in the case of the second conventional symmetric asynchronous interface circuit becomes constant regardless of the clock frequency ratio between the two devices, in contrast to the dotted line showing the case of the first conventional symmetric asynchronous interface circuit.

In the following, the operation of the second conventional symmetric asynchronous interface circuit will be described, taking a case where the two devices are provided with datapaths as an example and referring to the circuit diagram of FIG. 3, the timing chart of FIG. 5, and FIG. 7 through FIG. 9. FIG. 7 is a circuit diagram showing synchronization circuits SY11, SY12, SY21 and SY22 of the second conventional symmetric asynchronous interface circuit of FIG. 3. FIG. 8 is a circuit diagram showing a datapath DP1 of the first device #1, and FIG. 9 is a circuit diagram showing a datapath DP2 of the second device #2. Incidentally, parts of the devices #1 and #2 except the first device control section FSM1 and the second device control section FSM2 are not shown in FIG. 3, and thus the datapath DP1 of the device #1 and the datapath DP2 of the device #2 are not shown in FIG. 3. In the timing chart of FIG. 5, solid arrows indicate operations for transferring the right of control from the device #1 to the device #2, and broken arrows indicate operations for transferring the control right from the device #2 to the device #1. The following explanation will be given on the assumption that each cycle of the clock signal (CK1, CK2) ends at a rising edge, therefore, each clock cycle includes a falling edge and a rising edge after the falling edge. In this example, each device (#1/#2) is a circuit which executes increment of a count register (RG11/RG21) of its datapath (DP1/DP2) by 1 twice per one switching of the control right.

1. After an enough reset period, the first device control section FSM1 (Finite State Machine 1 (the control section of the first device #1)) is in an initial state ST10, and a register RG11 of the datapath DP1 shown in FIG. 8 holds a value 0.

2. Meanwhile, the second device control section FSM2 ((Finite State Machine 2 (the control section of the second device #2)) is in an initial state ST22, and a register RG21 of the datapath DP2 shown in FIG. 9 holds a value 0.

3. In the first cycle of the clock signal (CK1) of the first device #1, the value (0) which has been held by the count register RG11 shown in FIG. 8 is incremented by 1, and the incremented value (1) is written in the count register RG11.

4. At the same time, the first device control section FSM1 changes into the next state ST13.

5. In the second cycle of the clock signal (CK1), the value (1) which has been held by the count register RG11 shown in FIG. 8 is further incremented by 1, and the incremented value (2) is written in the count register RG11. At this point, procedure on the side of the first device #1 is ended.

6. The first device control section FSM1 can change into a state ST11 for informing the second device #2 that the procedure of the first device #1 has been finished (i.e. that the first device #1 is ready), if a signal RD22 is inactive (0). In the example of FIG. 5, the signal RD22 is inactive, and thus the first device control section FSM1 can change into the state ST11.

7. In the third cycle of the clock signal (CK1), the first device control section FSM1 changes into the state ST11, and thereby a signal RD11 (a READY signal) for indicating the readiness of the first device #1 is changed into active (1).

8. In the fourth cycle of the clock signal (CK2) of the second device #2, a D-FF (DF111) of the synchronization circuit SY11 shown in FIG. 7 latches the activated signal RD11 in sync with a falling edge of the clock signal (CK2). The output of the D-FF (DF111) is a signal RD14 which is shown in FIG. 7.

9. Also in the fourth cycle of the clock signal (CK2), another D-FF (DF112) of the synchronization circuit SY11 shown in FIG. 7 further latches the signal RD14 in sync with a rising edge of the clock signal (CK2). The output of the D-FF (DF112) is supplied to the second device control section FSM2 as a signal RD12. By the signal RD12 corresponding to the READY signal RD11, the READY signal RD11 outputted by the first device #1 (which is synchronized by the clock signal (CK1)) can be used in the second device #2 which is driven by another clock signal (CK2). The output of the D-FF (DF112) is also supplied to the synchronization circuit SY12 as an ACKNOWLEDGE signal AC11.

10. Now that the active READY signal RD11 (RD12) indicating the readiness of the first device #1 has been transferred to the second device #2, procedure on the side of the second device #2 can be started. The second device #2 recognizes at this point that the control right has been transferred from the first device #1 to itself. The above period from the step 7 to the step 9 is called "an overhead for synchronization".

11. In the fourth cycle of the clock signal (CK1), a D-FF (DF121) of the synchronization circuit SY12 shown in FIG. 7 latches the activated ACKNOWLEDGE signal AC11 (=RD12) of the step 9 in sync with a falling edge of the clock signal (CK1), and thereby an output signal AC14 is obtained.

12. Also in the fourth cycle of the clock signal (CK1), another D-FF (DF122) of the synchronization circuit SY12 shown in FIG. 7 further latches the signal AC14 of the step 11 in sync with a rising edge of the clock signal (CK1). The output of the D-FF (DF122) is supplied to the first device control section FSM1 as a signal AC12. By the signal AC12 corresponding to the ACKNOWLEDGE signal AC11 (=RD12), the ACKNOWLEDGE signal AC11 which is in sync with the clock signal (CK2) can be used in the first device #1 which is driven by another clock signal (CK1).

13. The signal AC12 is a signal to be used for confirming that the activated READY signal RD11 of the step 7 could successfully be synchronized to the second device #2 which is driven by the clock signal (CK2). In the fifth cycle of the clock signal (CK1), by receiving the signal AC12, the first device control section FSM1 of the first device #1 changes from the state ST11 to a state ST12 for waiting for completion of procedure on the side of the second device #2. At the same time, the first device control section FSM1 changes the activated READY signal RD11 into inactive (0).

14. In the sixth and seventh cycles of the clock signal (CK1), the first device control section FSM1 in the state ST12 waits for an activated signal RD22 which indicates the readiness of the second device #2.

15. In the fifth cycle of the clock signal (CK2), the datapath DP2 of the second device #2 reads data D1 from the datapath DP1 of the first device #1. The data D1 (2) stored in the count register RG11 has been stable without changing since the third cycle of the clock signal (CK1). Such stable data can be transferred between two devices without using interface (such as a synchronization circuit) even if the two devices are synchronized by different clock systems.

16. In the datapath DP2 which is shown in FIG. 9, the data D1 of the step 15 is incremented by 1, and the incremented data (3) is written in the count register RG21.

17. At the same time, the second device control section FSM2 of the second device #2 changes into the next state ST23.

18. In the sixth cycle of the clock signal (CK2), the value (3) which has been held by the count register RG21 shown in FIG. 9 is further incremented by 1, and the incremented value (4) is written in the count register RG21. At this point, procedure on the side of the second device #2 is ended.

19. The second device control section FSM2 can change into a state ST21 for informing the first device #1 that the procedure of the second device #2 has been finished (i.e. that the second device #2 is ready), if the signal RD12 is inactive (0). In the example of FIG. 5, the signal RD12 is active (1), and thus the second device control section FSM2 (which can not change into the state ST21) changes into the aforementioned idle state ST24 for waiting for the change into the state ST21.

20. In the seventh and eighth cycles of the clock signal (CK2), the signal RD12 is also active (1) in the same way as the step 19, therefore, the second device control section FSM2 remains in the idle state ST24 waiting for the signal RD12 to change inactive (0). The period corresponding to the idle state ST24 is an overhead period which is necessary for ensuring the asynchronous handshaking operation of the second conventional symmetric asynchronous interface circuit.

21. In the ninth cycle of the clock signal (CK2), the second device control section FSM2 also remains in the idle state ST24.

22. Also in the ninth cycle of the clock signal (CK2), the signal RD11 which changed into inactive (0) in the sixth cycle of the clock signal (CK1) is latched by the D-FF (DF111) of the synchronization circuit SY11 in sync with a falling edged of the clock signal CK2. The output of the D-FF (DF111) is the signal RD14 shown in FIG. 7.

23. Also in the ninth cycle of the clock signal (CK2), the D-FF (DF112) of the synchronization circuit SY11 shown in FIG. 7 further latches the signal RD14 of the step 22 in sync with a rising edge of the clock signal (CK2). The output of the D-FF (DF112) is supplied to the second device control section FSM2 as the signal RD12, and is also supplied to the synchronization circuit SY12 as the ACKNOWLEDGE signal AC 11.

24. Since the signal RD12 has changed into inactive (0), the second device control section FSM2 of the second device #2 changes from the idle state ST24 into the state ST21 for informing the first device #1 of its readiness.

25. In the eleventh cycle of the clock signal (CK2), by the change of the second device control section FSM2 into the state ST21, a signal RD21 for indicating the readiness of the second device #2 is changed into active (1).

26. In the eighth cycle of the clock signal (CK1), a D-FF (DF211) of the synchronization circuit SY21 shown in FIG. 7 latches the activated signal RD21 of the step 25 in sync with a falling edge of the clock signal (CK1), and thereby an output signal RD24 is obtained.

27. Also in the eighth cycle of the clock signal (CK1), another D-FF (DF212) of the synchronization circuit SY21 shown in FIG. 7 further latches the signal RD24 of the step 26 in sync with a rising edge of the clock signal (CK1), thereby the aforementioned signal RD22 is obtained as the output of the D-FF (DF212). By the signal RD22 corresponding to the signal RD21, the READY signal RD21 can be used in the first device #1 which is driven by the different clock system.

28. Now that the active READY signal RD21 (RD22) indicating the readiness of the second device #2 has been transferred to the first device #1, procedure on the side of the first device #1 can be started. The first device #1 recognizes at this point that the control right has been transferred from the second device #2 to itself.

Thereafter, the control right is alternately transferred between the first device #1 and the second device #2 in the same way, and thereby the count register RG11 of the datapath DP1 of the first device #1 and the count register RG21 of the datapath DP2 of the second device #2 keep on being incremented in the same way.

The conventional symmetric asynchronous interface circuits described above involve the following drawbacks or problems. In the first conventional symmetric asynchronous interface circuit of FIG. 1, the active period of the READY signal is determined as a fixed period with regard to the worst case of the clock frequency ratio f(CK1)/f(CK2), and thus a counter value for determining the active period of the READY signal has to be preliminarily calculated and set adequately according to circuit specifications (frequency variable ranges) of each device. Further, in order to prevent malfunction, a READY signal of one device can not be activated until a READY signal of the other device turns inactive. In other words, idle states (ST14, ST24) are necessary in both devices. Therefore, general versatility of the first conventional symmetric asynchronous interface circuit of FIG. 1 is necessitated to be low. Moreover, in high speed operation, overhead time tends to increase as the clock frequency ratio f(CK1)/f(CK2) approaches 1 as shown in FIG. 2.

The second conventional symmetric asynchronous interface circuit of FIG. 3 eliminates the limitations in the driving clock signal frequencies of the devices in the case of the first conventional symmetric asynchronous interface circuit, by dynamically setting the active period of the READY signal using the ACKNOWLEDGE signal, thereby general versatility of the symmetric asynchronous interface circuit can be increased. However, also in the case of the second conventional symmetric asynchronous interface circuit, it is impossible to activate a READY signal of one device until a READY signal of the other device turns inactive (the idle states ST14 and ST24 can not be omitted), since the following malfunctions occurs.

(1) First Malfunction

The handshake (READY-ACKNOWLEDGE) which determines the active period of the READY signal only considers the minimum margin (the active period of the READY signal) for synchronization. There are cases where the READY-ACKNOWLEDGE handshake is completed before the receiving side (a device that receives a READY signal) receives a READY signal and thereby the transmitting side (a device that is transmitting the READY signal) turns the READY signal inactive before the receiving side receives the READY signal. In such cases, the READY signal has already changed into inactive when the receiving side should refer to the READY signal (malfunction in the double handshake).

(2) Second Malfunction

Since active periods of the ACKNOWLEDGE signals are not taken into consideration, there is a possibility that signals concerning two transactions overlap with each other. There are cases where an ACKNOWLEDGE signal from a device concerning a previous transaction still remains active when a READY signal concerning the current transaction is outputted by the other device. In such cases, the active period of the READY signal concerning the current transaction can not be secured, and thus the READY signal might not be able to be received by the receiving side (lack of margin for synchronization).

Therefore, in the case of the second conventional example (i.e. in the case where the second conventional symmetric asynchronous interface circuit is employed), the first device #1 and the second device #2 have to have idle cycles (in which transmission (activation) of a READY signal is prohibited until transmission (activation) of a previous READY signal (from the other device) is finished). Due to the idle cycles, the overhead time ratio is necessitated to be increased in high speed control right switching, and thereby speeding up of the system (the first device #1, the symmetric asynchronous interface circuit and the second device #2) is necessitated to be limited.

SUMMARY OF THE INVENTION

It is therefore the primary object of the present invention to provide a symmetric asynchronous interface circuit, by which the overhead time ratio of the system can be minimized without causing malfunction and thereby the processing speed of the system can be increased.

Another object of the present invention is to provide a symmetric asynchronous interface circuit, by which general versatility of system design including the symmetric asynchronous interface circuit can be increased.

Another object of the present invention is to provide a symmetric asynchronous interface method, by which the overhead time ratio of the system can be minimized without causing malfunction and thereby the processing speed of the system can be increased.

Another object of the present invention is to provide a symmetric asynchronous interface method, by which general versatility of system design including a symmetric asynchronous interface circuit can be increased.

In accordance with a first aspect of the present invention, there is provided a symmetric asynchronous interface circuit which is utilized for interfacing between a first device and a second device which operate asynchronously, comprising a first synchronization circuit, a first delay circuit, a second synchronization circuit, a first pulse generation circuit, a third synchronization circuit, a second delay circuit, a fourth synchronization circuit and a second pulse generation circuit. The first synchronization circuit receives a READY signal outputted by a control section of the first device, synchronizes the READY signal to a clock signal on the side of the second device, and outputs the synchronized READY signal to a control section of the second device. The first delay circuit delays a signal corresponding to the synchronized READY signal outputted by the first synchronization circuit and outputs the delayed signal as an ACKNOWLEDGE signal. The second synchronization circuit synchronizes the ACKNOWLEDGE signal outputted by the first delay circuit to a clock signal on the side of the first device. The first pulse generation circuit generates a pulse signal when the synchronized ACKNOWLEDGE signal is supplied from the second synchronization circuit and outputs the pulse signal to the control section of the first device as an ACKNOWLEDGE signal. The third synchronization circuit receives a READY signal outputted by the control section of the second device, synchronizes the READY signal to the clock signal on the side of the first device, and outputs the synchronized READY signal to the control section of the first device. The second delay circuit delays a signal corresponding to the synchronized READY signal outputted by the third synchronization circuit and outputs the delayed signal as an ACKNOWLEDGE signal. The fourth synchronization circuit synchronizes the ACKNOWLEDGE signal outputted by the second delay circuit to the clock signal on the side of the second device. The second pulse generation circuit generates a pulse signal when the synchronized ACKNOWLEDGE signal is supplied from the fourth synchronization circuit and outputs the pulse signal to the control section of the second device as an ACKNOWLEDGE signal.

In accordance with a second aspect of the present invention, there is provided a symmetric asynchronous interface circuit which is utilized for interfacing between a first device and a second device which operate asynchronously, comprising a first synchronization circuit, a first delay circuit, a second synchronization circuit, a third synchronization circuit, a second delay circuit and a fourth synchronization circuit. The first synchronization circuit receives a READY signal outputted by a control section of the first device, synchronizes the READY signal to a clock signal on the side of the second device, and outputs the synchronized READY signal to a control section of the second device. The first delay circuit delays a signal corresponding to the synchronized READY signal outputted by the first synchronization circuit and outputs the delayed signal as an ACKNOWLEDGE signal. The second synchronization circuit synchronizes the ACKNOWLEDGE signal outputted by the first delay circuit to a clock signal on the side of the first device and outputs the synchronized ACKNOWLEDGE signal to the control section of the first device. The third synchronization circuit receives a READY signal outputted by the control section of the second device, synchronizes the READY signal to the clock signal on the side of the first device, and outputs the synchronized READY signal to the control section of the first device. The second delay circuit delays a signal corresponding to the synchronized READY signal outputted by the third synchronization circuit and outputs the delayed signal as an ACKNOWLEDGE signal. The fourth synchronization circuit synchronizes the ACKNOWLEDGE signal outputted by the second delay circuit to the clock signal on the side of the second device and outputs the synchronized ACKNOWLEDGE signal to the control section of the second device.

In accordance with a third aspect of the present invention, there is provided a symmetric asynchronous interface circuit which is utilized for interfacing between a first device and a second device which operate asynchronously, comprising a first synchronization circuit, a second synchronization circuit, a first pulse generation circuit, a third synchronization circuit, a fourth synchronization circuit and a second pulse generation circuit. The first synchronization circuit receives a READY signal outputted by a control section of the first device, synchronizes the READY signal to a clock signal on the side of the second device, and outputs the synchronized READY signal to a control section of the second device. The second synchronization circuit receives an ACKNOWLEDGE signal which corresponds to the output of the first synchronization circuit and synchronizes the ACKNOWLEDGE signal to a clock signal on the side of the first device. The first pulse generation circuit generates a pulse signal when the synchronized ACKNOWLEDGE signal is supplied from the second synchronization circuit and outputs the pulse signal to the control section of the first device as an ACKNOWLEDGE signal. The third synchronization circuit receives a READY signal outputted by the control section of the second device, synchronizes the READY signal to the clock signal on the side of the first device, and outputs the synchronized READY signal to the control section of the first device. The fourth synchronization circuit receives an ACKNOWLEDGE signal which corresponds to the output of the third synchronization circuit and synchronizes the ACKNOWLEDGE signal to the clock signal on the side of the second device. The second pulse generation circuit generates a pulse signal when the synchronized ACKNOWLEDGE signal is supplied from the fourth synchronization circuit and outputs the pulse signal to the control section of the second device as an ACKNOWLEDGE signal.

In accordance with a fourth aspect of the present invention, in the first, the second and the third aspects, the symmetric asynchronous interface circuit is applied to the first device and the second device which are provided with datapaths.

In accordance with a fifth aspect of the present invention, in the first, the second and the third aspects, the symmetric asynchronous interface circuit is provided to the first device and the second device externally.

In accordance with a sixth aspect of the present invention, in the first, the second and the third aspects, the symmetric asynchronous interface circuit is provided in the first device or the second device.

In accordance with a seventh aspect of the present invention, in the first aspect, the first pulse generation circuit, the second synchronization circuit, the third synchronization circuit and the second delay circuit are provided in the first device, and the second pulse generation circuit, the first synchronization circuit, the fourth synchronization circuit and the first delay circuit are provided in the second device.

In accordance with an eighth aspect of the present invention, in the second aspect, the second synchronization circuit, the third synchronization circuit and the second delay circuit are provided in the first device, and the first synchronization circuit, the fourth synchronization circuit and the first delay circuit are provided in the second device.

In accordance with a ninth aspect of the present invention, in the third aspect, the first pulse generation circuit, the second synchronization circuit and the third synchronization circuit are provided in the first device, and the second pulse generation circuit, the first synchronization circuit and the fourth synchronization circuit are provided in the second device.

In accordance with a tenth aspect of the present invention, in the first, the second and the third aspects, the symmetric asynchronous interface circuit is applied to the first device and the second device whose control sections do not have idle states.

In accordance with an eleventh aspect of the present invention, in the first and the second aspects, delay time of each of the delay circuits is at least 1 clock cycle.

In accordance with an twelfth aspect of the present invention, in the first and the second aspects, delay time of the first delay circuit is set longer than or equal to an interval in the second device between a state in which the control section of the second device informs the control section of the first device that the second device has finished its procedure and a state in which the control section of the second device waits for completion of procedure of the first device, and delay time of the second delay circuit is set longer than or equal to an interval in the first device between a state in which the control section of the first device informs the control section of the second device that the first device has finished its procedure and a state in which the control section of the first device waits for completion of procedure of the second device.

In accordance with a thirteenth aspect of the present invention, in the twelfth aspect, the delay time of the first delay circuit is set equal to the interval in the second device between the two states, and the delay time of the second delay circuit is set equal to the interval in the first device between the two states.

In accordance with a fourteenth aspect of the present invention, in the first aspect, memory elements of the synchronization circuits, the delay circuits and the pulse generation circuits are composed of D-FFs.

In accordance with a fifteenth aspect of the present invention, in the second aspect, memory elements of the synchronization circuits and the delay circuits are composed of D-FFs.

In accordance with a sixteenth aspect of the present invention, in the third aspect, memory elements of the synchronization circuits and the pulse generation circuits are composed of D-FFs.

In accordance with a seventeenth aspect of the present invention, there is provided a symmetric asynchronous interface method for interfacing between a first device and a second device which operate asynchronously, comprising a first synchronization step, a first delay step, a second synchronization step, a first pulse generation step, a third synchronization step, a second delay step, a fourth synchronization step and a second pulse generation step. In the first synchronization step, a READY signal outputted by a control section of the first device is synchronized to a clock signal on the side of the second device and the synchronized READY signal is supplied to a control section of the second device. In the first delay step, an ACKNOWLEDGE signal is generated by delaying a signal corresponding to the synchronized READY signal of the first synchronization step. In the second synchronization step, the ACKNOWLEDGE signal generated in the first delay step is synchronized to a clock signal on the side of the first device and thereby a synchronized ACKNOWLEDGE signal is generated. In the first pulse generation step, a pulse signal corresponding to the synchronized ACKNOWLEDGE signal of the second synchronization step is generated and the pulse signal is supplied to the control section of the first device as an ACKNOWLEDGE signal. In the third synchronization step, a READY signal outputted by the control section of the second device is synchronized to the clock signal on the side of the first device and the synchronized READY signal is supplied to the control section of the first device. In the second delay step, an ACKNOWLEDGE signal is generated by delaying a signal corresponding to the synchronized READY signal of the third synchronization step. In the fourth synchronization step, the ACKNOWLEDGE signal generated in the second delay step is synchronized to the clock signal on the side of the second device and thereby a synchronized ACKNOWLEDGE signal is generated. In the second pulse generation step, a pulse signal corresponding to the synchronized ACKNOWLEDGE signal of the fourth synchronization step is generated and the pulse signal is supplied to the control section of the second device as an ACKNOWLEDGE signal.

In accordance with an eighteenth aspect of the present invention, there is provided a symmetric asynchronous interface method for interfacing between a first device and a second device which operate asynchronously, comprising a first synchronization step, a first delay step, a second synchronization step, a third synchronization step, a second delay step and a fourth synchronization step. In the first synchronization step, a READY signal outputted by a control section of the first device is synchronized to a clock signal on the side of the second device and the synchronized READY signal is supplied to a control section of the second device. In the first delay step, an ACKNOWLEDGE signal is generated by delaying a signal corresponding to the synchronized READY signal of the first synchronization step. In the second synchronization step, the ACKNOWLEDGE signal generated in the first delay step is synchronized to a clock signal on the side of the first device and the synchronized ACKNOWLEDGE signal is supplied to the control section of the first device. In the third synchronization step, a READY signal outputted by the control section of the second device is synchronized to the clock signal on the side of the first device and the synchronized READY signal is supplied to the control section of the first device. In the second delay step, an ACKNOWLEDGE signal is generated by delaying a signal corresponding to the synchronized READY signal of the third synchronization step. In the fourth synchronization step, the ACKNOWLEDGE signal generated in the second delay step is synchronized to the clock signal on the side of the second device and the synchronized ACKNOWLEDGE signal is supplied to the control section of the second device.

In accordance with a nineteenth aspect of the present invention, there is provided a symmetric asynchronous interface method for interfacing between a first device and a second device which operate asynchronously, comprising a first synchronization step, a second synchronization step, a first pulse generation step, a third synchronization step, a fourth synchronization step and a second pulse generation step. In the first synchronization step, a READY signal outputted by a control section of the first device is synchronized to a clock signal on the side of the second device and the synchronized READY signal is supplied to a control section of the second device. In the second synchronization step, an ACKNOWLEDGE signal which corresponds to the synchronized READY signal of the first synchronization step is synchronized to a clock signal on the side of the first device and thereby a synchronized ACKNOWLEDGE signal is generated. In the first pulse generation step, a pulse signal corresponding to the synchronized ACKNOWLEDGE signal of the second synchronization step is generated and the pulse signal is supplied to the control section of the first device as an ACKNOWLEDGE signal. In the third synchronization step, a READY signal outputted by the control section of the second device is synchronized to the clock signal on the side of the first device and the synchronized READY signal is supplied to the control section of the first device. In the fourth synchronization step, an ACKNOWLEDGE signal which corresponds to the synchronized READY signal of the third synchronization step is synchronized to the clock signal on the side of the second device and thereby a synchronized ACKNOWLEDGE signal is generated. In the second pulse generation step, a pulse signal corresponding to the synchronized ACKNOWLEDGE signal of the fourth synchronization step is generated and the pulse signal is supplied to the control section of the second device as an ACKNOWLEDGE signal.

In accordance with a twentieth aspect of the present invention, in the seventeenth, the eighteenth and the nineteenth aspects, the method is applied to the first device and the second device which are provided with datapaths.

In accordance with a twenty-first aspect of the present invention, in the seventeenth, the eighteenth and the nineteenth aspects, the method is applied to the first device and the second device whose control sections do not have idle states.

In accordance with a twenty-second aspect of the present invention, in the seventeenth and the eighteenth aspects, delay time of each of the delay steps is at least 1 clock cycle.

In accordance with a twenty-third aspect of the present invention, in the seventeenth and the eighteenth aspects, delay time of the first delay step is set longer than or equal to an interval in the second device between a state in which the control section of the second device informs the control section of the first device that the second device has finished its procedure and a state in which the control section of the second device waits for completion of procedure of the first device, and delay time of the second delay step is set longer than or equal to an interval in the first device between a state in which the control section of the first device informs the control section of the second device that the first device has finished its procedure and a state in which the control section of the first device waits for completion of procedure of the second device.

In accordance with a twenty-fourth aspect of the present invention, in the twenty-third aspect, the delay time of the first delay step is set equal to the interval in the second device between the two states, and the delay time of the second delay step is set equal to the interval in the first device between the two states.

BRIEF DESCRIPTION OF THE DRAWINGS

The objects and features of the present invention will become more apparent from the consideration of the following detailed description taken in conjunction with the accompanying drawings, in which:

FIGS. 11 and 12 are circuit diagrams showing cases where the symmetric asynchronous interface circuit according to the present invention is provided to the first device and the second device externally, in which FIG. 11 shows a case where the two devices are provided with datapaths and FIG. 12 shows a case where the two devices are not provided with datapaths;

FIGS. 13 and 14 are circuit diagrams showing cases where the symmetric asynchronous interface circuit according to the present invention is divided into two parts so that the two parts will be included in the first device and the second device respectively and connected by four lines, in which FIG. 13 shows a case where the two devices are provided with datapaths and FIG. 14 shows a case where the two devices are not provided with datapaths;

FIGS. 15 and 16 are circuit diagrams showing cases where the symmetric asynchronous interface circuit according to the present invention is included in a device so that the symmetric asynchronous interface circuit will be connected to the other device by three lines, in which FIG. 15 shows a case where the two devices are provided with datapaths and FIG. 16 shows a case where the two devices are not provided with datapaths;

FIG. 22 is a schematic diagram showing state transitions and circuit composition of a state machine of the second device;

FIG. 30 is a circuit diagram showing another symmetric asynchronous interface circuit which is realized by adding 1-clock pulse generation circuits to the symmetric asynchronous interface circuit shown in FIG. 17;

DESCRIPTION OF THE PREFERRED EMBODIMENTS

Figure 1:
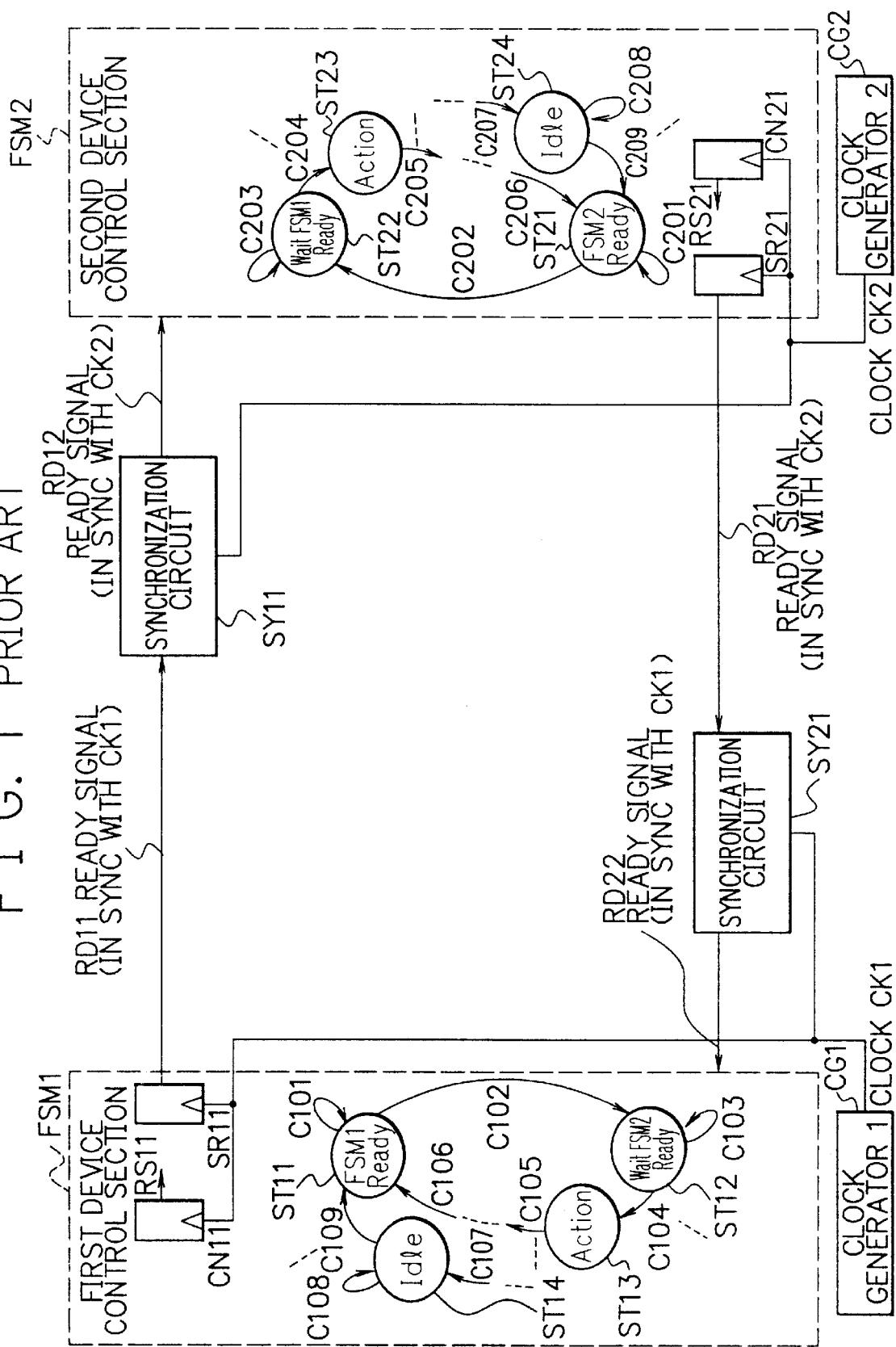
FIG. 1 is a circuit diagram showing a first example of a conventional symmetric asynchronous interface circuit.
Figure 2:
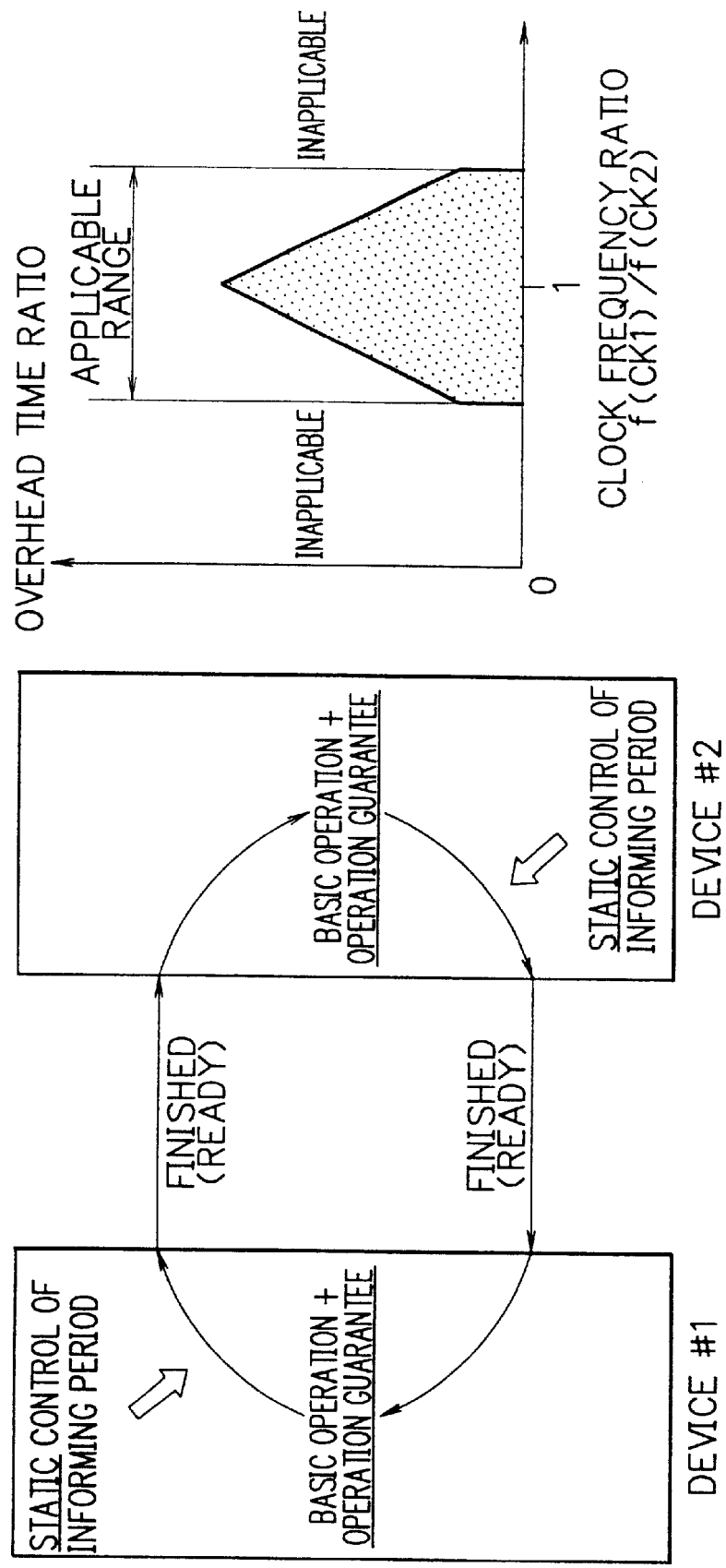
FIG. 2 is a schematic diagram showing the relationship between the clock frequency ratio and the overhead time ratio in the first conventional symmetric asynchronous interface circuit of FIG. 1.

Referring now to the drawings, a description will be given in detail of preferred embodiments in accordance with the present invention.

The symmetric asynchronous interface circuit according to the present invention is an interface circuit which is utilized between two variable-clock devices #1 and #2 which operate asynchronously. The symmetric asynchronous interface circuit handles the transfer of the control right only, and thus does not concern transfer of data.

As mentioned before, the term "asynchronous" means that the two devices #1 and #2 connected by the interface circuit operate in sync with two different (independent) clock systems respectively. There is no correlation between the clock frequencies or the clock phases of the two clock systems, and thus a signal which is in sync with one clock system is not in sync with the other clock system. Therefore, the term "asynchronous interface circuit" means an interface circuit for connecting two devices (each of which is synchronized by an independent clock signal) whose clock frequencies or the clock phases are different. The term "variable-clock" does not mean that the clock frequency of a device can be varied during its operation, but means that the clock frequency or the clock phase can be varied or switched when the device is reset etc. The term "symmetric" means that the interface circuit has a symmetric circuit composition so as to handle cases of both frequency relationships: (clock frequency 1)≦(clock frequency 2) and (clock frequency 1)>(clock frequency 2), since the frequency relationship between two devices is not preliminarily fixed.

Figure 10:
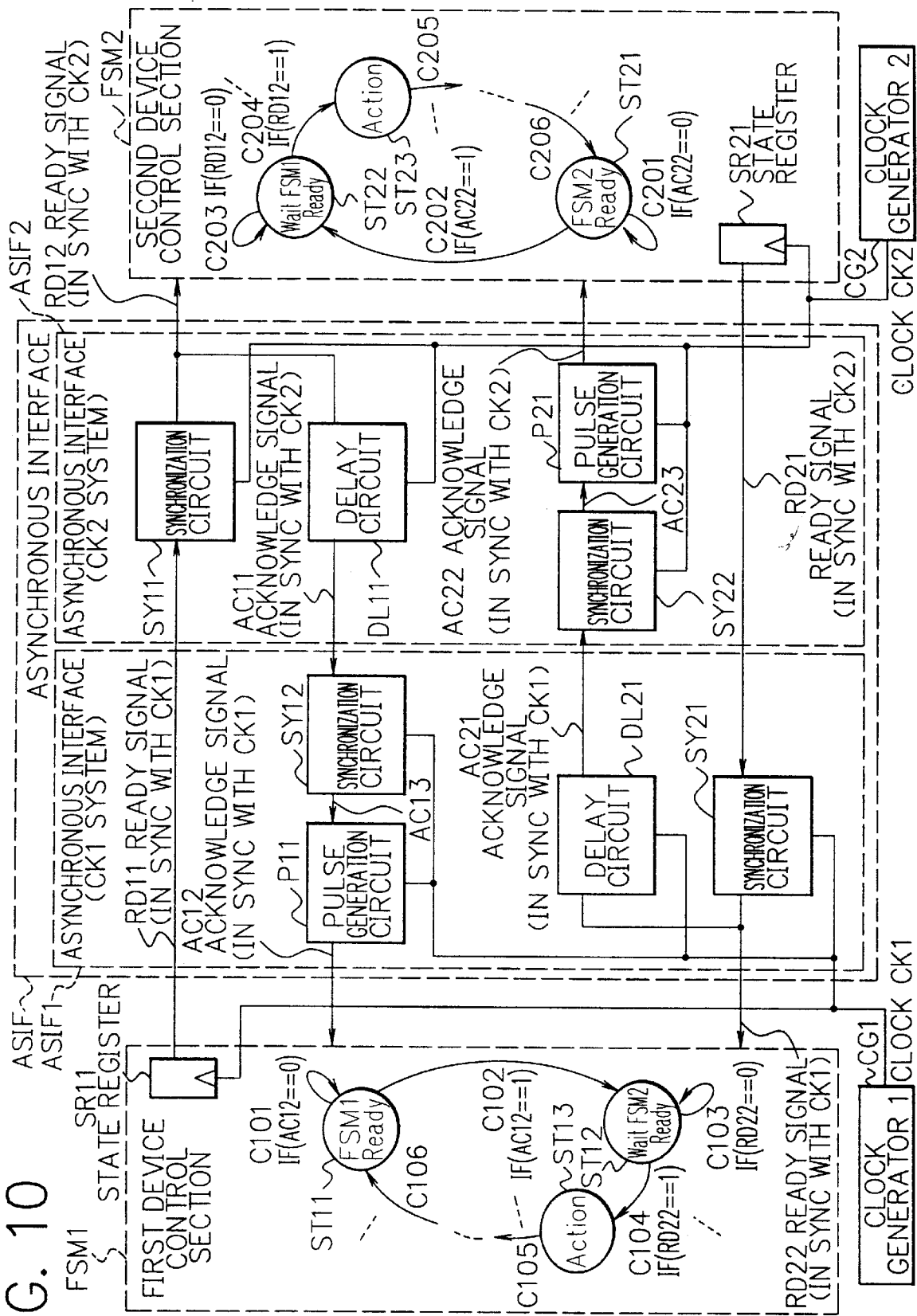
FIG. 10 is a circuit diagram showing a symmetric asynchronous interface circuit according to an embodiment of the present invention.

FIG. 10 is a circuit diagram showing a symmetric asynchronous interface circuit according to an embodiment of the present invention. Referring to FIG. 10, the symmetric asynchronous interface circuit is connecting a first device control section FSM1 and a second device control section FSM2. The first device control section FSM1 is a state machine for controlling the first device #1, and the second device control section FSM2 is a state machine for controlling the second device #2. The first device control section FSM1 and the second device control section FSM2 are on an equality with each other, that is, each of them can be master/slave.

Each state machine (FSM1/FSM2) necessarily has a state (ST11/ST21) for informing the other state machine (FSM2/FSM1) of completion of procedure (a basic operation etc.) of the device (#1/#2) which includes the state machine (FSM1/FSM2), and a state (ST12/ST22) for waiting for completion of procedure of the other device (#2/#1). Therefore, one or more transitional states (ST13, ST23) exist between the completion of the procedure of the other state machine and the completion of the procedure of the state machine (between the states ST12 and ST11, between the states ST22 and ST21).

The symmetric asynchronous interface circuit shown in FIG. 10 comprises delay circuits DL11 and DL21, pulse generation circuits P11 and P12, and synchronization circuits SY11, SY12, SY21 and SY22. The delay circuit DL21, the pulse generation circuit P11 and the synchronization circuits SY12 and SY21 form an asynchronous interface circuit ASIF1 (clock system CK1). The delay circuit DL11, the pulse generation circuit P21 and the synchronization circuits SY11 and SY22 form another asynchronous interface circuit ASIF2 (clock system CK2).

The input terminal of the synchronization circuit SY11 is connected with a state register SR11 of the first device control section FSM1, and the output terminal of the synchronization circuit SY11 is connected to the second device control section FSM2 and the input terminal of the delay circuit DL11. The output terminal of the delay circuit DL11 is connected to the input terminal of the synchronization circuit SY12. The output terminal of the synchronization circuit SY12 is connected to the input terminal of the pulse generation circuit P11. The output terminal of the pulse generation circuit P11 is connected to the first device control section FSM1.

In the same way, the input terminal of the synchronization circuit SY21 is connected with a state register SR21 of the second device control section FSM2, and the output terminal of the synchronization circuit SY21 is connected to the first device control section FSM1 and the input terminal of the delay circuit DL21. The output terminal of the delay circuit DL21 is connected to the input terminal of the synchronization circuit SY22, and the output terminal of the synchronization circuit SY22 is connected to the input terminal of the pulse generation circuit P21, and the output terminal of the pulse generation circuit P21 is connected to the second device control section FSM2.

The first device control section FSM1, the delay circuit DL21, the pulse generation circuit P11 and the synchronization circuits SY12 and SY21 are driven by a clock signal CK1 which is generated by a clock generator CG1. The second device control section FSM2, the delay circuit DL11, the pulse generation circuit P21 and the synchronization circuits SY11 and SY22 are driven by a clock signal CK2 which is generated by a clock generator CG2. The clock signals CK1 and CK2 are independent of each other and their frequencies and phases are variable.

In the following, the operation of the symmetric asynchronous interface circuit of the embodiment will be described.

When a READY signal RD11 (indicating completion of a basic operation of the first device #1 such as an arithmetic logic operation, data preparation, etc.) is outputted by the state register SR11 of the first device control section FSM1 to the synchronization circuit SY11, the synchronization circuit SY11 outputs a READY signal RD12 to the second device control section FSM2 and the delay circuit DL11 in sync with the clock signal CK2 on the side of the second device control section FSM2. By receiving the READY signal RD12, the second device control section FSM2 changes from a state ST22 to a state ST23 and starts its procedure.

The delay circuit DL11 delays the READY signal RD12 supplied from the synchronization circuit SY11 by at least 1 clock cycle, and thereby outputs an ACKNOWLEDGE signal AC11 (for indicating that the READY signal RD11 could successfully be received by the second device control section FSM2 and for requesting the READY signal to be changed into inactive) to the synchronization circuit SY12. The synchronization circuit SY12 which received the ACKNOWLEDGE signal AC11 outputs an ACKNOWLEDGE signal AC13 to the pulse generation circuit P11 in sync with the clock signal CK1 on the side of the first device control section FSM1. The pulse generation circuit P11 which received the ACKNOWLEDGE signal AC13 outputs a 1-clock pulse signal (an ACKNOWLEDGE signal AC12) to the first device control section FSM1. The first device control section FSM1 which received the ACKNOWLEDGE signal AC12 changes from a state ST11 to a state ST12.

When the second device #2 finished its procedure (a basic operation such as an arithmetic logic operation, data preparation, etc.), a READY signal RD21 is outputted by the state register SR21 of the second device control section FSM2 to the synchronization circuit SY21. At the same time, the second device control section FSM2 changes into a state ST21 (in which the second device control section FSM2 informs the first device control section FSM1 about completion of procedure of the second device #2 (i.e. about readiness of the second device #2)). The synchronization circuit SY21 which received the READY signal RD21 outputs a READY signal RD22 to the first device control section FSM1 and the delay circuit DL21 in sync with the clock signal CK1 on the side of the first device control section FSM1. By receiving the READY signal RD22, the first device control section FSM1 starts its procedure and changes from the state ST12 to a state ST13.

The delay circuit DL21 delays the READY signal RD22 supplied from the synchronization circuit SY21 by at least 1 clock cycle, and thereby outputs an ACKNOWLEDGE signal AC21 to the synchronization circuit SY22. The synchronization circuit SY22 which received the ACKNOWLEDGE signal AC21 outputs an ACKNOWLEDGE signal AC23 to the pulse generation circuit P21 in sync with the clock signal CK2 on the side of the second device control section FSM2. The pulse generation circuit P21 which received the ACKNOWLEDGE signal AC23 outputs a 1-clock pulse signal (an ACKNOWLEDGE signal AC22) to the second device control section FSM2. The second device control section FSM2 which received the ACKNOWLEDGE signal AC22 changes from the state ST21 to the state ST22.

The synchronization circuits SY11, SY12, SY21 and SY22 are provided to the symmetric asynchronous interface circuit in order to synchronize each of handshaking signals which are transmitted between the first device control section FSM1 and the second device control section FSM2 (i.e. the READY signals and the ACKNOWLEDGE signals each of which is not in sync with the clock signal (CK1/CK2) of the receiving side) to the clock signal (CK1/CK2) of the receiving side.

The delay circuits DL11 and DL21 are circuits for delaying inputted signals by at least 1 clock cycle. In such four-line control, if a READY signal of a state machine (control section) A is turned active before a previous READY signal of the other state machine B becomes inactive, there is a possibility (in particular clock frequency ratios f(CK1)/f(CK2)) that the transmitting side (i.e. the state machine A) receives an ACKNOWLEDGE signal and thereby turns the READY signal inactive (0) before the READY signal is received by the receiving side (i.e. state machine B). The delay circuits DL11 and DL21 are provided to the symmetric asynchronous interface circuit of the present invention in order to avoid such malfunction (i.e. the first malfunction) and thereby let the handshake signals be received in correct states and timing.

The pulse generation circuits P11 and P21 are circuits for generating a 1-clock pulse signal. The symmetric asynchronous interface circuit of this embodiment is designed on the assumption that each state machine (FSM1, FSM2) changes into the next state when the front end (first clock cycle) of an activated handshaking signal (the READY signal, the ACKNOWLEDGE signal) is detected by detecting a rising edge of the handshaking signal. If the state machines execute the signal level detection without taking falling edges (or active periods of the handshaking signals) in consideration, there is a possibility that handshaking signals concerning two different transactions overlap with each other in timing (in high speed switching and depending on the clock frequency ratio f(CK1)/f(CK2)), and thus an active signal level of a handshaking signal of a previous transaction might be detected by a state machine accidentally. In order to separate the handshaking signals of different transactions, the pulse generation circuit (P11/ P21) detects a rising edge of each ACKNOWLEDGE signal and outputs a 1-clock pulse signal when the rising edge is detected, thereby the above malfunction (i.e. the aforementioned second malfunction) can be avoided.

The symmetric asynchronous interface circuit of this embodiment can be used in the following three types of configurations.

Figure 11:
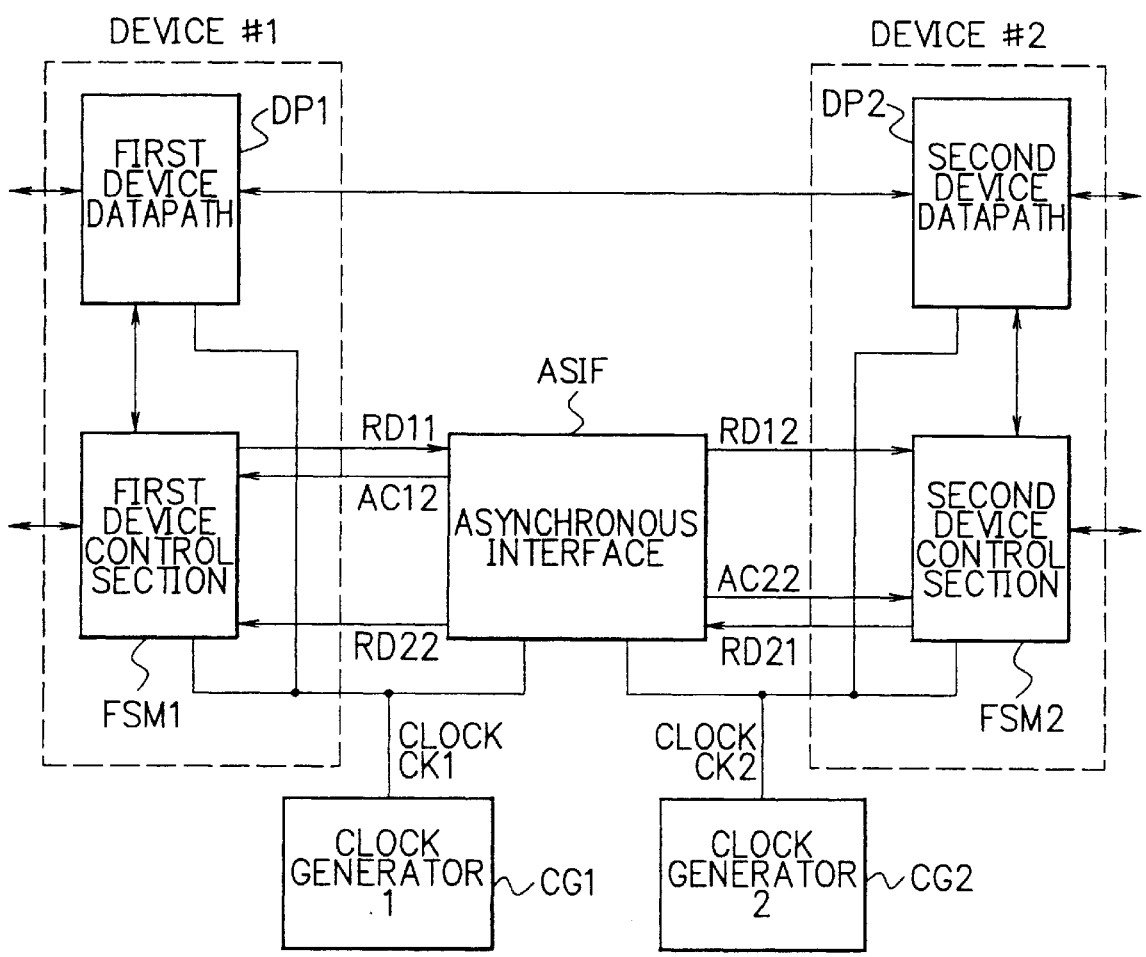
Figure 12:
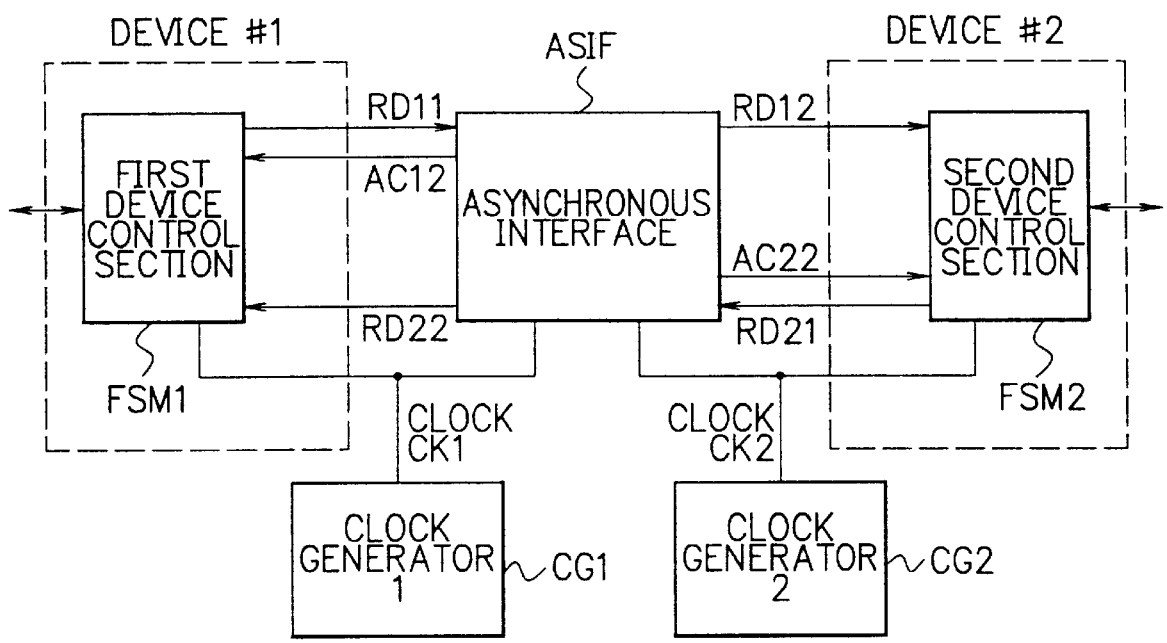

In the first configuration, the symmetric asynchronous interface circuit is provided to the first device #1 and the second device #2 externally. FIGS. 11 and 12 are circuit diagrams showing such configurations, in which FIG. 11 shows a case where the two devices include datapaths and FIG. 12 shows a case where the two devices do not include datapaths.

In the second configuration, the symmetric asynchronous interface circuit is divided into two parts so that the two parts will be included in the first device #1 and the second device

Figure 13:
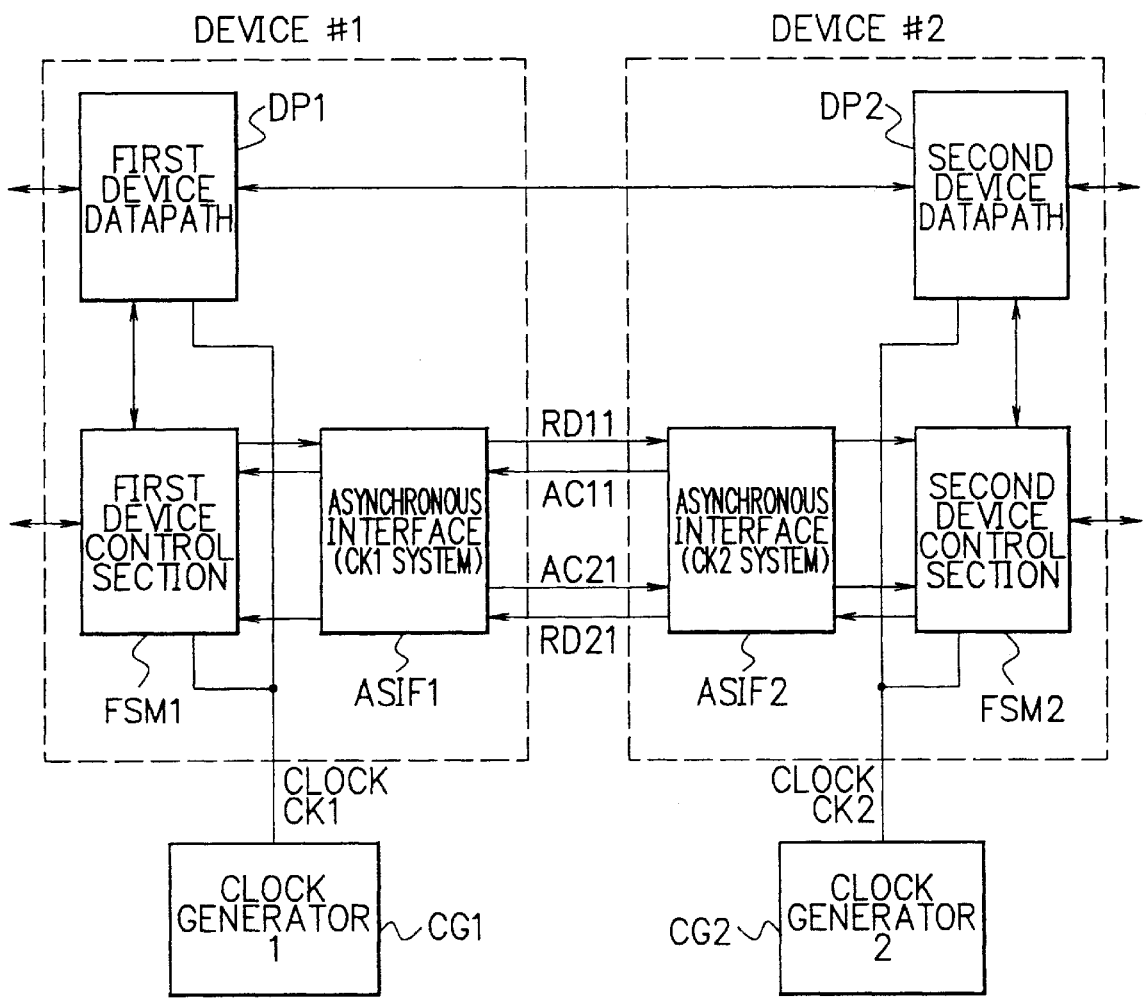
Figure 14:
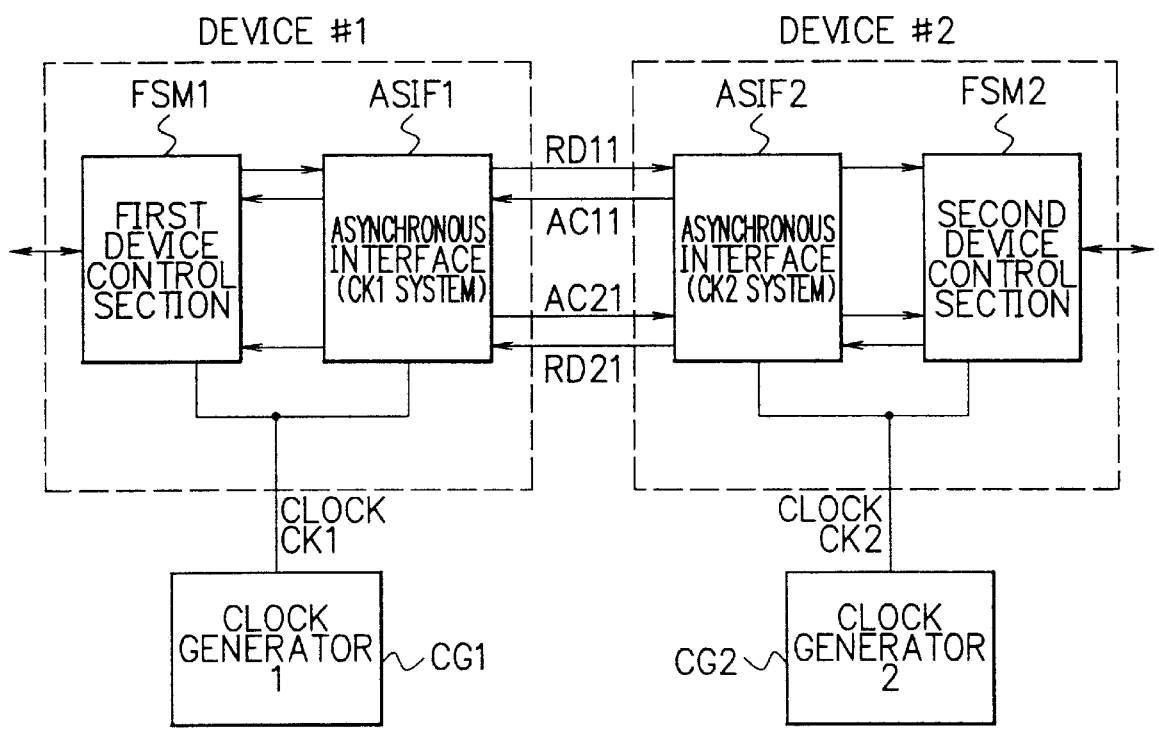

2 respectively and connected by four lines. FIGS. 13 and 14 are circuit diagrams showing such configurations, in which FIG. 13 shows a case where the two devices include datapaths and FIG. 14 shows a case where the two devices do not include datapaths.

Figure 15:
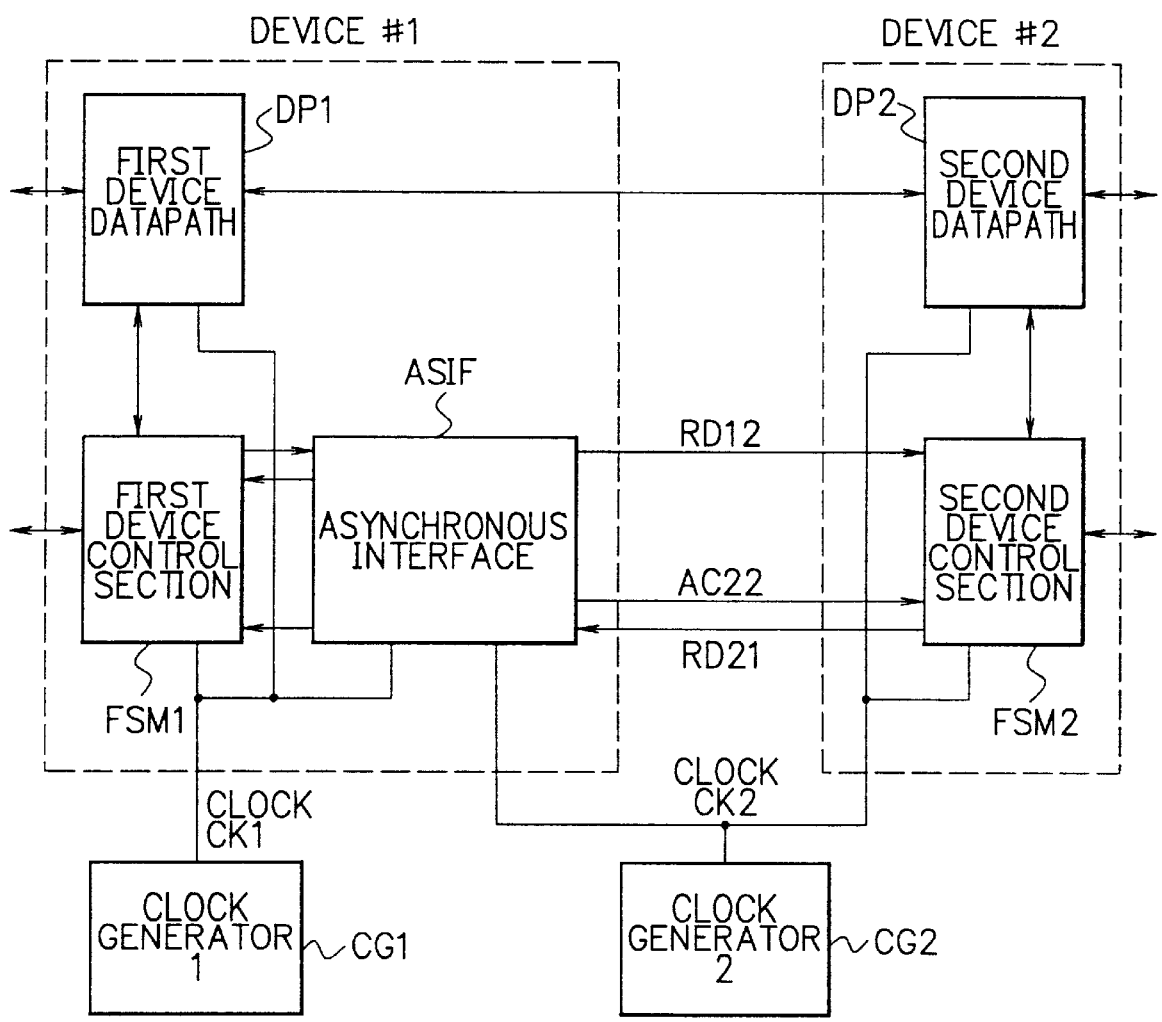
Figure 16:
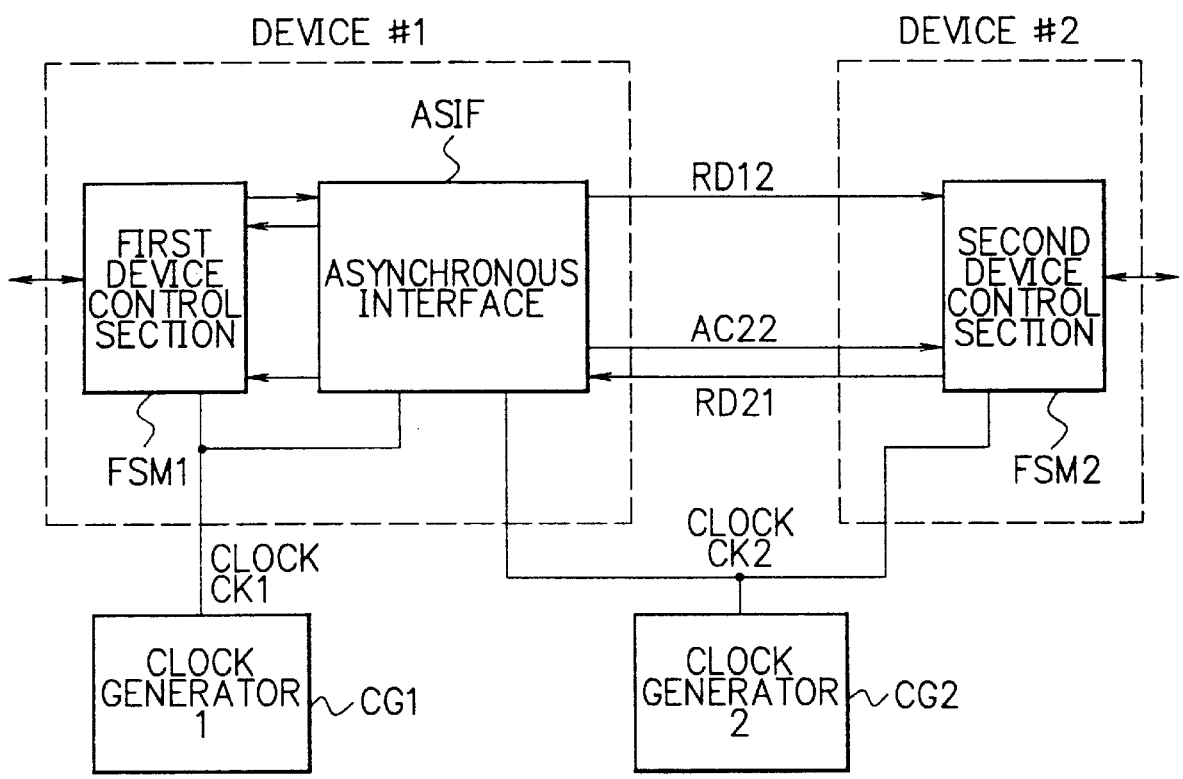

In the third configuration, the symmetric asynchronous interface circuit is included in a device so that the symmetric asynchronous interface circuit will be connected to the other device by three lines. FIGS. 15 and 16 are circuit diagrams showing such configurations, in which FIG. 15 shows a case where the two devices include datapaths and FIG. 16 shows a case where the two devices do not include datapaths.

Incidentally, the device (#1/#2) shown in FIG. 11 through FIG. 16 can be a semiconductor device, an LSI/IC, a macro-module in an LSI, etc.

In the following, the reason why the symmetric asynchronous interface circuit according to the present invention employs the delay circuits DL11 and DL21 and the pulse generation circuits P11 and P21 in addition to the circuit of the second conventional example will be explained, and how the symmetric asynchronous interface circuit of the present invention reduces the overhead time without causing malfunction in comparison with the second conventional symmetric asynchronous interface circuit will be described.

If we give consideration to the problems of the second conventional symmetric asynchronous interface circuit which have been described before, the overhead time in the case of the second conventional symmetric asynchronous interface circuit (in the second conventional example) gets longer when the number of transactions becomes large, that is, when the switching of the control right occurs frequently.

The frequency of the switching of the control right increases when data transfer time between the two devices becomes short, for example, when the transfer data band width between the two devices is very large and thus a large amount of data can be transferred in 1 clock cycle, or when the amount of transferred data is small and thus necessary data transfer can be finished within a few clock cycles (even if the transfer data band width is small).

The overhead time includes synchronizing time which is necessary for synchronizing asynchronous signals sent from the other device and idle cycle time for ensuring correct operation (during which a device can not output a READY signal since the other device is transmitting (activating) a READY signal). The synchronizing time is indispensable and can not be eliminated. However, it might not be impossible to eliminate the idle cycle time. The present invention has been made based on the idea.

If we simply omit the idle cycles (ST14, ST24), a device can freely output a READY signal when it finished its procedure (The state machines can be designed simply with a small number of items to be considered.) and the overhead time on each control right switching can be reduced (The processing speed can be increased.), however, malfunctions which will be described below occur due to overlap of double handshake (READY (device #1/#2)—ACKNOWLEDGE (device #2/#1) handshake and READY (device #1/#2)—READY (device #2/#1) handshake).

In the following, factors of the malfunctions will be explained in detail.

(1) First Malfunction

The handshake (READY-ACKNOWLEDGE) which determines the active period of the READY signal only considers the minimum margin (the active period of the READY signal) for synchronization. There are cases where the READY-ACKNOWLEDGE handshake is completed before the receiving side (a device that receives a READY signal) receives a READY signal and thereby the transmitting side (a device that is transmitting the READY signal) turns the READY signal inactive before the receiving side receives the READY signal. In such cases, the READY signal has already changed into inactive when the receiving side should refer to the READY signal (malfunction in the double handshake).

(2) Second Malfunction

Since active periods of the ACKNOWLEDGE signals are not taken into consideration, there is a possibility that signals concerning two transactions overlap with each other. There are cases where an ACKNOWLEDGE signal from a device concerning a previous transaction still remains active when a READY signal concerning the current transaction is outputted by the other device. In such cases, the active period of the READY signal concerning the current transaction can not be secured, and thus the READY signal might not be able to be received by the receiving side (lack of margin for synchronization).

Figure 3:
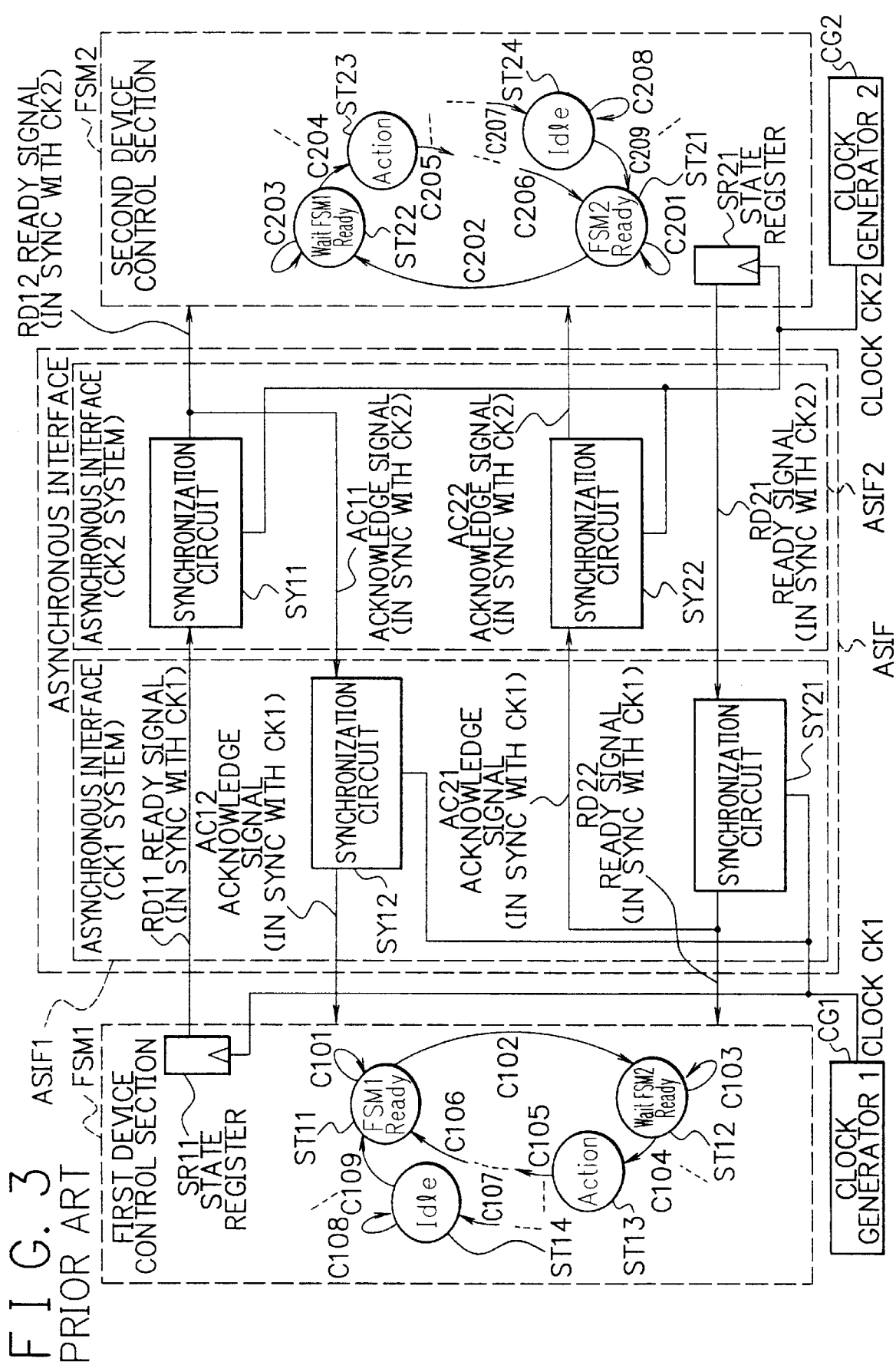
FIG. 3 is a circuit diagram showing a second example of a conventional symmetric asynchronous interface circuit.
Figure 4:
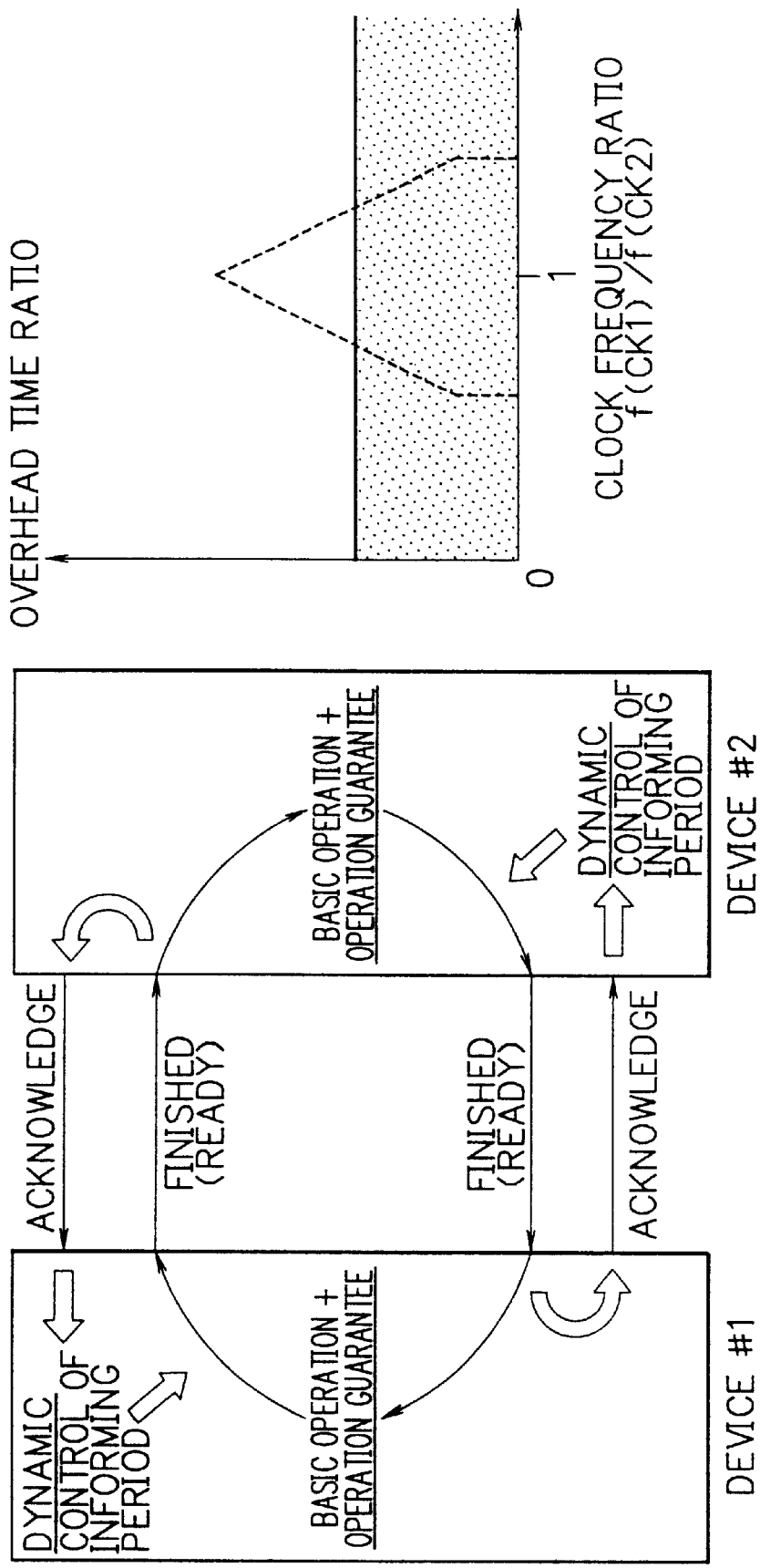
FIG. 4 is a schematic diagram showing the relationship between the clock frequency ratio and the overhead time ratio in the second conventional symmetric asynchronous interface circuit of FIG. 3.
Figure 17:
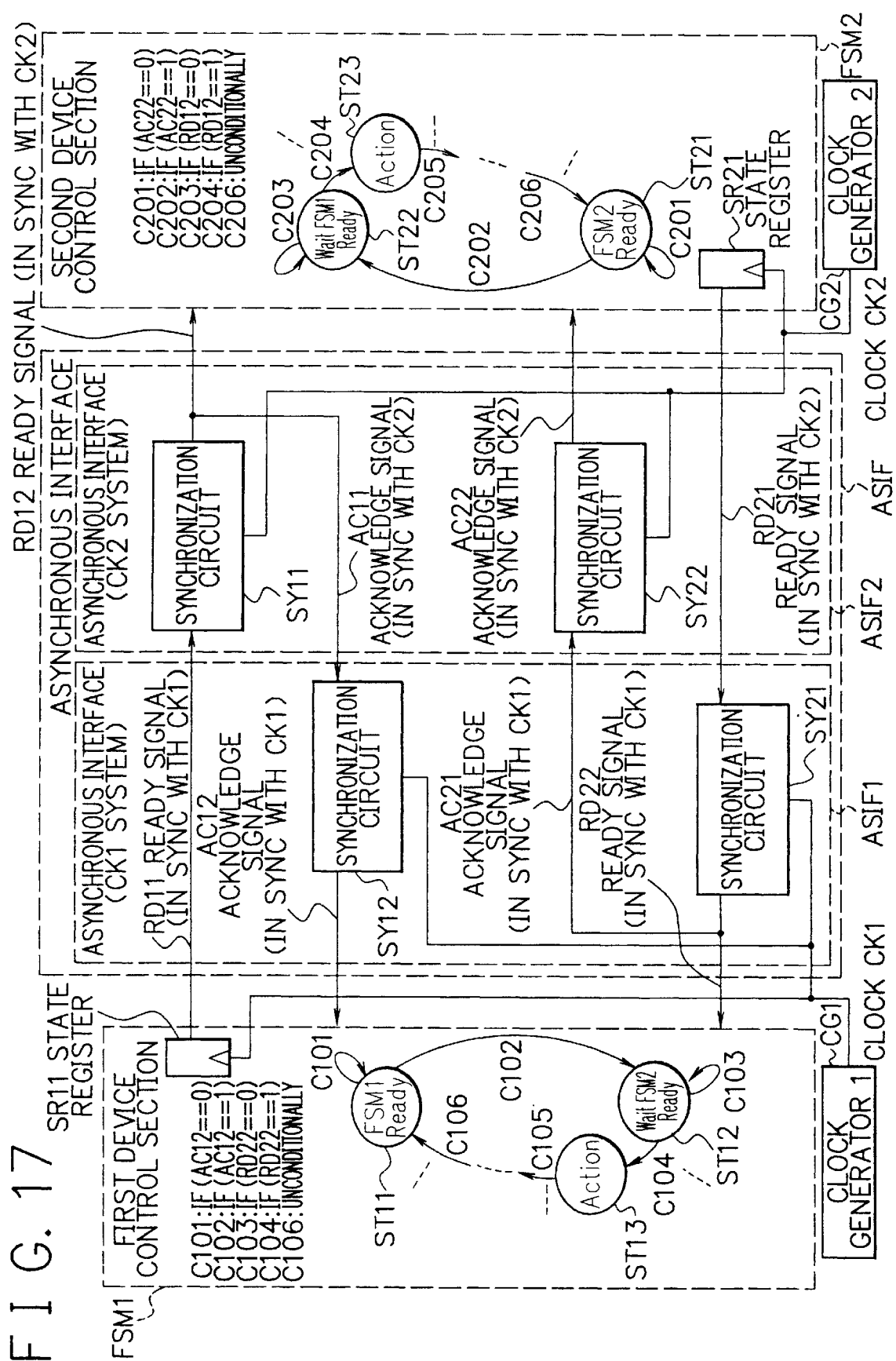
FIG. 17 is a circuit diagram showing a case where idle states ST14 and ST24 are omitted from the second conventional example of FIG. 3.
Figure 18:
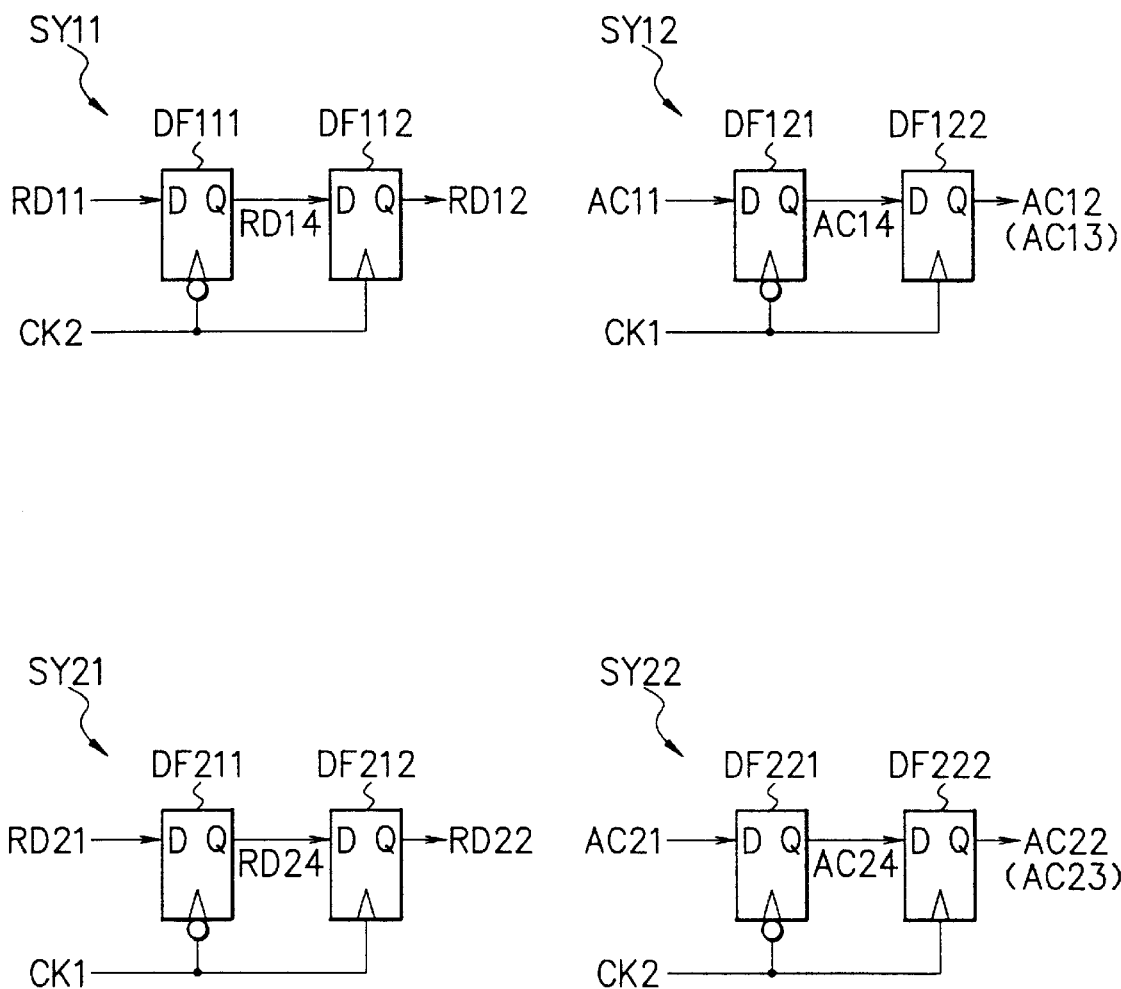
FIG. 18 is a circuit diagram showing synchronization circuits each of which is composed of two D-FFs.

In the following, the first malfunction in the case where the idle states ST14 and ST24 are omitted from the first device control section FSM1 and the second device control section FSM2 in the second conventional example will be explained. FIG. 17 is a circuit diagram (and a schematic diagram) showing the case where the idle states ST14 and ST24 are omitted from the second conventional example which has been shown in FIG. 3, and FIG. 18 is a circuit diagram showing synchronization circuits SY11, SY12, SY21 and SY22 each of which is composed of two D-FFs. The synchronization circuits SY11, SY12, SY21 and SY22 shown in FIG. 18 are employed in the symmetric asynchronous interface circuit shown in FIG. 17 and also employed in a symmetric asynchronous interface circuit according the present invention. In each synchronization circuit, the front D-FF is driven by a falling edge of the clock signal (CK1/CK2) and the rear D-FF is driven by a rising edge of the clock signal (CK1/CK2). By the latching of a signal by the two D-FFs (which are driven by the clock signal (CK1/CK2)) of the synchronization circuit, the signal can be used as a synchronized signal in the receiving side (i.e. in a device (#1/#2) that receives the signal), and thereby synchronized circuit design can be done normally without considering the asynchronous signals so much.

Basically, in design of a synchronized circuit, an input signal of a D-FF should not be changed during the setup-hold period of the D-FF. However, the input signal of the D-FF can change during the setup-hold period in the case of the asynchronous interface circuit. When the D-FF input signal changed during the setup-hold period, a glitch (noise) might occur in the output signal of the D-FF, thereby the output signal can be either 0 or 1 and the output value is not guaranteed (becomes stochastic). The glitch signal converges on a value 0 or 1 after a certain period (a metastable time), however, the converged value can either 0 or 1 and can not be predicted. In upper level design, the convergence of the D-FF is regarded as stochastic. The glitch signal can be eliminated by use of the two stages of D-FFs. Generally, the glitch signals are not taken into consideration in design of synchronized circuits, therefore, estimation of delay time of a D-FF in circuit design becomes impossible when the glitch signal occurs.

Figure 19:
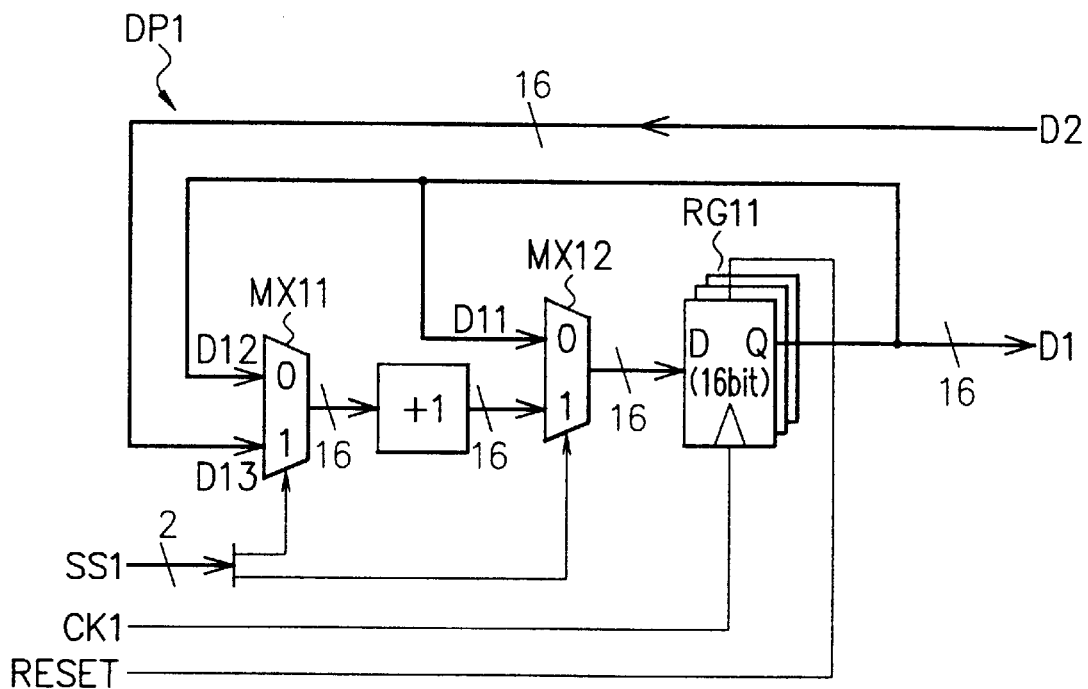
FIG. 19 is a circuit diagram showing a datapath of the first device.
Figure 20:
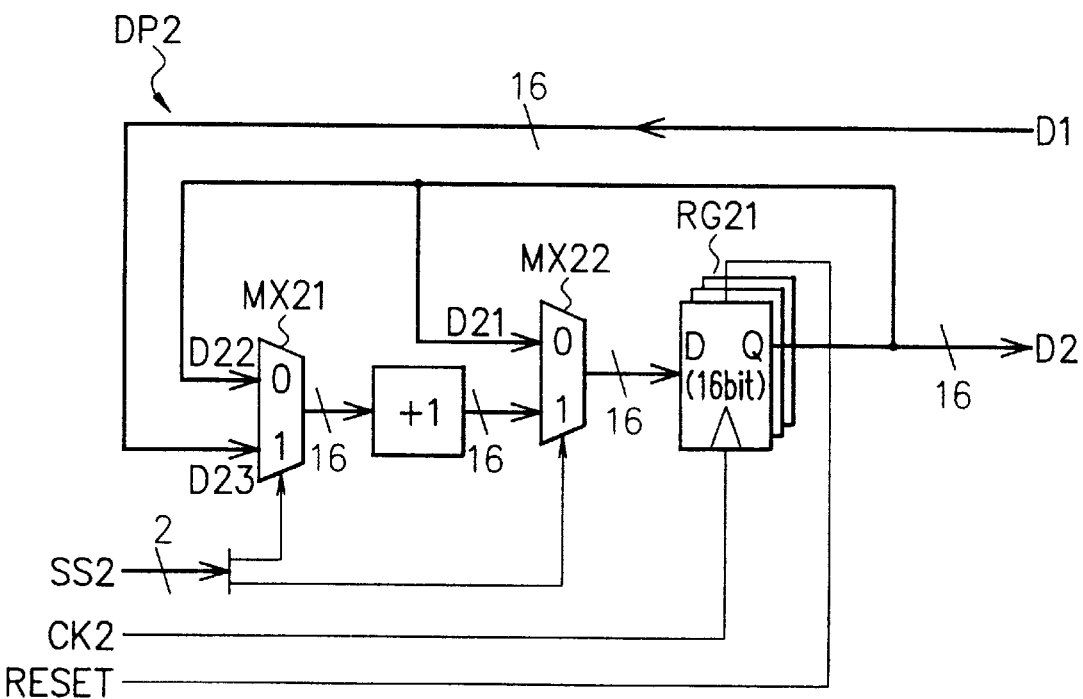
FIG. 20 is a circuit diagram showing a datapath of the second device.
Figure 21:
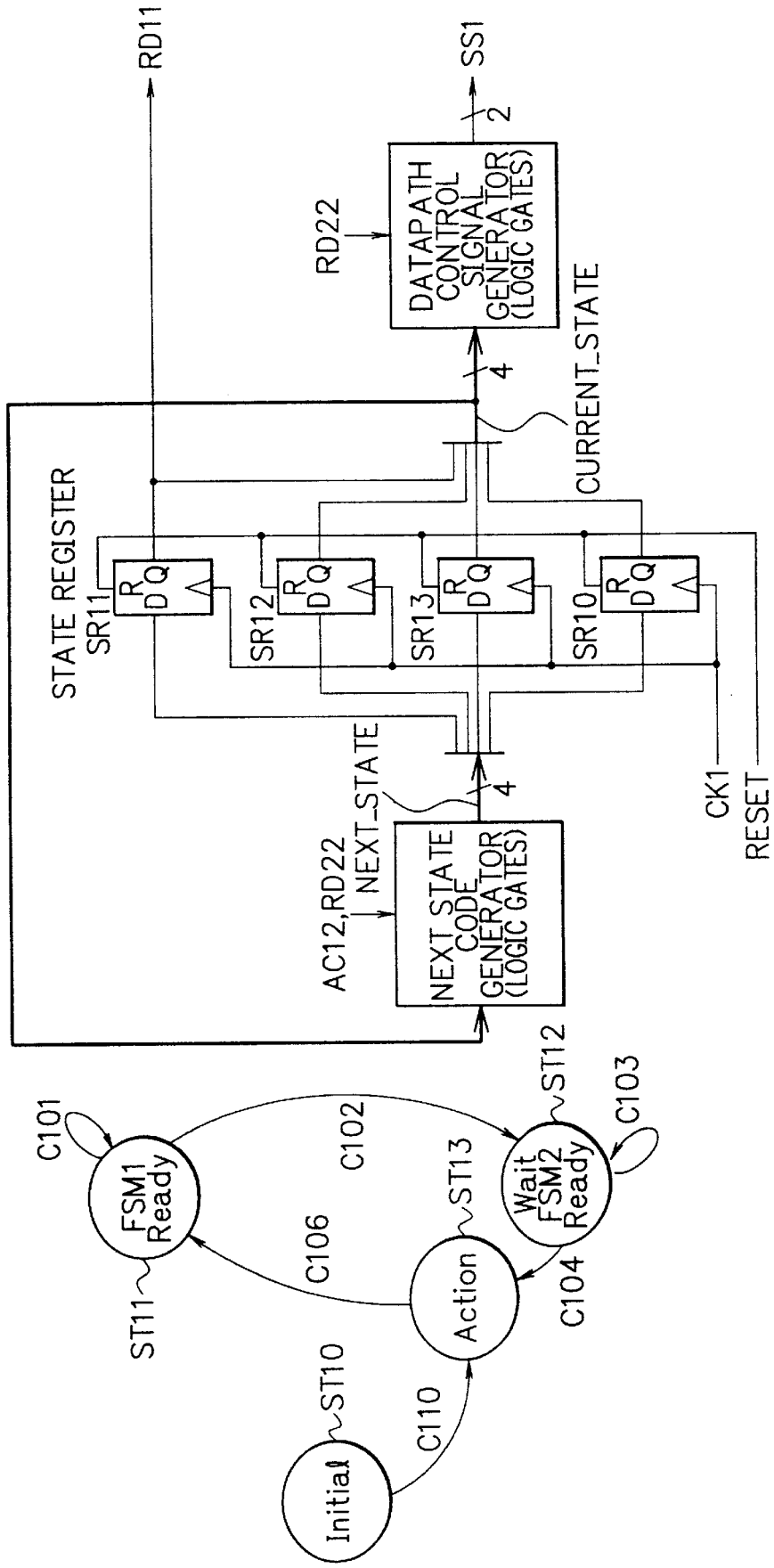
FIG. 21 is a schematic diagram showing state transitions and circuit composition of a state machine of the first device.
Figure 23:
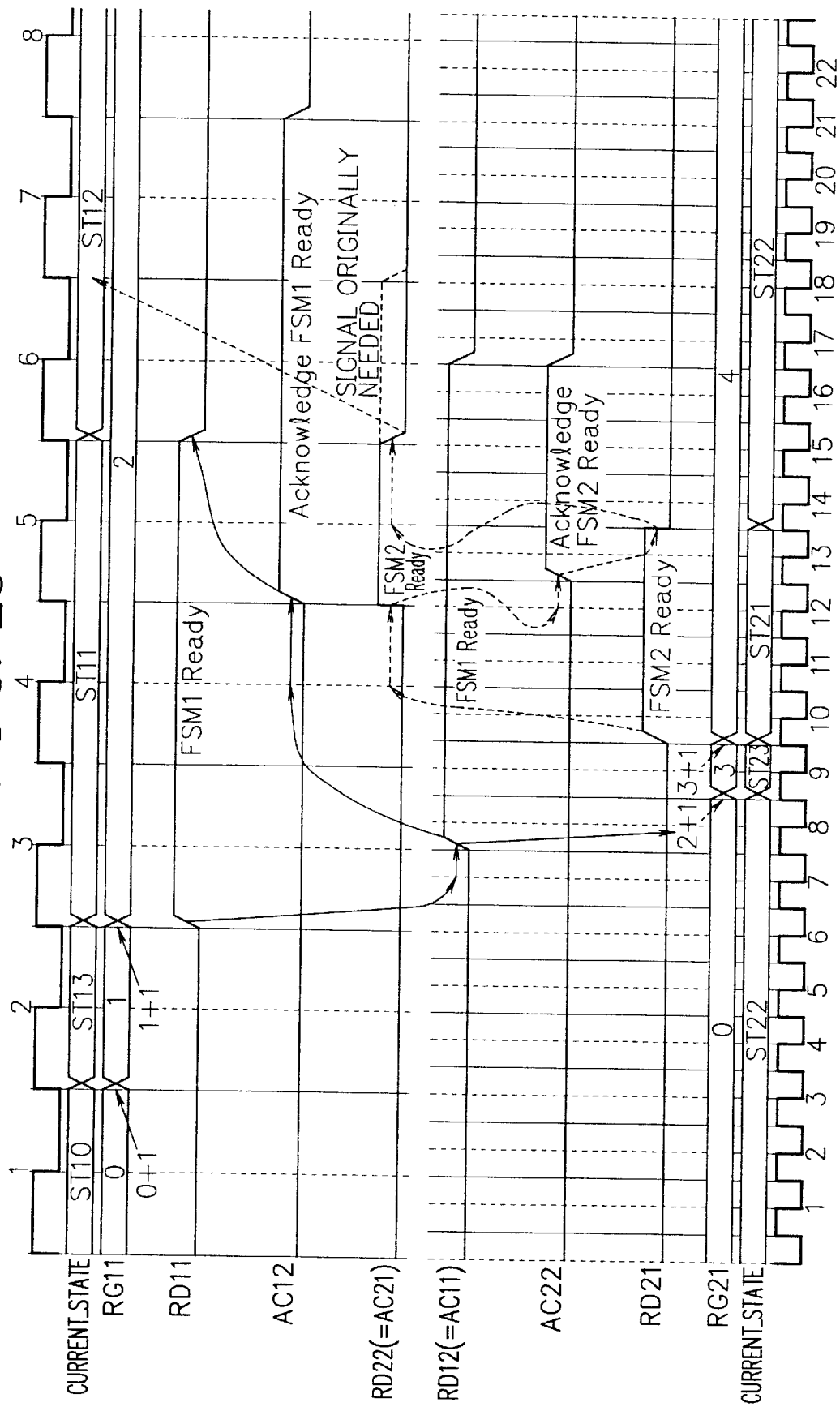
FIG. 23 is a timing chart showing a case where the circuit of FIG. 17 is employed and the clock frequency ratio f(CK1)/f(CK2) is 1/3 and the duty ratio is 50%, in which a first malfunction occurs.

In the following, the first malfunction in the case where the idle states ST14 and ST24 are omitted from the second conventional example) will be explained in detail referring to FIG. 17, taking a case where the two devices include datapaths as an example. In this example, each device (#1/#2) is a circuit which executes increment of a count register (RG11/RG21) of its datapath (DP1/DP2) by 1 twice per one switching of the control right. FIG. 19 is a circuit diagram showing a datapath DP1 of the first device #1, and FIG. 20 is a circuit diagram showing a datapath DP2 of the second device #2. FIG. 21 is a schematic diagram showing state transitions and circuit composition of the first device control section FSM1, and FIG. 22 is a schematic diagram showing state transitions and circuit composition of the second device control section FSM2. FIG. 23 is a timing chart showing a case where the clock frequency ratio f(CK1)/f(CK2) is 1/3 and the duty ratio is 50%. In the timing chart of FIG. 23, solid arrows indicate operations for transferring the control right from the device #1 to the device #2, and broken arrows indicate operations for transferring the control right from the device #2 to the device #1.

1. After an enough reset period, the first device control section FSM1 (Finite State Machine 1 (the control section of the first device #1)) is in an initial state ST10, and a register RG11 of the datapath DP1 shown in FIG. 19 holds a value 0.

2. Meanwhile, the second device control section FSM2 ((Finite State Machine 2 (the control section of the second device #2)) is in an initial state ST22, and a register RG21 of the datapath DP2 shown in FIG. 20 holds a value 0.

3. In the first cycle of the clock signal (CK1) of the first device #1, the value (0) which has been held by the count register RG11 shown in FIG. 19 is incremented by 1, and the incremented value (1) is written in the count register RG11.

4. At the same time, the first device control section FSM1 changes into the next state ST13.

5. In the second cycle of the clock signal (CK1), the value (1) which has been held by the count register RG11 shown in FIG. 19 is further incremented by 1, and the incremented value (2) is written in the count register RG11. At this point, procedure on the side of the first device #1 is ended.

6. The first device control section FSM1 changes into a state 11 for informing the second device #2 that the procedure of the first device #1 has been finished (i.e. that the first device #1 is ready).

7. In the third cycle of the clock signal (CK1), by the change of the first device control section FSM1 into the state ST11, a signal RD11 (a READY signal) for indicating the readiness of the first device #1 is changed into active (1).

8. In the seventh cycle of the clock signal (CK2) of the second device #2, a D-FF (DF111) of the synchronization circuit SY11 shown in FIG. 18 latches the activated signal RD11 in sync with a falling edge of the clock signal (CK2). The output of the D-FF (DF111) is a signal RD14 which is shown in FIG. 18.

9. Also in the seventh cycle of the clock signal (CK2), another D-FF (DF112) of the synchronization circuit SY11 shown in FIG. 18 further latches the signal RD14 of the step 8 in sync with a rising edge of the clock signal (CK2). The output of the D-FF (DF112) is supplied to the second device control section FSM2 as a signal RD12. The output of the D-FF (DF112) is also supplied to the synchronization circuit SY12 as an ACKNOWLEDGE signal AC11.

10. Now that the active READY signal RD11 (RD12) indicating the readiness of the first device #1 has been transferred to the second device #2, procedure on the side of the second device #2 can be started.

11. In the fourth cycle of the clock signal (CK1), a D-FF (DF121) of the synchronization circuit SY12 shown in FIG. 18 latches the activated ACKNOWLEDGE signal AC11 (=RD12) of the step 9 in sync with a falling edge of the clock signal (CK1), and thereby an output signal AC14 is obtained.

12. Also in the fourth cycle of the clock signal (CK1), another D-FF (DF122) of the synchronization circuit SY12 shown in FIG. 18 further latches the signal AC14 of the step 11 in sync with a rising edge of the clock signal (CK1). The output of the D-FF (DF122) is supplied to the first device control section FSM1 as a signal AC12.

13. The signal AC12 is a signal to be used for confirming that the activated READY signal RD11 of the step 7 could successfully be synchronized to the second device #2 which is driven by the clock signal (CK2). In the fifth cycle of the clock signal (CK1), by receiving the signal AC12, the first device control section FSM1 of the first device #1 changes from the state ST11 to a state ST12 for waiting for completion of procedure on the side of the second device #2. At the same time, the first device control section FSM1 changes the activated READY signal RD11 into inactive (0).

14. In the sixth cycle of the clock signal (CK1), the first device control section FSM1 in the state ST12 waits for an activated signal RD22 which indicates the readiness of the second device #2.

15. In the eighth cycle of the clock signal (CK2), the datapath DP2 of the second device #2 reads data D1 from the datapath DP1 of the first device #1. The data D1 (2) stored in the count register RG11 has been stable without changing since the third cycle of the clock signal (CK1), therefore, the datapath DP2 can obtain a correct value.

16. In the datapath DP2 which is shown in FIG. 20, the data D1 of the step 15 is incremented by 1, and the incremented data (3) is written in the count register RG21.

17. At the same time, the second device control section FSM2 of the second device #2 changes into the next state ST23.

18. In the ninth cycle of the clock signal (CK2), the value (3) which has been held by the count register RG21 shown in FIG. 20 is further incremented by 1, and the incremented value (4) is written in the count register RG21. At this point, procedure on the side of the second device #2 is ended.

19. The second device control section FSM2 changes into a state ST21 for informing the first device #1 that the procedure of the second device #2 has been finished (i.e. that the second device #2 is ready).

20. In the tenth cycle of the clock signal (CK2), by the change of the second device control section FSM2 into the state ST21, a signal RD21 for indicating the readiness of the second device #2 is changed into active (1).

21. In the fourth cycle of the clock signal (CK1), a D-FF (DF211) of the synchronization circuit SY21 shown in FIG. 18 latches the activated signal RD21 of the step 20 in sync with a falling edge of the clock signal (CK1), and thereby an output signal RD24 is obtained.

22. Also in the fourth cycle of the clock signal (CK1), another D-FF (DF212) of the synchronization circuit SY21 shown in FIG. 18 further latches the signal RD24 of the step 21 in sync with a rising edge of the clock signal (CK1). The output of the D-FF (DF212) is supplied to the first device control section FSM1 as the aforementioned signal RD22.

23. Normally, the first device #1 should be allowed to start its procedure since the active READY signal RD21 (RD22) indicating the readiness of the second device #2 has been transferred to the first device #1. However, the READY-ACKNOWLEDGE handshake of the step 13 with respect to the READY signal RD11 outputted by the first device #1 has not been completed at this point, therefore, the first device #1 (which still remains in the state ST11) can not execute detection of the activated READY signal RD22 and start its procedure at this point. The actual detection of the activated READY signal RD22 is postponed to the next clock cycle. The postponement is 1 clock cycle at worst, since the following inequalities hold: (the time when the activated signal AC11 (RD12) is outputted)<(the time when the activated signal RD21 is outputted), therefore, (the time when the activated signal AC11 is synchronized by the synchronization circuit SY12)≦(the time when the activated signal RD21 is synchronized by the synchronization circuit SY21), that is, (the time when the activated signal AC12 is outputted) ≦(the time when the activated signal RD22 is outputted).

24. In the twelfth cycle of the clock signal (CK2), the change of the signal RD22 (AC21) of the step 22 occurs on a falling edge of the clock signal (CK2), that is, during the setup-hold period of the D-FF (DF221) of the synchronization circuit SY22, therefore, the output value of the D-FF (DF221) becomes stochastic. In this example, it is assumed that the D-FF (DF221) has detected the signal change correctly and the output signal of the D-FF (DF221) has converged on 1.

25. Since the output signal (AC24) of the D-FF (DF221) of the step 24 involves time for conversion, the output signal is further latched by another D-FF (DF222) of the synchronization circuit SY22 in sync with a rising edge of the clock signal (CK2) so as to be able to be used in the second device #2. The output of the D-FF (DF222) is supplied to the second device control section FSM2 as a signal AC22.

26. The signal AC22 is a signal to be used for confirming that the activated READY signal RD21 of the step 20 could successfully be synchronized to the second device #1 which is driven by the clock signal (CK1). By receiving the signal AC22, the second device control section FSM2 of the second device #2 changes from the state ST21 to the state ST22 for waiting for completion of procedure on the side of the first device #1.

27. In the fourteenth cycle of the clock signal (CK2), the second device control section FSM2 in the state ST22 waits for the signal RD12 indicating the readiness of the first device #1 to turn active (1).

28. By the change of the second device control section FSM2 into the state ST22, the signal RD21 which has been turned active in the step 20 is changed into inactive (0).

29. In the fifth cycle of the clock signal (CK1), the change of the signal RD21 of the step 28 occurs on a falling edge of the clock signal (CK1), that is, during the setup-hold period of the D-FF (DF211) of the synchronization circuit SY21, therefore, the output value of the D-FF (DF211) becomes stochastic. In this example, it is assumed that the D-FF (DF211) has detected the signal change correctly and the output signal of the D-FF (DF2-11) has converged on 0.

30. Since the output signal (RD24) of the D-FF (DF211) of the step 29 involves time for conversion, the output signal is further latched by another D-FF (DF212) of the synchronization circuit SY21 in sync with a rising edge of the clock signal (CK1) so as to be able to be used in the first device #1. The output of the D-FF (DF212) is supplied to the first device control section FSM1 as the signal RD22.

31. In the sixth cycle of the clock signal (CK1), the first device #1 ought to wait for readiness of the second device #2, however, the READY signal RD22 for indicating the readiness of the second device #2 which turned active in the fifth cycle of the clock signal (CK1) has already turned inactive at the point of the sixth cycle. Therefore, both the first device #1 and the second device #2 keep on waiting for a READY signal from the other device, and fall in a state of deadlock. Such an accident (i.e. the first malfunction) occurs under certain clock frequency ratios f(CK1)/f(CK2). The first malfunction occurs, because there is a case where ((the time when the synchronized ACKNOWLEDGE signal AC12 reaches the first device control section FSM1)=(the time when the synchronized READY signal RD22 reaches the first device control section FSM1)) and thus there is a possibility that the state machine (the first device control section FSM1) postpones the detection of the activated READY signal (RD22) and the start of its procedure by 1 clock cycle as described in the step 23. In the case of FIG. 23, when the first device control section FSM1 tries to detect the activated READY signal RD22 in the next clock cycle, the READY signal RD22 has already turned inactive (0) (as a result of fast signal transfer shown by broken arrows in FIG. 23 due to a particular clock frequency ratio f(CK1)/f (CK2)), thereby the first device control section FSM1 will remain in the step ST12, and thus the deadlock state is caused. Therefore, for the purpose of guaranteeing the double handshake (READY (RD11)—ACKNOWLEDGE (AC12), READY (RD11)—READY (RD22)), the second conventional example of FIG. 3 (employing the idle states ST14 and ST24 for preventing the overlap between the handshakes) is one solution.

Figure 24:
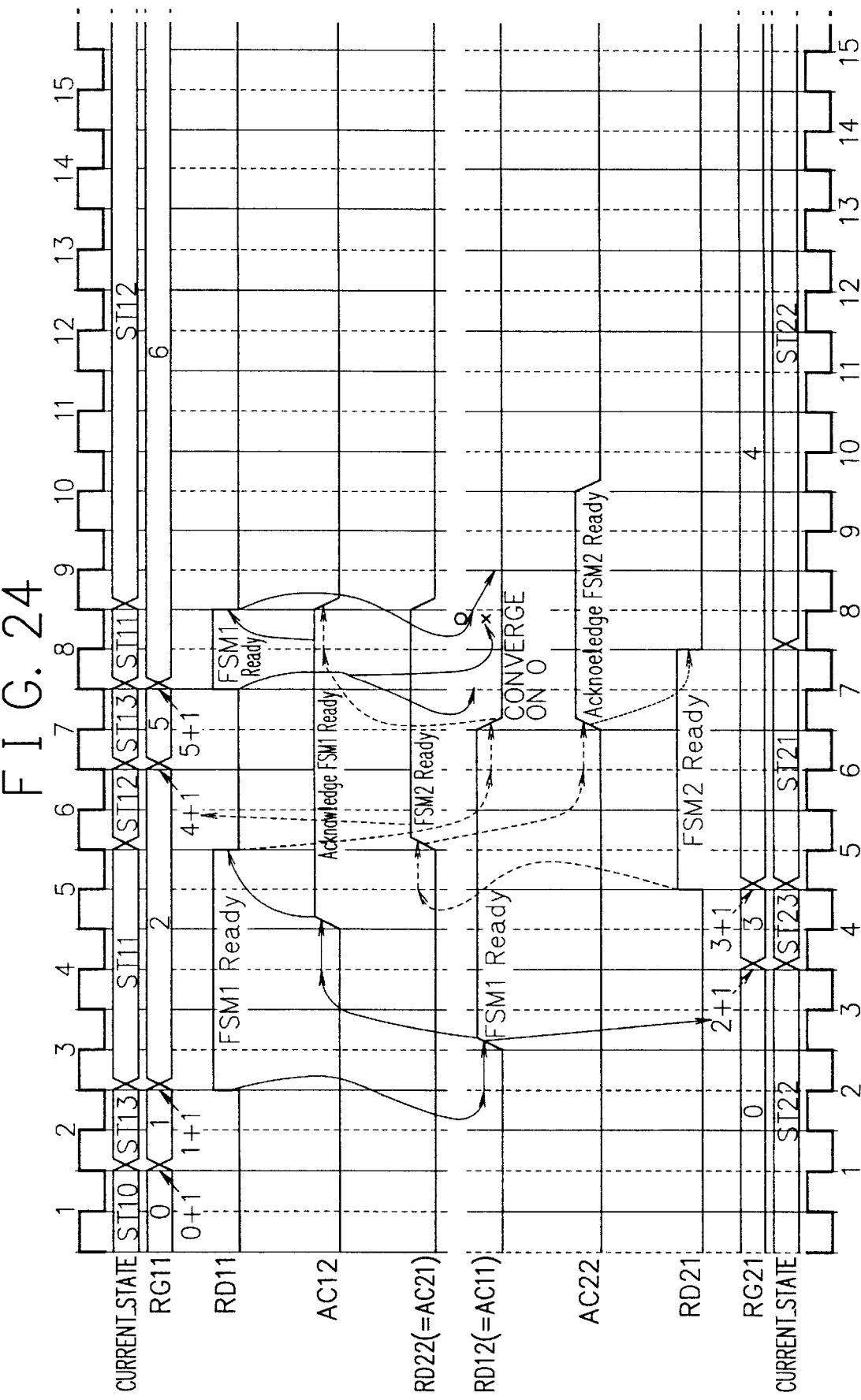
FIG. 24 is a timing chart showing a case where the circuit of FIG. 17 is employed and the clock frequency ratio f(CK1)/f(CK2) is 1/1, the phase difference θ(CK2)–θ(CK1) is π, and the duty ratio is 50%, in which a second malfunction occurs.

In the following, the second malfunction in the case where the idle state ST14 and ST24 are omitted from the second conventional example will be explained in detail referring to FIG. 17 and FIG. 24. FIG. 24 is a timing chart showing a case where the clock frequency ratio f(CK1)/f(CK2) is 1/1, the phase difference θ(CK2)–θ(CK1) is π, and the duty ratio is 50%.

1. After an enough reset period, the first device control section FSM1 of the first device #1 is in an initial state ST10, and a register RG11 of the datapath DP1 shown in FIG. 19 holds a value 0.

2. Meanwhile, the second device control section FSM2 of the second device #2 is in an initial state ST22, and a register RG21 of the datapath DP2 shown in FIG. 20 holds a value 0.

3. In the first cycle of the clock signal (CK1) of the first device #1, the value (0) which has been held by the count register RG11 shown in FIG. 19 is incremented by 1, and the incremented value (1) is written in the count register RG11.

4. At the same time, the first device control section FSM1 changes into the next state ST13.

5. In the second cycle of the clock signal (CK1), the value (1) which has been held by the count register RG11 shown in FIG. 19 is further incremented by 1, and the incremented value (2) is written in the count register RG11. At this point, procedure on the side of the first device #1 is ended.

6. The first device control section FSM1 changes into a state 11 for informing the second device #2 that the procedure of the first device #1 has been finished (i.e. that the first device #1 is ready).

7. In the third cycle of the clock signal (CK1), by the change of the first device control section FSM1 into the state ST11, a signal RD11 (a READY signal) for indicating the readiness of the first device #1 is changed into active (1).

8. In the second cycle of the clock signal (CK2) of the second device #2, the change of the signal RD11 of the step 7 occurs on a falling edge of the clock signal (CK2), that is, during the setup-hold period of the D-FF (DF111) of the synchronization circuit SY11, therefore, the output value of the D-FF (DF111) becomes stochastic. In this example, it is assumed that the D-FF (DF111) has detected the signal change correctly and the output signal of the D-FF (DF111) has converged on 1.

9. Also in the second cycle of the clock signal (CK2) of the second device #2, since the output signal (RD14) of the D-FF (DF111) of the step 8 involves time for conversion, the output signal is further latched by another D-FF (DF112) of the synchronization circuit SY11 in sync with a rising edge of the clock signal (CK2) so as to be able to be used in the second device #2. The output of the D-FF (DF112) is supplied to the second device control section FSM2 as a READY signal RD12, and is also supplied to the synchronization circuit SY12 as an ACKNOWLEDGE signal AC11.

10. Now that the active READY signal RD11 (RD12) indicating the readiness of the first device #1 has been transferred to the second device #2, procedure on the side of the second device #2 can be started.

11. In the fourth cycle of the clock signal (CK1), a D-FF (DF121) of the synchronization circuit SY12 shown in FIG. 18 latches the activated ACKNOWLEDGE signal AC11 (=RD12) of the step 9 in sync with a falling edge of the clock signal (CK1), and thereby an output signal AC14 is obtained.

12. Also in the fourth cycle of the clock signal (CK1), another D-FF (DF122) of the synchronization circuit SY12 shown in FIG. 18 further latches the signal AC14 of the step 11 in sync with a rising edge of the clock signal (CK1). The output of the D-FF (DF122) is supplied to the first device control section FSM1 as a signal AC12.

13. The signal AC12 is a signal to be used for confirming that the activated READY signal RD11 of the step 7 could successfully be synchronized to the second device #2 which is driven by the clock signal (CK2). In the fifth cycle of the clock signal (CK1), by receiving the signal AC12, the first device control section FSM1 of the first device #1 changes from the state ST11 to a state ST12 for waiting for completion of procedure on the side of the second device #2. At the same time, the first device control section FSM1 changes the activated READY signal RD11 into inactive (0).

14. In the sixth cycle of the clock signal (CK1), the first device control section FSM1 in the state ST12 waits for an activated signal RD22 which indicates the readiness of the second device #2.

15. In the third cycle of the clock signal (CK2), the datapath DP2 of the second device #2 reads data D1 from the datapath DP1 of the first device #1. The data D1 (2) stored in the count register RG11 has been stable without changing since the third cycle of the clock signal (CK1), therefore, the datapath DP2 can obtain a correct value.

16. In the datapath DP2 shown in FIG. 20, the data D1 of the step 15 is incremented by 1, and the incremented data (3) is written in the count register RG21.

17. At the same time, the second device control section FSM2 of the second device #2 changes into the next state ST23.

18. In the fourth cycle of the clock signal (CK2), the value (3) which has been held by the count register RG21 shown in FIG. 20 is further incremented by 1, and the incremented value (4) is written in the count register RG21. At this point, procedure on the side of the second device #2 is ended.

19. The second device control section FSM2 changes into a state ST21 for informing the first device #1 that the procedure of the second device #2 has been finished (i.e. that the second device #2 is ready).

20. In the fifth cycle of the clock signal (CK2), by the change of the second device control section FSM2 into the state ST21, a signal RD21 for indicating the readiness of the second device #2 is changed into active (1).

21. In the fifth cycle of the clock signal (CK1), the change of the signal RD21 of the step 20 occurs on a falling edge of the clock signal (CK1), that is, during the setup-hold period of the D-FF (DF211) of the synchronization circuit SY21, therefore, the output value of the D-FF (DF211) becomes stochastic. In this example, it is assumed that the D-FF (DF211) has detected the signal change correctly and the output signal of the D-FF (DF211) has converged on 1.

22. Also in the fifth cycle of the clock signal (CK1), since the output signal (RD24) of the D-FF (DF211) of the step 21 involves time for conversion, the output signal is further latched by another D-FF (DF212) of the synchronization circuit SY21 in sync with a rising edge of the clock signal (CK1) so as to be able to be used in the first device #1. The output of the D-FF (DF212) is supplied to the first device control section FSM1 as the signal RD22. The output of the D-FF (DF212) is also supplied to the synchronization circuit SY22 as an ACKNOWLEDGE signal AC21 (=RD22).

23. Now that the active READY signal RD21 (RD22) indicating the readiness of the second device #2 has been transferred to the first device #1, procedure on the side of the first device #1 can be started.

24. In the sixth cycle of the clock signal (CK2), a D-FF (DF221) of the synchronization circuit SY22 shown in FIG. 18 latches the activated signal AC21 of the step 22 in sync with a falling edge of the clock signal (CK2), and thereby an output signal AC24 is obtained.

25. Also in the sixth cycle of the clock signal (CK2), another D-FF (DF222) of the synchronization circuit SY22 shown in FIG. 18 further latches the signal AC24 of the step 21 in sync with a rising edge of the clock signal (CK2), thereby a signal AC22 is obtained as the output of the D-FF (DF222).

26. The signal AC22 is a signal to be used for confirming that the activated READY signal RD21 of the step 20 could successfully be synchronized to the first device #1 which is driven by the clock signal (CK1). By receiving the signal AC22, the second device control section FSM2 of the second device #2 changes from the state ST21 to the state ST22 for waiting for completion of procedure on the side of the first device #1.

27. In the eighth cycle of the clock signal (CK2), the second device control section FSM2 in the state ST22 waits for the signal RD12 indicating the readiness of the first device #1 to turn active (1).

28. In the sixth cycle of the clock signal (CK1), the datapath DP1 of the first device #1 reads data D2 from the datapath DP2 of the second device #2. The data D2 (4) stored in the count register RG21 has been stable without changing since the fifth cycle of the clock signal (CK2), therefore, the datapath DP1 can obtain a correct value.

29. In the datapath DP1 shown in FIG. 19, the data D2 of the step 28 is incremented by 1, and the incremented data (5) is written in the count register RG11.

30. At the same time, the first device control section FSM1 of the first device #1 changes into the next state ST13.

31. In the seventh cycle of the clock signal (CK1), the value (5) which has been held by the count register RG11 shown in FIG. 19 is further incremented by 1, and the incremented value (6) is written in the count register RG11. At this point, procedure on the side of the first device #1 is ended.

32. The first device control section FSM1 changes into the state ST11 for informing the second device #2 that the (second) procedure of the first device #1 has been finished (i.e. that the first device #1 is ready).

33. In the eighth cycle of the clock signal (CK1), by the change of the first device control section FSM1 into the state ST11, the signal RD11 for indicating the (second) readiness of the first device #1 is changed into active (1).

34. In the seventh cycle of the clock signal (CK2), the change of the signal RD11 of the step 33 occurs on a falling edge of the clock signal (CK2), that is, during the setup-hold period of the D-FF (DF111) of the synchronization circuit SY11, therefore, the output value of the D-FF (DF111) becomes stochastic. In this example, it is assumed that the D-FF (DF111) could not detect the signal change correctly and the output signal of the D-FF (DF111) has converged on 0. In this case, change of the output signal of the D-FF (DF111) into 1 is postponed to the next clock cycle.

35. In the eighth cycle of the clock signal (CK1), the ACKNOWLEDGE signal AC12 for turning the first READY signal RD11 inactive (0) still remains active (1). Therefore, the first device control section FSM1 accidentally turns the second READY signal RD11 (which turned active in the step 33) inactive (0) and changes into the state ST12, and thus the READY-ACKNOWLEDGE handshake can not operate normally. The ACKNOWLEDGE signal AC12 will be turned inactive (0) in the ninth cycle of the clock signal (CK1).

A process in which the ACKNOWLEDGE signal AC12 is turned inactive is shown in FIG. 24 by broken (dotted) arrows. The ACKNOWLEDGE signal AC12 is turned inactive as follows:

In the fifth cycle of the clock signal (CK2), the change of the first READY signal RD11 from active into inactive (step 13) occurs on a falling edge of the clock signal (CK2), that is, during the setup-hold period of the D-FF (DF111) of the synchronization circuit SY11, therefore, the output value of the D-FF (DF111) becomes stochastic. In this example, it is assumed that the D-FF (DF111) could not detect the signal change correctly and the output signal of the D-FF (DF111) has converged on 1. In this case, change of the output signal of the D-FF (DF111) into 0 is postponed to the next clock cycle.

In the sixth cycle of the clock signal (CK2), the change of the first READY signal RD11 into inactive (which could not be detected in the fifth cycle of the clock signal (CK2)) is detected and latched by the D-FF (DF111) in sync with a falling edge of the clock signal (CK2), and thereby the output signal RD14 is obtained.

Also in the sixth cycle of the clock signal (CK2), another D-FF (DF112) of the synchronization circuit SY11 further latches the signal RD14 in sync with a rising edge of the clock signal (CK2). The output of the D-FF (DF112) is supplied to the second device control section FSM2 as the signal RD12 (inactive (0)), and is also supplied to the synchronization circuit SY12 as the signal AC11 (inactive (0)).

In the eighth cycle of the clock signal (CK1), the signal AC11 which has changed into inactive (0) is latched by the D-FF (DF121) of the synchronization circuit SY12 in sync with a falling edge of the clock signal (CK1), and thereby the output signal AC14 is obtained.

Also in the eighth cycle of the clock signal (CK1), another D-FF (DF122) of the synchronization circuit SY12 further latches the signal RD14 in sync with a rising edge of the clock signal (CK1). The output of the D-FF (DF122) is supplied to the first device control section FSM1 as the signal AC12 (inactive (0)). By the operation described above, the ACKNOWLEDGE signal AC12 becomes inactive (0) in the ninth cycle of the clock signal (CK1).

36. As mentioned before, in the ninth cycle of the clock signal (CK1), by the change of the first device control section FSM1 into the state ST12, the second READY signal RD11 is turned inactive (0).

37. The first device control section FSM1 in the state ST12 keeps waiting for the signal RD22 (indicating the readiness of the second device #2) to turn active again.

38. In the eighth cycle of the clock signal (CK2), intrinsically, the D-FF (DF111) of the synchronization circuit SY11 ought to latch and synchronize the signal RD11 which has changed into active (1) (the change was postponed to the next clock cycle in the step 34) in sync with a falling edge of the clock signal (CK2). However, the signal RD11 has already turned inactive (0) in the step 36. The change of the signal RD11 occurs during the setup-hold period of the D-FF (DF111), and thus the output of the D-FF (DF111) might converges on 0. Therefore, there is a possibility that the change of the second READY signal RD11 into active (1) is not detected by the second device control section FSM2 at all. As a result, both the first device #1 and the second device #2 keep on waiting for a READY signal from the other device, and fall in a state of deadlock. The second malfunction occurs, since handshaking signals for the double handshake (READY-READY, READY-ACKNOWLEDGE) overlap and thereby handshaking signals with respect to two transactions also overlap. The second conventional example of FIG. 3 (employing the idle states ST14 and ST24 for preventing the overlap between the handshakes) is also one solution of the second malfunction.

Figure 25:
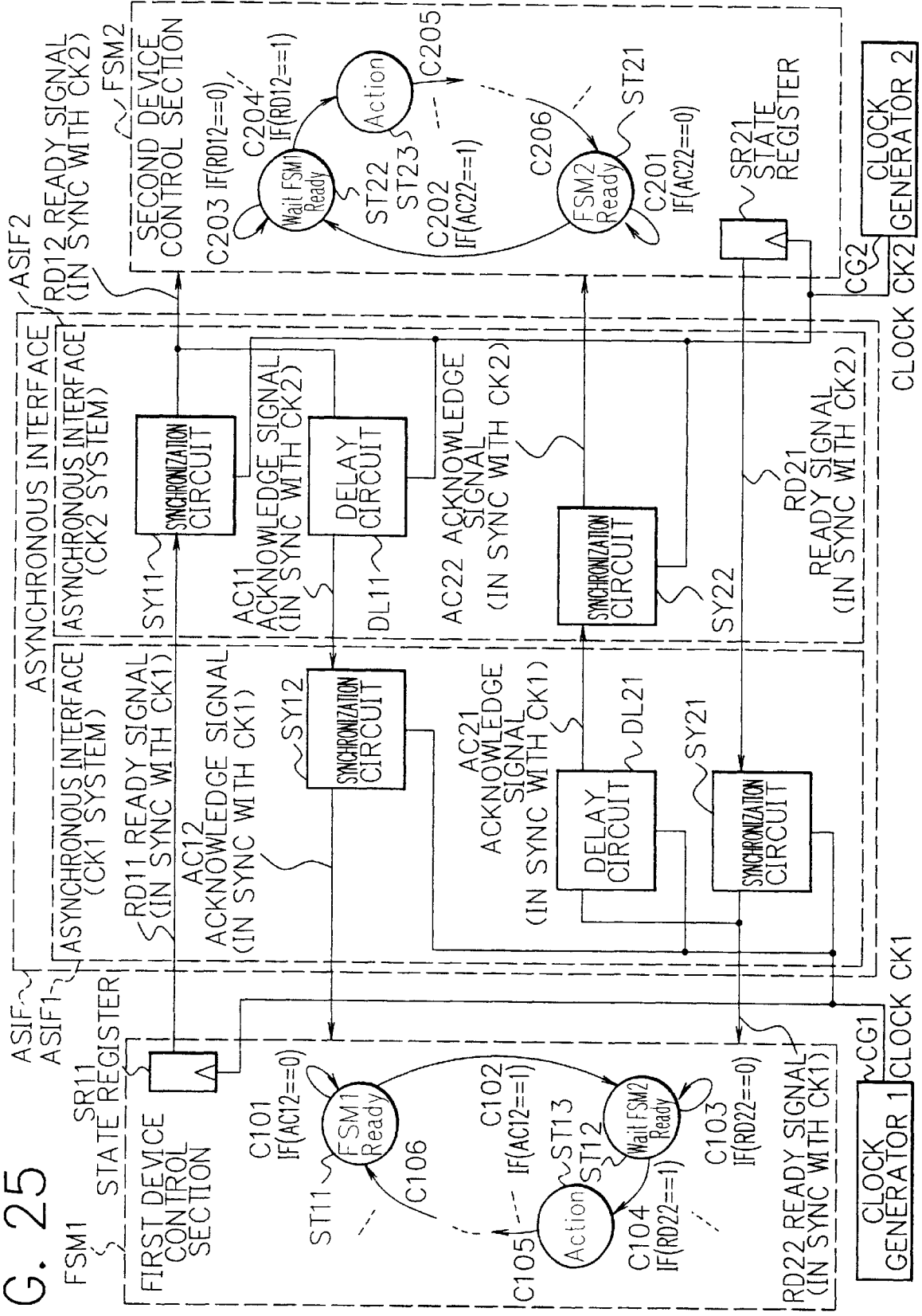
FIG. 25 is a circuit diagram showing another symmetric asynchronous interface circuit which is realized by adding 1-clock delay circuits to the symmetric asynchronous interface circuit shown in FIG. 17.
Figure 26:
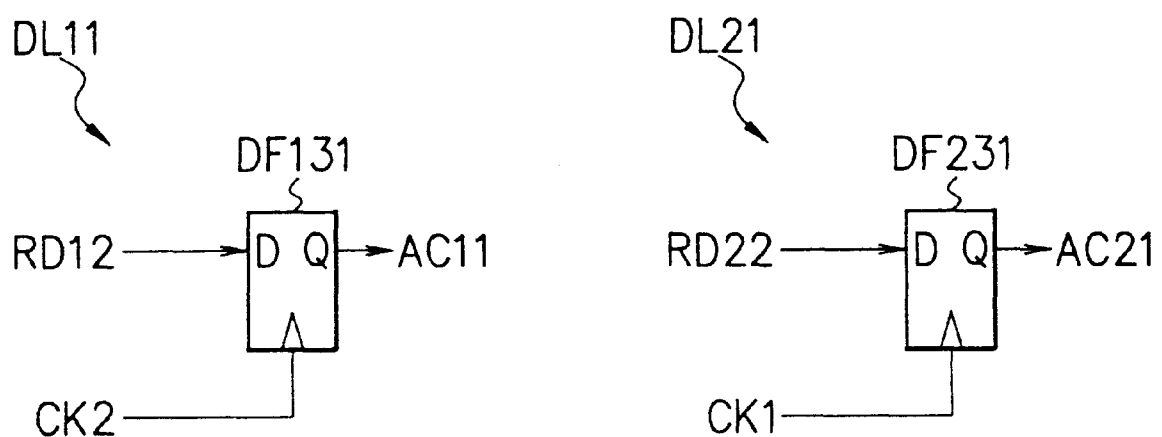
FIG. 26 is a circuit diagram showing the 1-clock delay circuits.
Figure 27:
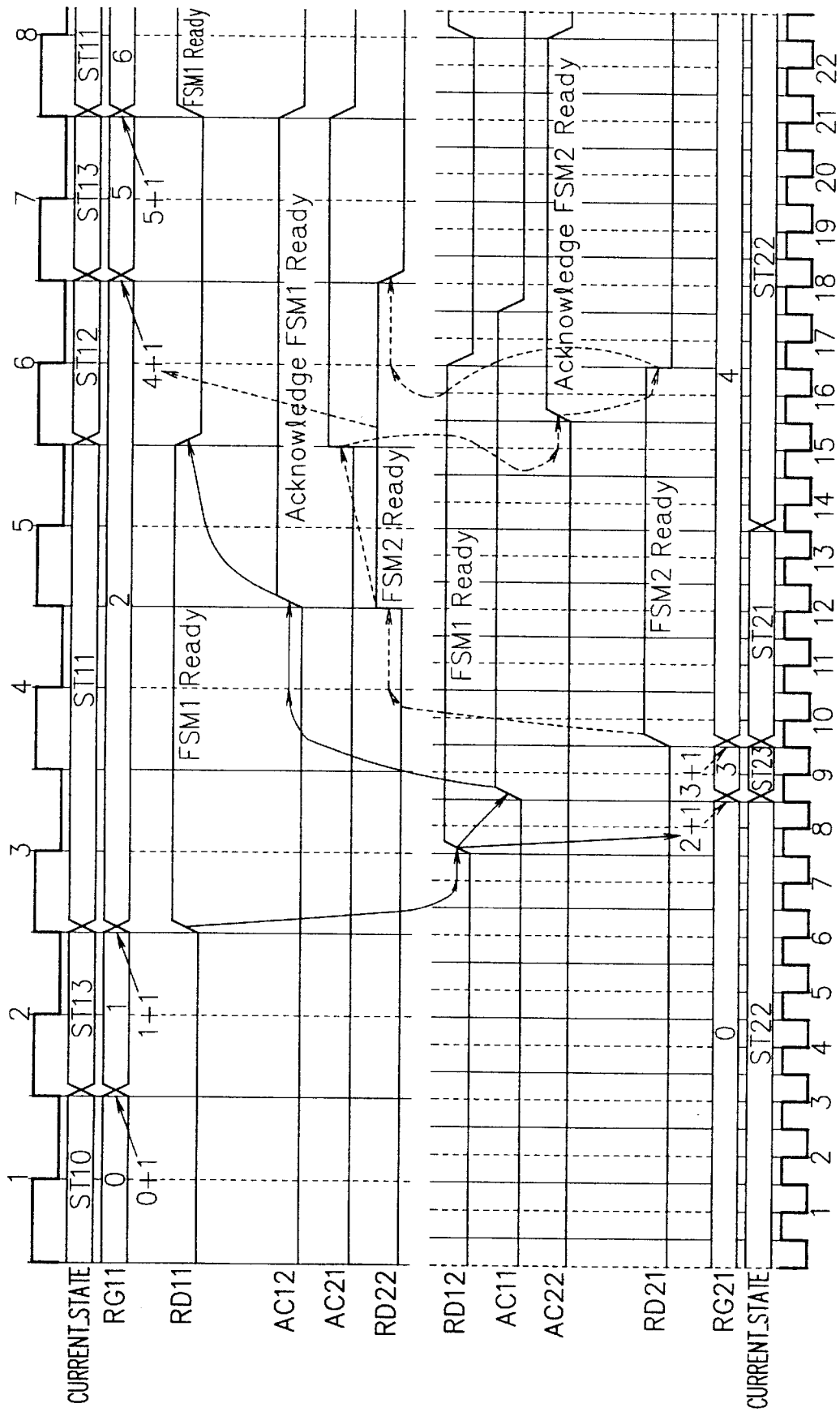
FIG. 27 is a timing chart showing a case where the circuit of FIG. 25 is employed and the clock frequency ratio f(CK1)/f(CK2) is 1/3 and the duty ratio is 50%.
Figure 28:
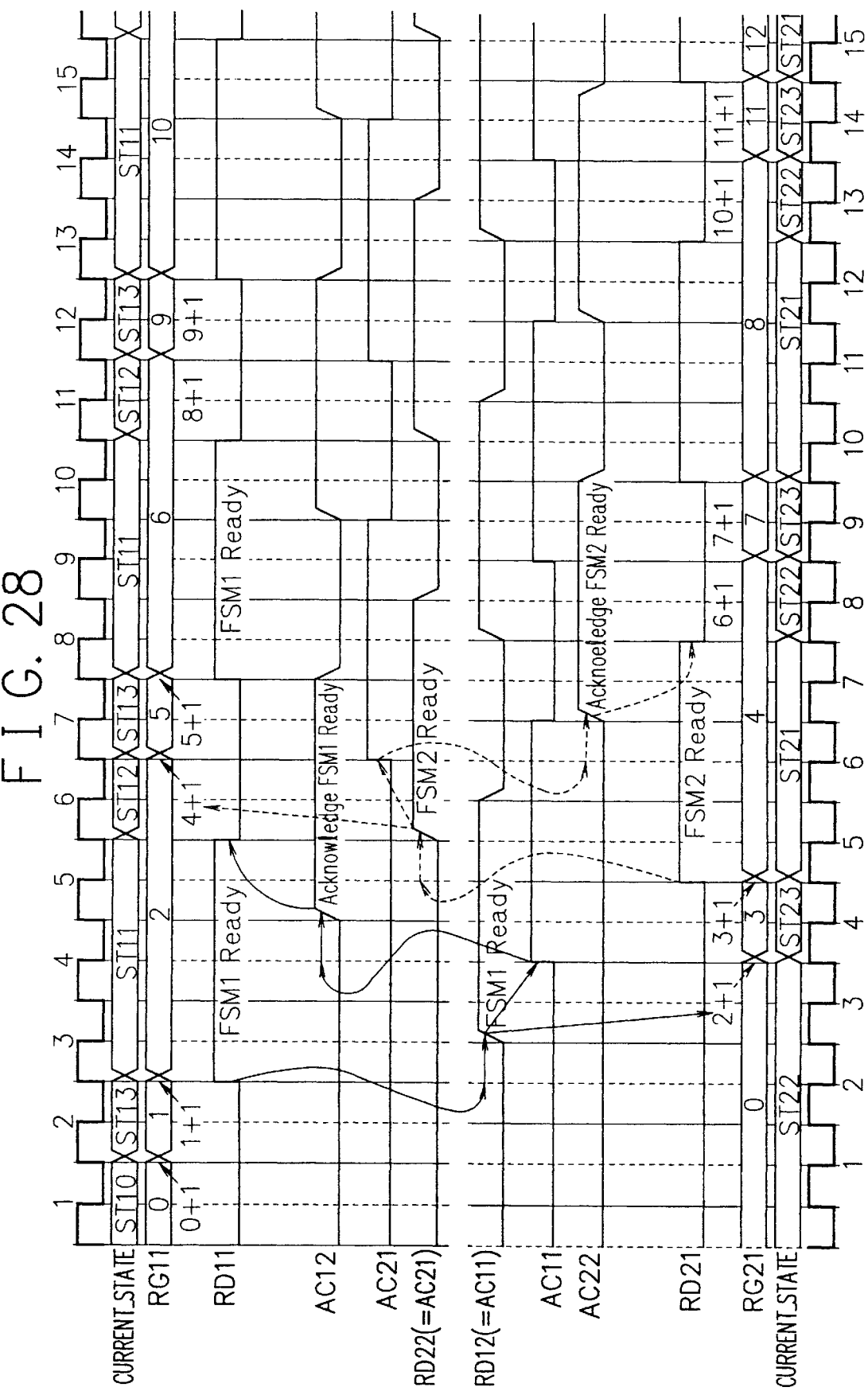
FIG. 28 is a timing chart showing a case where the circuit of FIG. 25 is employed and the clock frequency ratio f(CK1)/f(CK2) is 1/1, the phase difference θ(CK2)−θ(CK1) is π, and the duty ratio is 50%.
Figure 29:
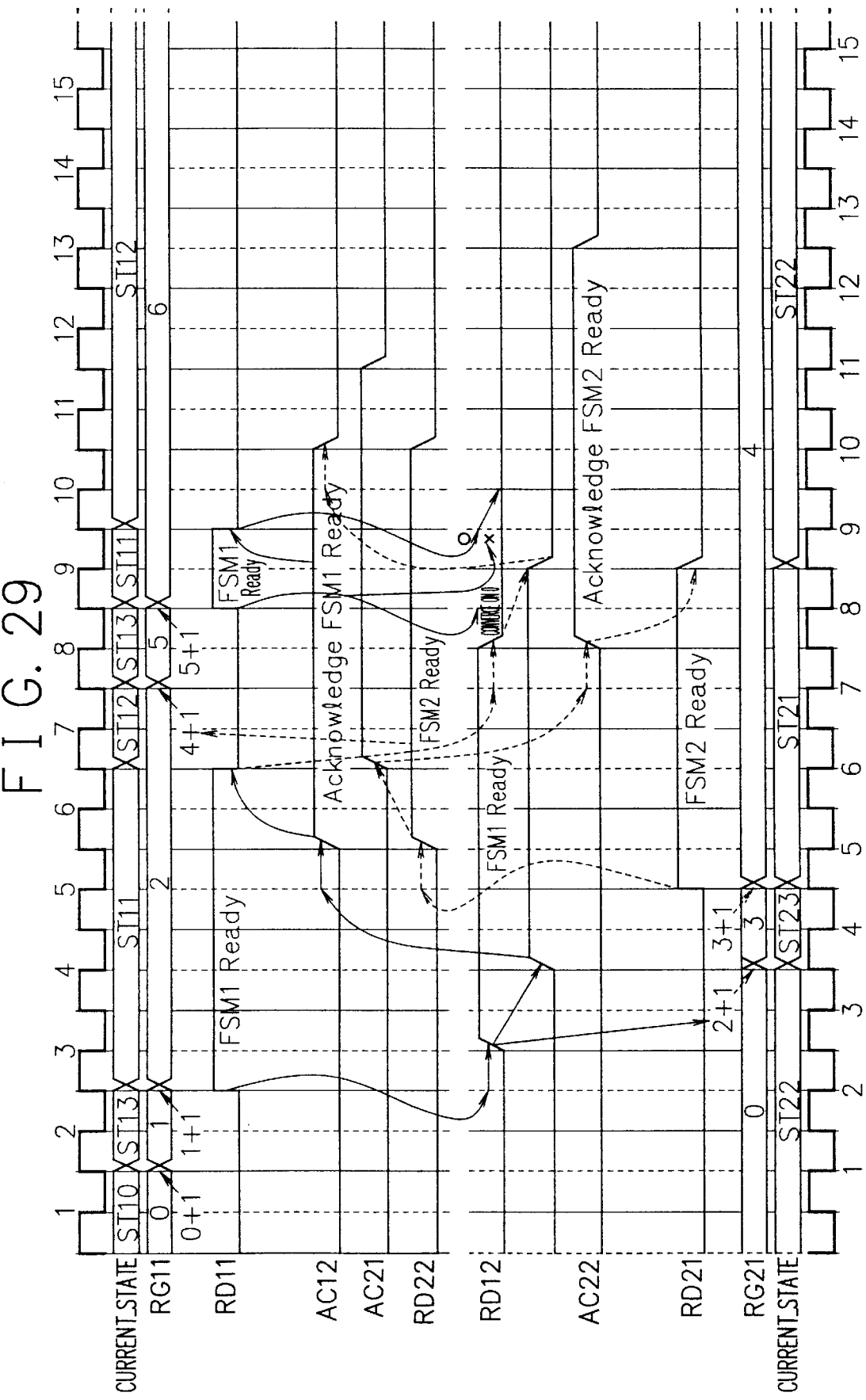
FIG. 29 is a timing chart showing a case where the circuit of FIG. 25 is employed and the clock frequency ratio f(CK1)/f(CK2) is 1/1, the phase difference θ(CK2)−θ(CK1) is π, and the duty ratio is 50%, in which the second malfunction occurs.

The first malfunction which has been describe before can be eliminated by delaying the reply of the ACKNOWLEDGE signal. FIG. 25 is a circuit diagram showing another symmetric asynchronous interface circuit which is realized by adding 1-clock delay circuits DL11 and DL21 to the symmetric asynchronous interface circuit shown in FIG. 17 (which is realized by omitting the idle states ST14 and ST24 from the second conventional example of FIG. 3 and adding the delay circuits DL11 and DL21 to the circuit). FIG. 26 is a circuit diagram showing the delay circuits DL11 and DL21. FIG. 27 is a timing chart showing a case where the clock frequency ratio f(CK1)/f(CK2) is 1/3 and the duty ratio is 50%. FIG. 28 is a timing chart showing a case where the clock frequency ratio f(CK1)/f(CK2) is 1/1, the phase difference $\theta(CK2)-\theta(CK1)$ is $\pi$, and the duty ratio is 50%. FIG. 29 is a timing chart showing a case where the clock frequency ratio f(CK1)/f(CK2) is 1/1, the phase difference $\theta(CK2)-\theta(CK1)$ is $\pi$, and the duty ratio is 50%, in which the second malfunction occurs.

FIGS. 27 and 28 are showing cases where the first malfunction does not occur and the first device control section FSM1 can detect the READY signal RD22 correctly (cases where the first malfunction does not occur in the detailed explanation of the first malfunction which has been given referring to FIG. 23), therefore, detailed explanation thereof is omitted.

However, the first malfunction and the second malfunction are independent phenomena, and thus factors of the second malfunction still remain.

Figure 31:
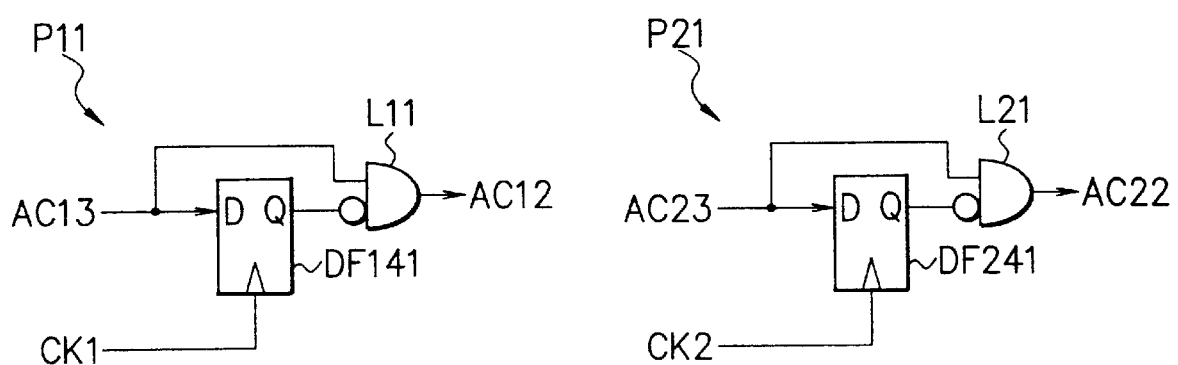
FIG. 31 is a circuit, diagram of the 1-clock pulse generation circuits.
Figure 32:
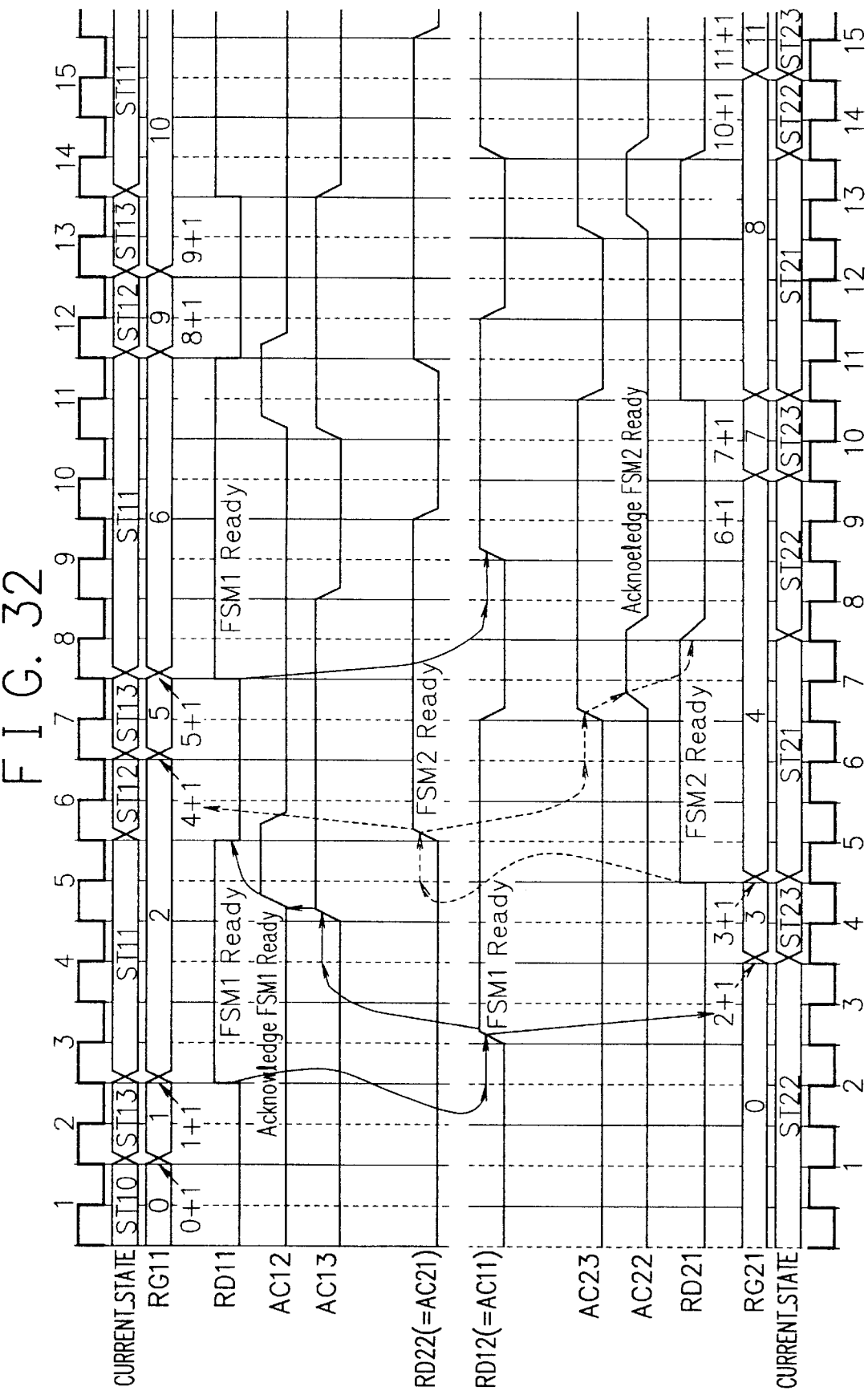
FIG. 32 is a timing chart showing a case where the circuit of FIG. 30 is employed and the clock frequency ratio f(CK1)/f(CK2) is 1/1, the phase difference θ(CK2)−θ(CK1) is π, and the duty ratio is 50%.
Figure 33:
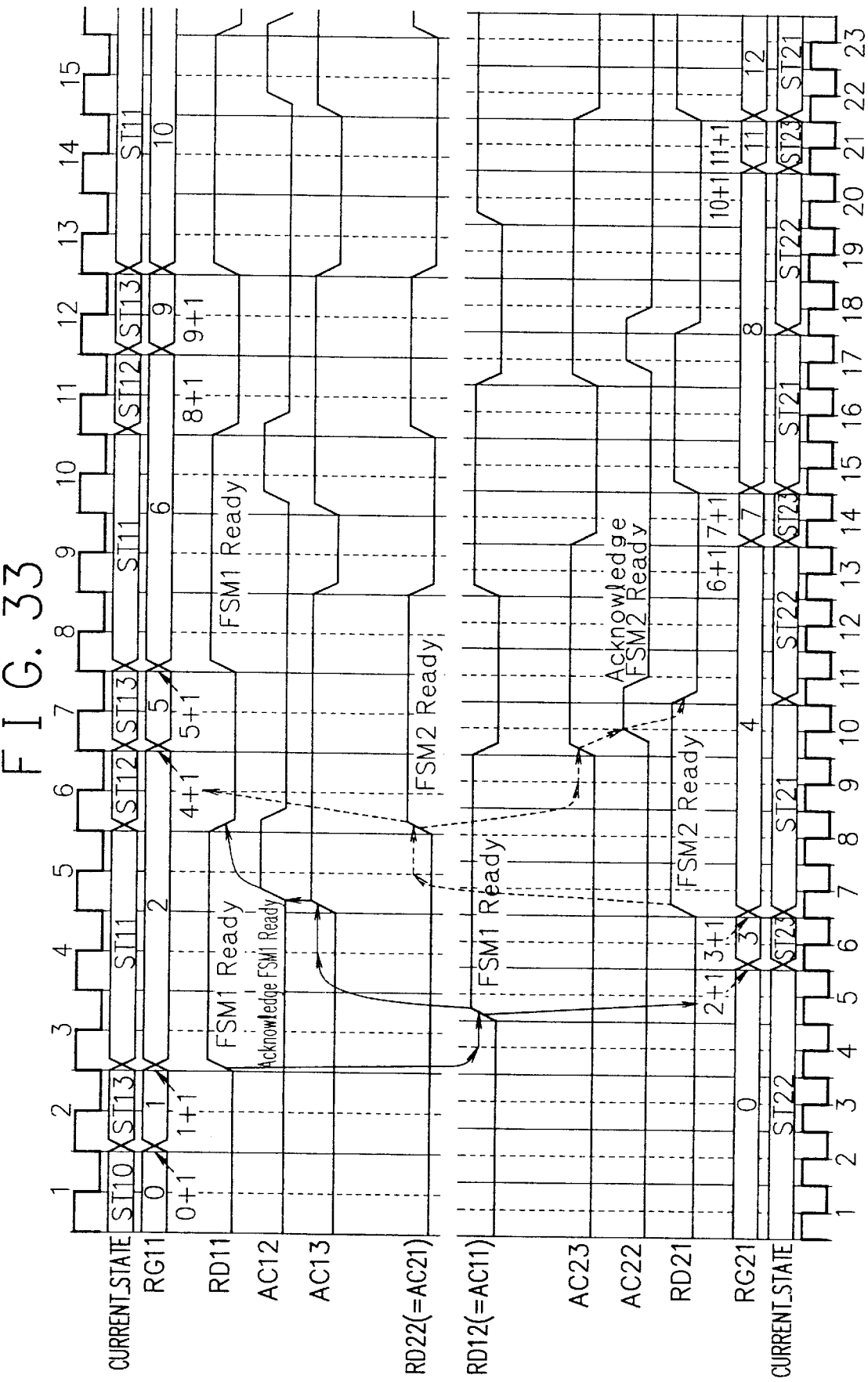
FIG. 33 is a timing chart showing a case where the circuit of FIG. 30 is employed and the clock frequency ratio f(CK1)/f(CK2) is 2/3 and the duty ratio is 50%.
Figure 34:
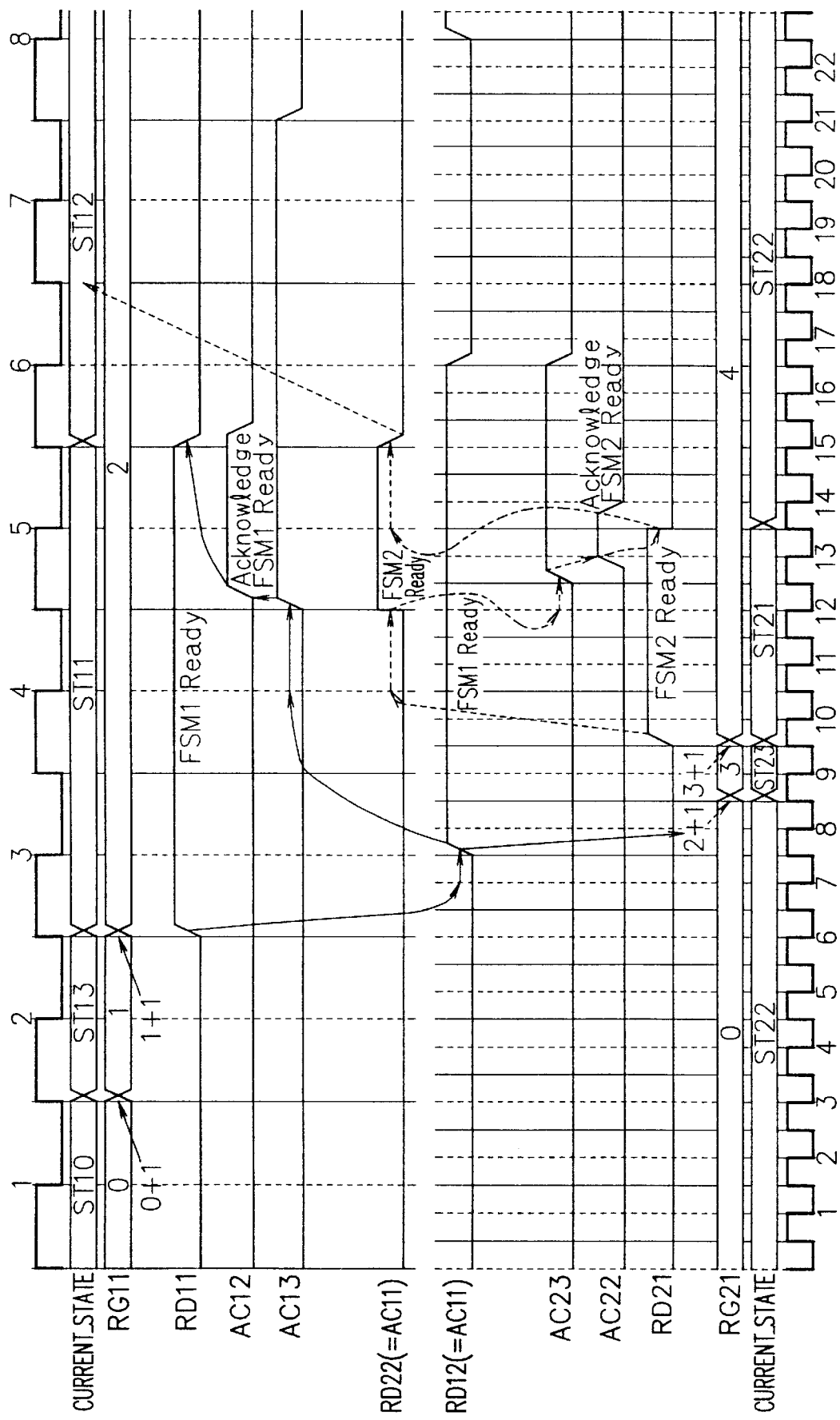
FIG. 34 is a timing chart showing a case where the circuit of FIG. 30 is employed and the clock frequency ratio f(CK1)/f(CK2) is 1/3 and the duty ratio is 50%, in which the first malfunction occurs.

The second malfunction can be eliminated by using the first 1 clock cycle of the ACKNOWLEDGE signal. FIG. 30 is a circuit diagram showing another symmetric asynchronous interface circuit which is realized by adding 1-clock pulse generation circuits P11 and P21 to the symmetric asynchronous interface circuit shown in FIG. 17 (which is realized by omitting the idle states ST14 and ST24 from the second conventional example of FIG. 3 and adding the 1-clock pulse generation circuits P11 and P21 to the circuit). FIG. 31 is a circuit diagram of the 1-clock pulse generation circuits P11 and P21. FIG. 32 is a timing chart showing a case where the clock frequency ratio f(CK1)/f(CK2) is 1/1, the phase difference θ(CK2)–θ(CK1) is π, and the duty ratio is 50%. FIG. 33 is a timing chart showing a case where the clock frequency ratio f(CK1)/f(CK2) is 2/3 and the duty ratio is 50%. FIG. 34 is a timing chart showing a case where the clock frequency ratio f(CK1)/f(CK2) is 1/3 and the duty ratio is 50%, in which the first malfunction occurs.

FIGS. 32 and 33 are showing cases where the second malfunction does not occur and the second READY signal RD11 is correctly turned inactive by the second ACKNOWLEDGE signal AC12 and thereby the active period of the READY signal RD11 is secured normally (cases where the second malfunction does not occur in the detailed explanation of the second malfunction which has been given referring to FIG. 24), therefore, detailed explanation thereof is omitted.

However, as mentioned above, the first malfunction and the second malfunction are independent phenomena, and thus factors of the first malfunction still remain even if the 1-clock pulse generation circuits P11 and P21 are added.

Figure 35:
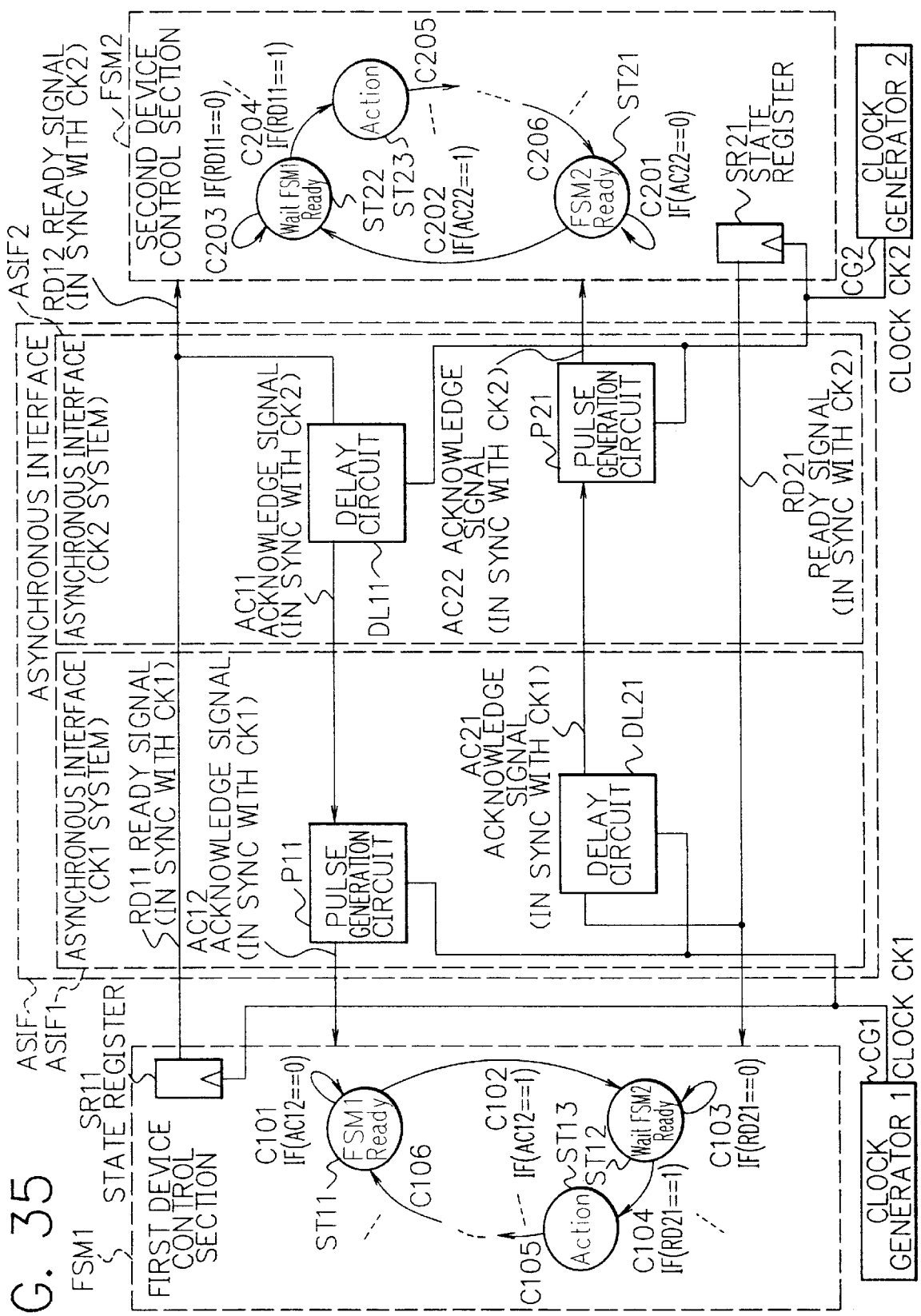
FIG. 35 is a circuit diagram showing another symmetric asynchronous interface circuit which includes the 1-clock delay circuits and the 1-clock pulse generation circuits but does not include the synchronization circuits.
Figure 36:
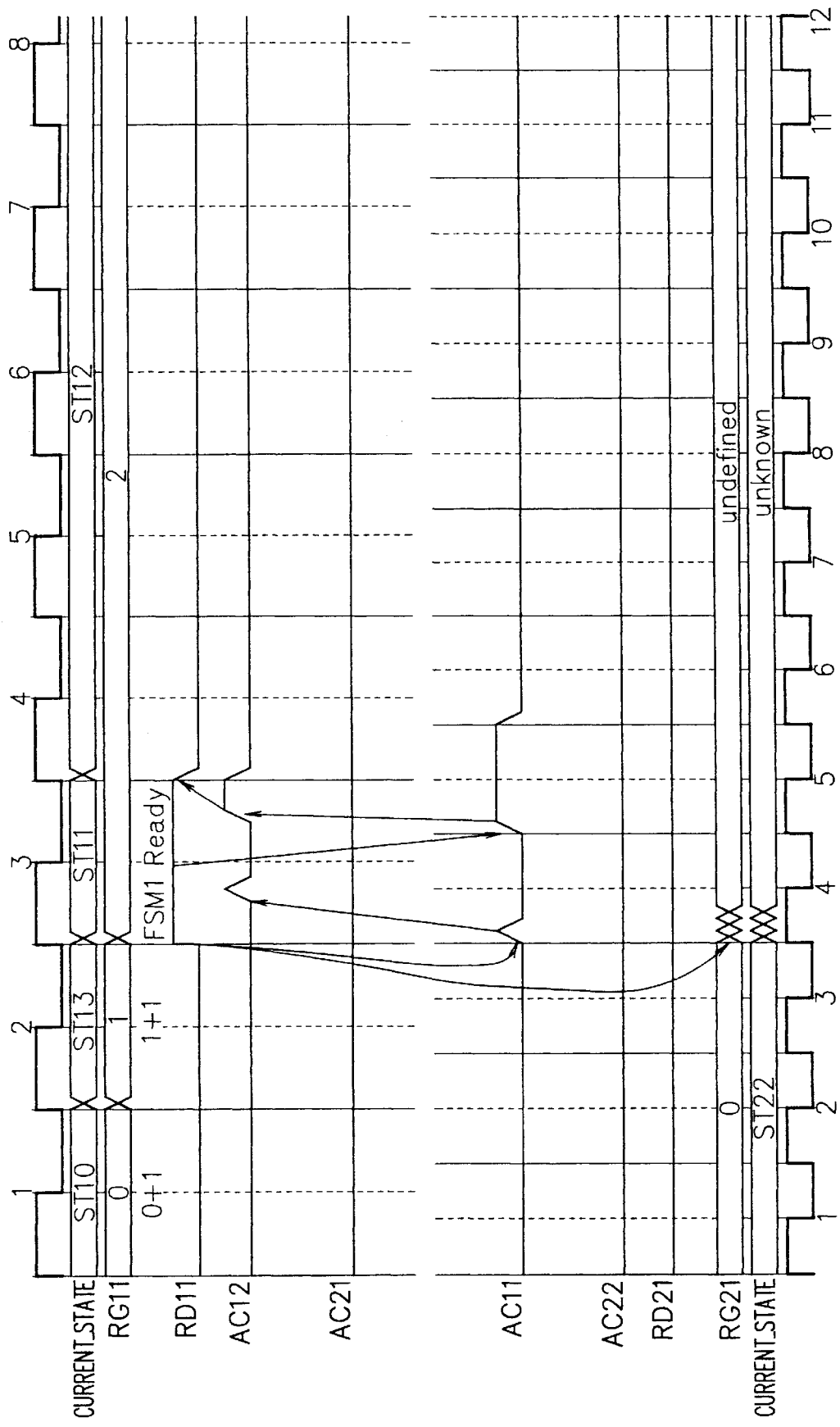
FIG. 36 is a timing chart showing a case where the circuit of FIG. 35 is employed and the clock frequency ratio f(CK1)/f(CK2) is 2/3 and the duty ratio is 50%.

In the following, we will give consideration to another symmetric asynchronous interface circuit which includes the delay circuits DL11 and DL21 and the 1-clock pulse generation circuits P11 and P21 but does not include the synchronization circuits SY11, SY12, SY21 and SY22. FIG. 35 is a circuit diagram showing such a symmetric asynchronous interface circuit. FIG. 36 is a timing chart showing a case where the clock frequency ratio f(CK1)/f(CK2) is 2/3 and the duty ratio is 50%. The operation until the READY signal RD11 of the first device control section FSM1 turns active (1) is the same as above examples.

1. After an enough reset period, the first device control section FSM1 of the first device #1 is in an initial state ST10, and a register RG11 of the datapath DP1 shown in FIG. 19 holds a value 0.

2. Meanwhile, the second device control section FSM2 of the second device #2 is in an initial state ST22, and a register RG21 of the datapath DP2 shown in FIG. 20 holds a value 0.

3. In the first cycle of the clock signal (CK1) of the first device #1, the value (0) which has been held by the count register RG11 shown in FIG. 19 is incremented by 1, and the incremented value (1) is written in the count register RG11.

4. At the same time, the first device control section FSM1 changes into the next state ST13.

5. In the second cycle of the clock signal (CK1), the value (1) which has been held by the count register RG11 shown in FIG. 19 is further incremented by 1, and the incremented value (2) is written in the count register RG11. At this point, procedure on the side of the first device #1 is ended.

6. The first device control section FSM1 changes into a state 11 for informing the second device #2 that the procedure of the first device #1 has been finished (i.e. that the first device #1 is ready).

7. In the third cycle of the clock signal (CK1), by the change of the first device control section FSM1 into the state ST11, a signal RD11 (a READY signal) for indicating the readiness of the first device #1 is changed into active (1).

8. In the fourth cycle of the clock signal (CK2) of the second device #2, the second device control section FSM2 directly refers to the unsynchronized READY signal RD11, therefore, the D-FFs of the registers (the state registers SR21, SR22 and SR23, the count register RG21, etc.) might receive signal change during their setup-hold period. In this example, it is assumed that the change of the signal RD11 in the step 7 occurred during the setup-hold period. In such a case, the output of the state registers SR21, SR22 and SR23 become stochastic, and thus the value indicated by the state registers SR21, SR22 and SR23 might converge on an unknown (unassigned) state code ("000" etc.) indicating an unknown state. Therefore, the second device control section FSM2 can not operate as a control circuit of the second device #2 normally. Even if the value of the state registers SR21, SR22 and SR23 converged on a correct state code by chance, due to the glitch signals (which are generally not taken into consideration in synchronized circuit design) and conversion time of the glitch signals, delay time estimation can not be done correctly and convergence of the state registers SR21, SR22 and SR23 on a correct state code in the next clock cycle is not guaranteed. The count register RG21 also behaves stochastic, and thus the converged value of the count register RG21 is not guaranteed (shown as "undefined" in FIG. 36).

9. In the same way as the step 8, the change of the ACKNOWLEDGE signal to be replied to the first device control section FSM1 (=the READY signal RD11 which is inputted to a D-FF (DF131) of the delay circuit DL11 shown in FIG. 26) can occur during the setup-hold period of the D-FF (DF131). Also in this case, the glitch signal can occur.

10. In the third cycle of the clock signal (CK1), the glitch signal which occurred in the step 9 is directly inputted to the 1-clock pulse generation circuit P11.

11. In the fifth cycle of the clock signal (CK2), the signal RD11 which turned active in the step 7 is latched by the D-FF (DF131) of the delay circuit DL11 shown in FIG. 26.

12. In the third cycle of the clock signal (CK1), the output of the delay circuit DL11 is also directly inputted to the 1-clock pulse generation circuit P11.

13. In the system which is synchronized by the clock signal (CK1), the glitch signal of the step 10 and the signal of the step 12 which is synchronized with the clock signal (CK2) are signals that can not be considered in normal synchronized circuit design. Therefore, while FIG. 36 is showing an example in which state transition is executed correctly, correct transition to the next state is not guaranteed (depending on delay time of a next state code generator (composed of logic gates) shown in FIG. 21). Even if state transition could occur correctly by chance, it does not mean success of correct handshake between devices.

As described above, without the synchronization circuits SY11, SY12, SY21 and SY22, there is a large possibility of malfunction in almost every case.

Figure 37:
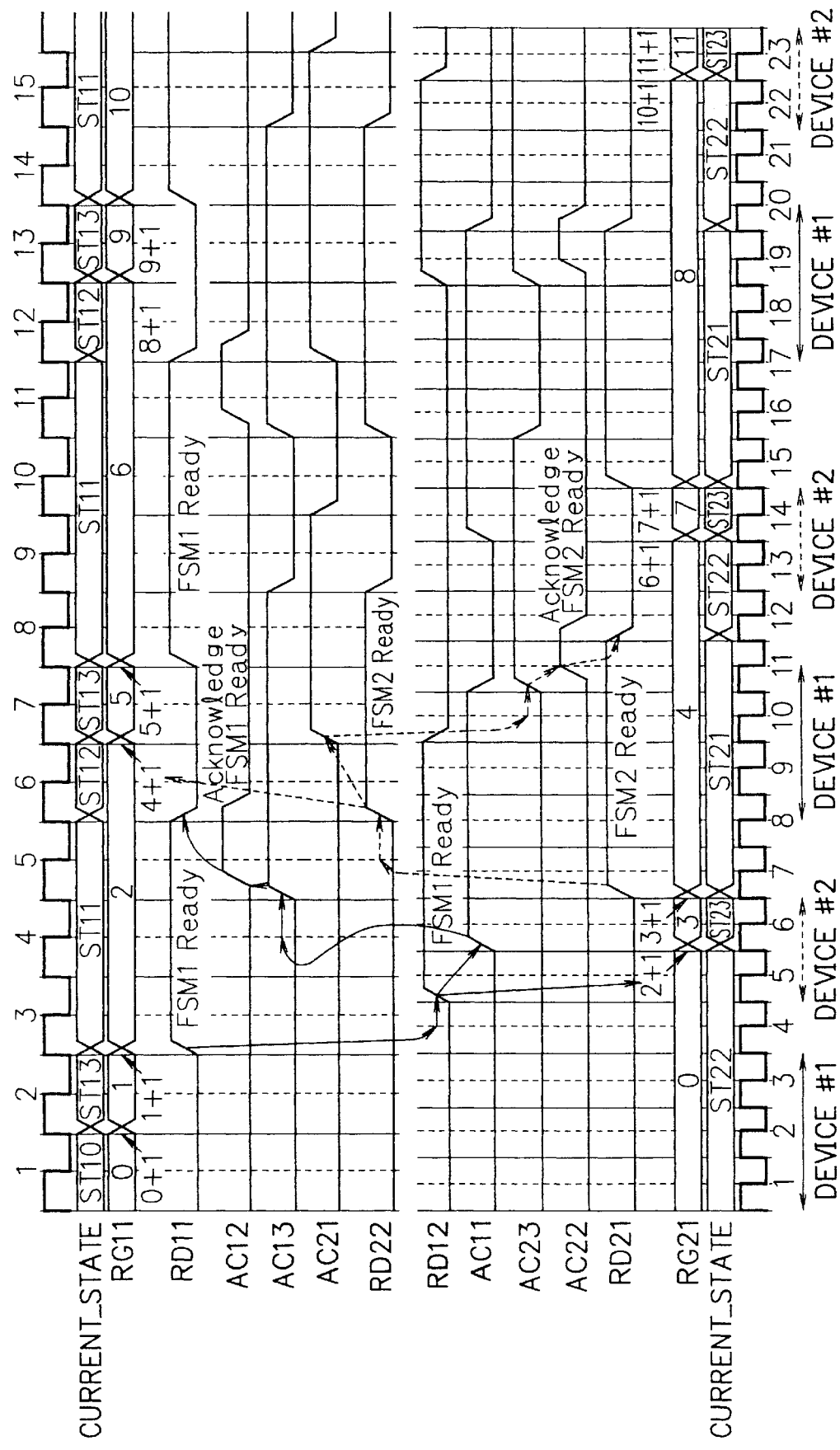
FIG. 37 is a timing chart showing a case where the symmetric asynchronous interface circuit according to the present invention is employed and the clock frequency ratio f(CK1)/f(CK2) is 2/3 and the duty ratio is 50%.
Figure 38:
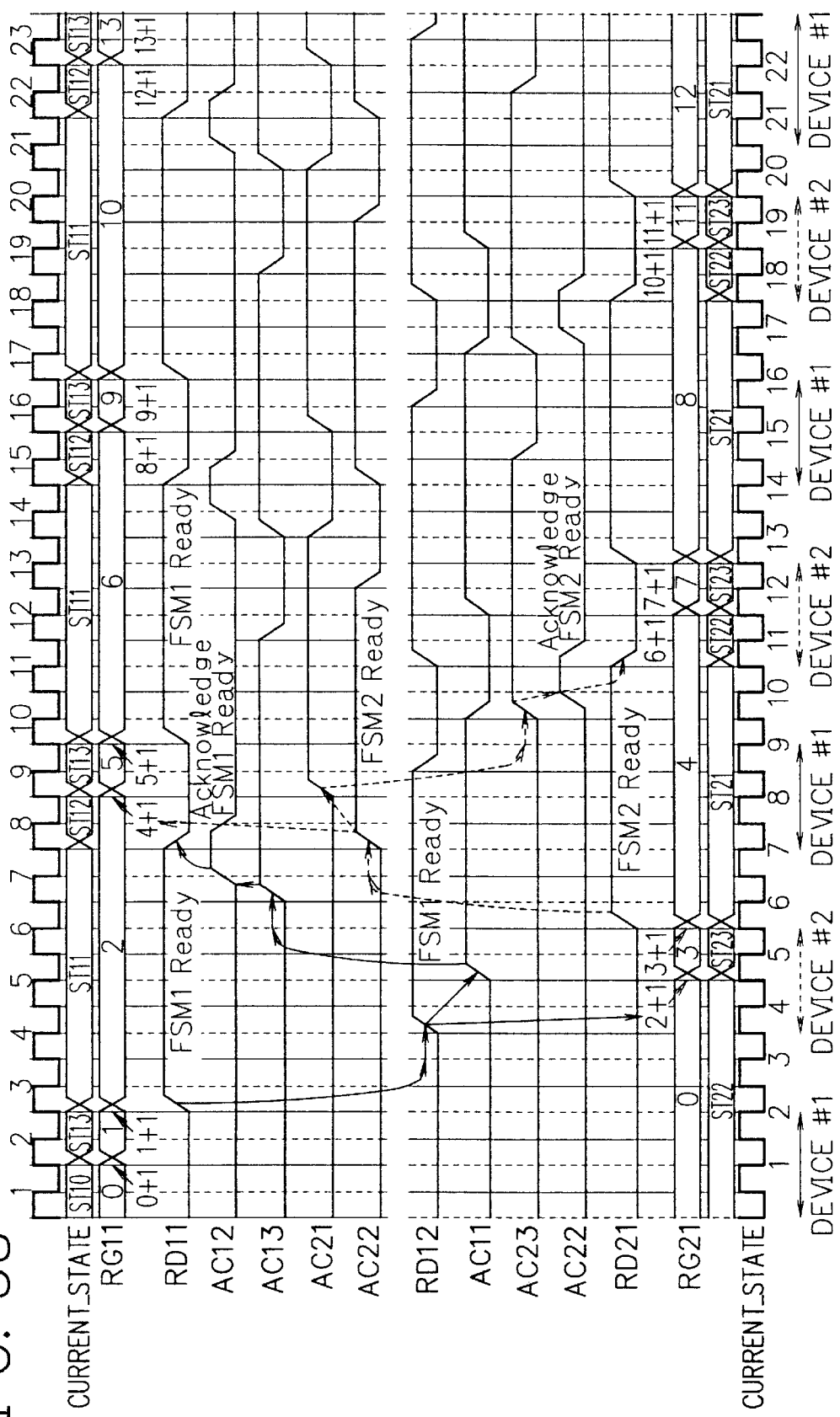
FIG. 38 is a timing chart showing a case where the symmetric asynchronous interface circuit according to the present invention is employed and the clock frequency ratio f(CK1)/f(CK2) is 1/1, the phase difference θ(CK2)−θ(CK1) is π, and the duty ratio is 50%.

Referring again to FIG. 10 showing the symmetric asynchronous interface circuit according to the embodiment of the present invention, the circuit of FIG. 10 is realized by omitting the idle states ST14 and ST24 from the second conventional example of FIG. 3 and adding the delay circuits DL11 and DL21 and the pulse generation circuits P11 and P21 to the circuit. The first malfunction and the second malfunction can be eliminated by the addition of the delay circuits and the pulse generation circuits. FIG. 37 is a timing chart showing a case where the clock frequency ratio f(CK1)/f(CK2) is 2/3 and the duty ratio is 50%, and FIG. 38 is a timing chart showing a case where the clock frequency ratio f(CK1)/f(CK2) is 1/1, the phase difference θ(CK2)−θ(CK1) is π, and the duty ratio is 50%.

In the following, the operation of the circuit of FIG. 10 in the case of FIG. 37 will be described, assuming that the first device #1 and the second device #2 are provided with the datapath DP1 shown in FIG. 19 and the datapath DP2 shown in FIG. 20 respectively.

1. After an enough reset period, the first device control section FSM1 of the first device #1 is in an initial state ST10, and a register RG11 of the datapath DP1 shown in FIG. 19 holds a value 0.

2. Meanwhile, the second device control section FSM2 of the second device #2 is in an initial state ST22, and a register RG21 of the datapath DP2 shown in FIG. 20 holds a value 0.

3. In the first cycle of the clock signal (CK1) of the first device #1, the value (0) which has been held by the count register RG11 shown in FIG. 19 is incremented by 1, and the incremented value (1) is written in the count register RG11.

4. At the same time, the first device control section FSM1 changes into the next state ST13.

5. In the second cycle of the clock signal (CK1), the value (1) which has been held by the count register RG11 shown in FIG. 19 is further incremented by 1, and the incremented value (2) is written in the count register RG11. At this point, procedure on the side of the first device #1 is ended.

6. The first device control section FSM1 changes into a state 11 for informing the second device #2 that the procedure of the first device #1 has been finished (i.e. that the first device #1 is ready).

7. In the third cycle of the clock signal (CK1), by the change of the first device control section FSM1 into the state ST11, a signal RD11 (a READY signal) for indicating the readiness of the first device #1 is changed into active (1).

8. In the fourth cycle of the clock signal (CK2) of the second device #2, a D-FF (DF111) of the synchronization circuit SY11 shown in FIG. 18 latches the activated signal RD11 in sync with a falling edge of the clock signal (CK2). The output of the D-FF (DF111) is a signal RD14 which is shown in FIG. 18.

9. Also in the fourth cycle of the clock signal (CK2), another D-FF (DF112) of the synchronization circuit SY11 shown in FIG. 18 further latches the signal RD14 in sync with a rising edge of the clock signal (CK2). The output of the D-FF (DF112) is supplied to the second device control section FSM2 as a signal RD12.

10. Now that the active READY signal RD11 (RD12) indicating the readiness of the first device #1 has been transferred to the second device #2, procedure on the side of the second device #2 can be started.

11. In the sixth cycle of the clock signal (CK2), the delay circuit DL11 delays the output of the synchronization circuit SY11 (i.e. the signal RD12 of the step 9) by 1 clock cycle. The output of the delay circuit DL11 is supplied to the synchronization circuit SY12 as an ACKNOWLEDGE signal AC11.

12. In the fourth cycle of the clock signal (CK1), a D-FF (DF121) of the synchronization circuit SY12 shown in FIG. 18 latches the activated ACKNOWLEDGE signal AC11 of the step 11 in sync with a falling edge of the clock signal (CK1), and thereby an output signal AC14 is obtained.

13. Also in the fourth cycle of the clock signal (CK1), another D-FF (DF122) of the synchronization circuit SY12 shown in FIG. 18 further latches the signal AC14 of the step 12 in sync with a rising edge of the clock signal (CK1). The output of the D-FF (DF122) is supplied to the pulse generation circuit P11 as a signal AC13.

14. In the fifth cycle of the clock signal (CK1), the pulse generation circuit P11 which received the signal AC13 of the step 13 generates a 1-clock pulse signal and outputs the 1-clock pulse signal to the first device control section FSM1 as a signal AC12.

15. The signal AC12 is a signal to be used for confirming that the activated READY signal RD11 of the step 7 could successfully be synchronized to the second device #2 which is driven by the clock signal (CK2). In the fifth cycle of the clock signal (CK1), by receiving the signal AC12, the first device control section FSM1 of the first device #1 changes from the state ST11 to a state ST12 for waiting for completion of procedure on the side of the second device #2. At the same time, the first device control section FSM1 changes the activated READY signal RD11 into inactive (0).

16. In the sixth cycle of the clock signal (CK1), the first device control section FSM1 in the state ST12 waits for an activated signal RD22 which indicates the readiness of the second device #2 (The activated signal RD22 will reach soon as will be described below.).

17. In the fifth cycle of the clock signal (CK2), the datapath DP2 of the second device #2 reads data D1 from the datapath DP1 of the first device #1.

18. In the datapath DP2 which is shown in FIG. 20, the data D1 of the step 17 is incremented by 1, and the incremented data (3) is written in the count register RG21.

19. At the same time, the second device control section FSM2 of the second device #2 changes into the next state ST23.

20. In the sixth cycle of the clock signal (CK2), the value (3) which has been held by the count register RG21 shown in FIG. 20 is further incremented by 1, and the incremented value (4) is written in the count register RG21. At this point, procedure on the side of the second device #2 is ended.

21. The second device control section FSM2 changes into a state ST21 for informing the first device #1 that the procedure of the second device #2 has been finished (i.e. that the second device #2 is ready).

22. In the seventh cycle of the clock signal (CK2), by the change of the second device control section FSM2 into the state ST21, a signal RD21 for indicating the readiness of the second device #2 is changed into active (1).

23. In the fifth cycle of the clock signal (CK1), a D-FF (DF211) of the synchronization circuit SY21 shown in FIG. 18 latches the activated signal RD21 of the step 22 in sync with a falling edge of the clock signal (CK1), and thereby an output signal RD24 is obtained.

24. Also in the fifth cycle of the clock signal (CK1), another D-FF (DF212) of the synchronization circuit SY21 shown in FIG. 18 further latches the signal RD24 of the step 23 in sync with a rising edge of the clock signal (CK1), thereby the aforementioned signal RD22 is obtained as the output of the D-FF (DF212). By the signal RD22 corresponding to the signal RD21, the READY signal RD21 can be used in the first device #1 which is driven by the different clock system.

25. Now that the active READY signal RD21 (RD22) indicating the readiness of the second device #2 has been transferred to the first device #1, procedure on the side of the first device #1 can be started. The first device #1 recognizes at this point that the control right has been transferred from the second device #2 to itself.

Thereafter, the control right is alternately transferred between the first device #1 and the second device #2 in the same way, and thereby the count register RG11 of the datapath DP1 of the first device #1 and the count register RG21 of the datapath DP2 of the second device #2 keep on being incremented in the same way. The operation of the circuit of FIG. 10 in the case of FIG. 38 is similar to the operation of the case of FIG. 37 which has been described above, and thus description thereof is omitted.

Incidentally, in the transitions ST12→ST11 and ST22→ST21, one or more transitional states (ST13, ST23) have to exist, since the symmetric asynchronous interface circuit of the present invention is designed on the assumption that a relationship ((the time when the activated signal AC11 is synchronized by the synchronization circuit SY12) ≦(the time when the activated signal RD21 is synchronized by the synchronization circuit SY21)) holds if ((the time when the activated signal AC11 is outputted)<(the time when the activated signal RD21 is outputted)) and a relationship ((the time when the activated signal AC21 is synchronized by the synchronization circuit SY22)≦(the time when the activated signal RD11 is synchronized by the synchronization circuit SY11)) holds if ((the time when the activated signal AC21 is outputted)<(the time when the activated signal RD11 is outputted)). If the transitional states ST13 and ST23 do not exist, equations ((the time when the activated signal AC11 is outputted)=(the time when the activated signal RD21 is outputted)) and ((the time when the activated signal AC21 is outputted)=(the time when the activated signal RD11 is outputted)) hold, and thus the above relationships are not satisfied. When the symmetric asynchronous interface circuit according to the present invention is applied to devices #1 and #2 in which direct transitions ST12→ST11 and ST22→T21 occur, dummy states (in which no procedure is executed by the devices as in the idle states) have to be inserted in the transitions.

The overhead time ratio in the cases of the second conventional example and the symmetric asynchronous interface circuit according to the present invention can be obtained by the equation:

(overhead time ratio)=(T_total−T_active)/T_total where T_active means time during which the first device #1 or the second device #2 actually executes procedure of itself, and T_total means total time including handshaking time between the first device #1 and the second device #2.

Figure 5:
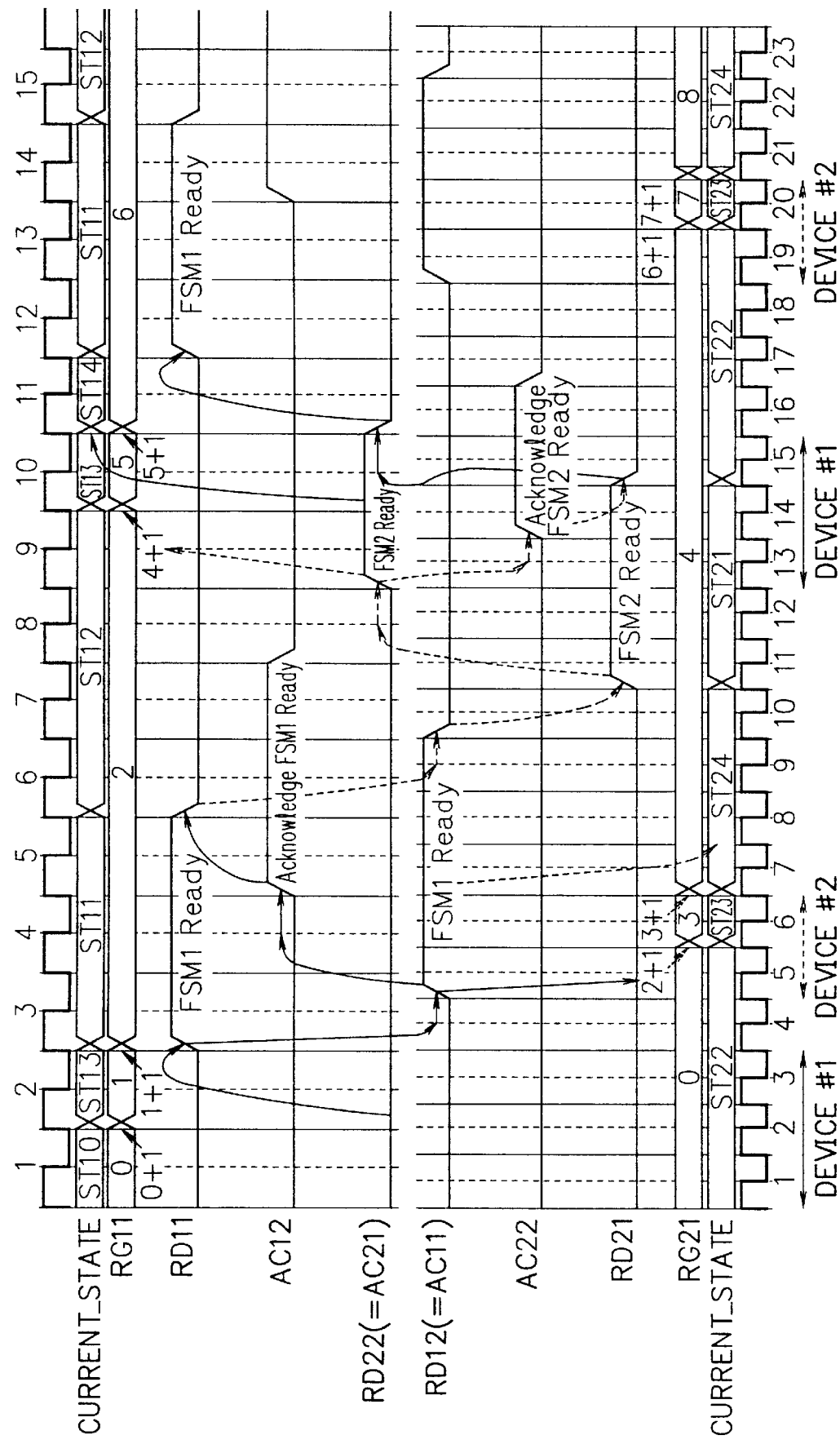
FIG. 5 is a timing chart showing a case where the second conventional symmetric asynchronous interface circuit of FIG. 3 is employed and the clock frequency ratio f(CK1)/f(CK2) is 2/3 and the duty ratio is 50%.

If we calculate the overhead time ratio in the case of the second conventional example shown in the timing chart of FIG. 5 using the above equation (in units of 1 clock cycle), the overhead time ratio becomes (23−10)/23=57%.

In the same way, the overhead time ratio in the case of the symmetric asynchronous interface circuit of the present invention shown in FIG. 37 (in the same condition as FIG. 5) is obtained as (23−15)/23=35%. Therefore, the overhead time could be reduced by 22% (57%−35%) by the symmetric asynchronous interface circuit according to the present invention.

Figure 6:
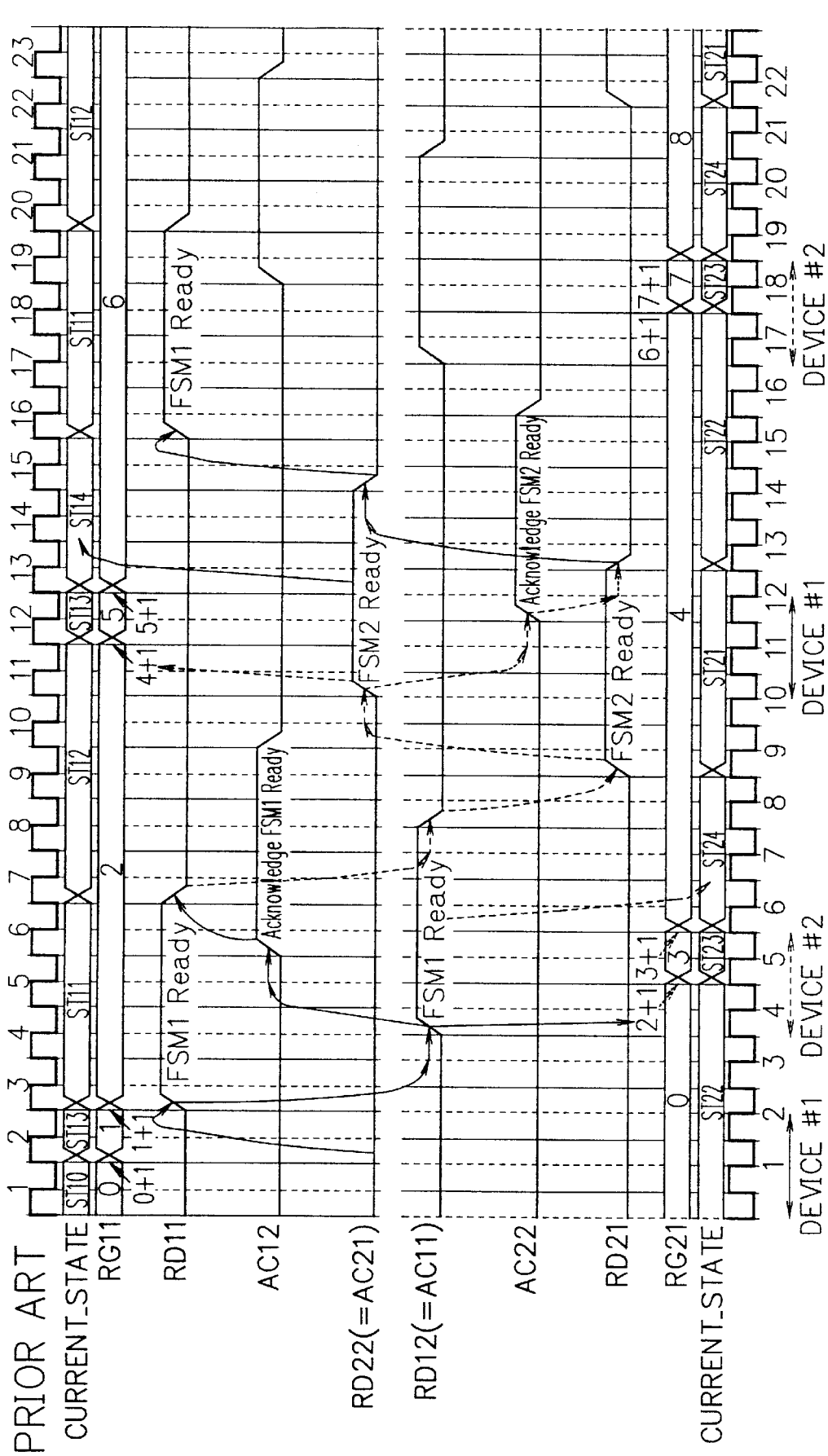
FIG. 6 is a timing chart showing a case where the second conventional symmetric asynchronous interface circuit of FIG. 3 is employed and the clock frequency ratio f(CK1)/f(CK2) is 1/1, the phase difference θ(CK2)–θ(CK1) is π, and the duty ratio is 50%.
Figure 7:
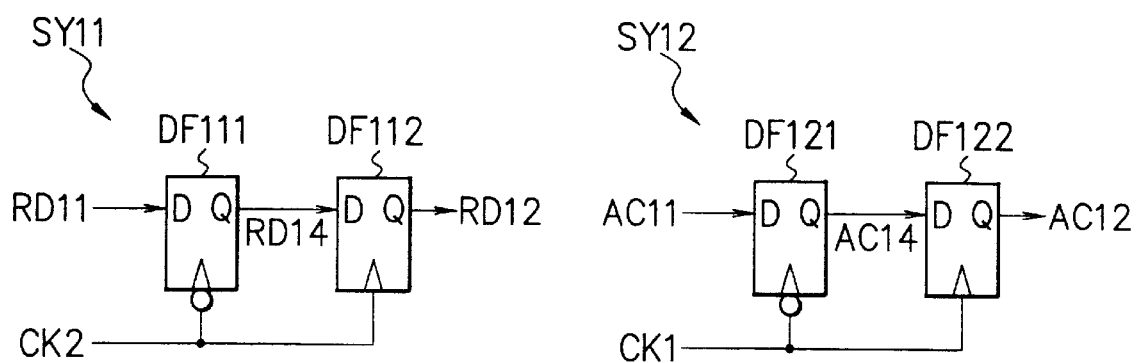
FIG. 7 is a circuit diagram showing synchronization circuits of the second conventional symmetric asynchronous interface circuit of FIG. 3.
Figure 7:
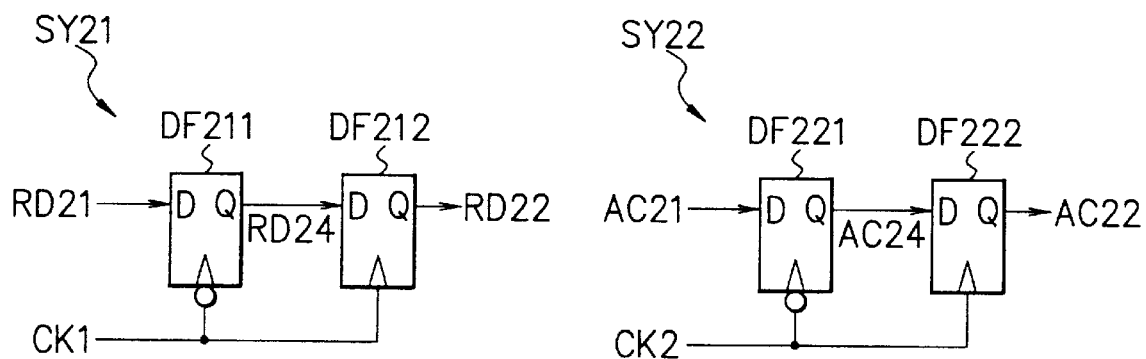
Figure 8:
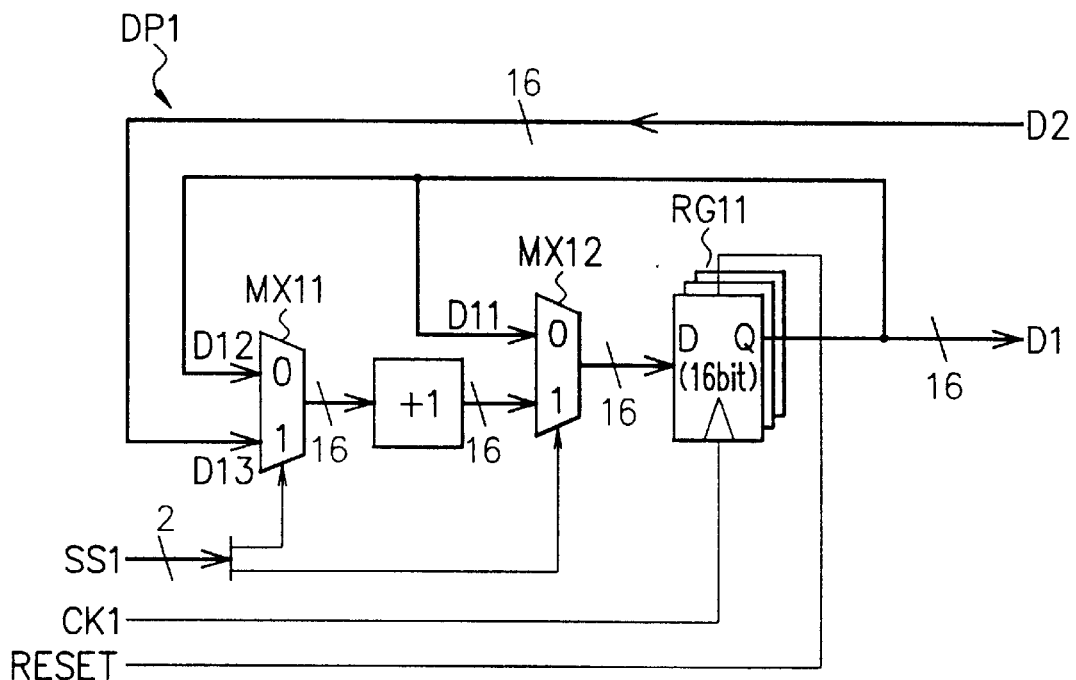
FIG. 8 is a circuit diagram showing a datapath of a first device.
Figure 9:
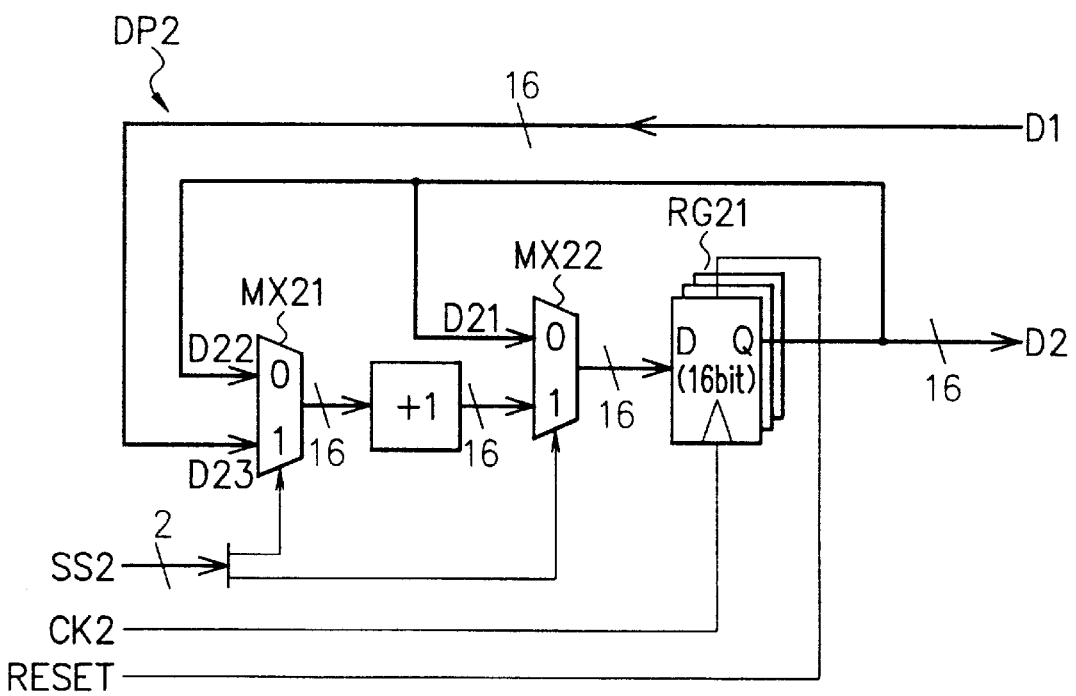
FIG. 9 is a circuit diagram showing a datapath of a second device.

If we compare the cases of FIG. 6 (the second conventional example) and FIG. 38 (present invention) in another condition, the reduction of the overhead time ratio becomes as large as 29% (65%−39%).

According to the above results, the symmetric asynchronous interface circuit of the present invention is capable of reducing the overhead time by 20% or more.

As set forth hereinabove, in the symmetric asynchronous interface circuit and the symmetric asynchronous interface method according to the present invention, by employing the dynamic setting of the active period of the READY signal (using the ACKNOWLEDGE signal) similarly to the second conventional symmetric asynchronous interface circuit, limitations in the frequencies and phases of the driving clock signals of the two devices #1 and #2 are eliminated almost perfectly and thus general versatility of the symmetric asynchronous interface circuit is increased and reusability of the symmetric asynchronous interface circuit is also increased, and the overhead time of the devices can be limited in a constant time throughout all the clock frequency range.

Further, by employing the delay circuits DL11 and DL21 and the pulse generation circuits P11 and P21, the idle states ST14 and ST24 (idle cycle time) in the second conventional example can be eliminated without causing the first malfunction and the second malfunction. Therefore, the overhead time can be reduced remarkably in comparison with the second conventional example especially when the control right switching between the two devices is executed frequently (for example, when the transfer data band width between the two devices (having larger buffers) is very large, when the amount of transferred data in each transaction is small, etc.).

Moreover, almost all the components of the symmetric asynchronous interface circuit according to the present invention can be realized by D-FFs. Concretely, the synchronization circuits SY11, SY12, SY21 and SY22 and the delay circuits DL11 and DL21 can be realized by D-FFs only, and the pulse generation circuits P11 and P21 can be realized by D-FFs and logic gates. Therefore, design of a system including the symmetric asynchronous interface circuit can be done easily using already-existing tools for synchronized system design such as logic synthesizers.

While the present invention has been described with reference to the particular illustrative embodiments, it is not to be restricted by those embodiments but only by the appended claims. For example, while the symmetric asynchronous interface circuit of FIG. 10 employing both the delay circuits (DL11, DL21) and the pulse generation circuits (P11, P21) and thereby eliminating both the first malfunction and the second malfunction has been described in the above embodiment, it is also possible to employ the symmetric asynchronous interface circuits which have been shown in FIG. 25 and FIG. 30. The symmetric asynchronous interface circuit of FIG. 25 employs the delay circuits (DL11, DL21) only and thereby the first malfunction is eliminated, and the symmetric asynchronous interface circuit of FIG. 30 employs the pulse generation circuits (P11, P21) only and thereby the second malfunction is eliminated. It is to be appreciated that those skilled in the art can change or modify the embodiments without departing from the scope and spirit of the present invention.

What is claimed is:

1. A symmetric asynchronous interface circuit which is utilized for interfacing between a first device and a second device which operate asynchronously, comprising:

a first synchronization circuit which receives a READY signal outputted by a control section of the first device, synchronizes the READY signal to a clock signal on the side of the second device, and outputs the synchronized READY signal to a control section of the second device;

a first delay circuit for delaying a signal corresponding to the synchronized READY signal outputted by the first synchronization circuit and outputting the delayed signal as an ACKNOWLEDGE signal;

a second synchronization circuit which synchronizes the ACKNOWLEDGE signal outputted by the first delay circuit to a clock signal on the side of the first device;

a first pulse generation circuit which generates a pulse signal when the synchronized ACKNOWLEDGE signal is supplied from the second synchronization circuit and outputs the pulse signal to the control section of the first device as an ACKNOWLEDGE signal;

a third synchronization circuit which receives a READY signal outputted by the control section of the second device, synchronizes the READY signal to the clock signal on the side of the first device, and outputs the synchronized READY signal to the control section of the first device;

a second delay circuit for delaying a signal corresponding to the synchronized READY signal outputted by the third synchronization circuit and outputting the delayed signal as an ACKNOWLEDGE signal;

a fourth synchronization circuit which synchronizes the ACKNOWLEDGE signal outputted by the second delay circuit to the clock signal on the side of the second device; and a second pulse generation circuit which generates a pulse signal when the synchronized ACKNOWLEDGE signal is supplied from the fourth synchronization circuit and outputs the pulse signal to the control section of the second device as an ACKNOWLEDGE signal.

2. A symmetric asynchronous interface circuit as claimed in claim 1, wherein the symmetric asynchronous interface circuit is applied to the first device and the second device which are provided with datapaths.

3. A symmetric asynchronous interface circuit as claimed in claim 1, wherein the symmetric asynchronous interface circuit is provided to the first device and the second device externally.

4. A symmetric asynchronous interface circuit as claimed in claim 1, wherein the symmetric asynchronous interface circuit is provided in the first device or the second device.

5. A symmetric asynchronous interface circuit as claimed in claim 1, wherein:

the first pulse generation circuit, the second synchronization circuit, the third synchronization circuit and the second delay circuit are provided in the first device, and the second pulse generation circuit, the first synchronization circuit, the fourth synchronization circuit and the first delay circuit are provided in the second device.

6. A symmetric asynchronous interface circuit as claimed in claim 1, wherein the symmetric asynchronous interface circuit is applied to the first device and the second device whose control sections do not have idle states.

7. A symmetric asynchronous interface circuit as claimed in claim 1, wherein delay time of each of the delay circuits is at least 1 clock cycle.

8. A symmetric asynchronous interface circuit as claimed in claim 1, wherein:

delay time of the first delay circuit is set longer than or equal to an interval in the second device between a state in which the control section of the second device informs the control section of the first device that the second device has finished its procedure and a state in which the control section of the second device waits for completion of procedure of the first device, and delay time of the second delay circuit is set longer than or equal to an interval in the first device between a state in which the control section of the first device informs the control section of the second device that the first device has finished its procedure and a state in which the control section of the first device waits for completion of procedure of the second device.

9. A symmetric asynchronous interface circuit as claimed in claim 8, wherein:

the delay time of the first delay circuit is set equal to the interval in the second device between the two states, and the delay time of the second delay circuit is set equal to the interval in the first device between the two states.

10. A symmetric asynchronous interface circuit as claimed in claim 1, wherein memory elements of the synchronization circuits, the delay circuits and the pulse generation circuits are composed of D-FFs.

11. A symmetric asynchronous interface circuit which is utilized for interfacing between a first device and a second device which operate asynchronously, comprising:

a first synchronization circuit which receives a READY signal outputted by a control section of the first device, synchronizes the READY signal to a clock signal on the side of the second device, and outputs the synchronized READY signal to a control section of the second device;

a first delay circuit for delaying a signal corresponding to the synchronized READY signal outputted by the first synchronization circuit and outputting the delayed signal as an ACKNOWLEDGE signal;

a second synchronization circuit which synchronizes the ACKNOWLEDGE signal outputted by the first delay circuit to a clock signal on the side of the first device and outputs the synchronized ACKNOWLEDGE signal to the control section of the first device;

a third synchronization circuit which receives a READY signal outputted by the control section of the second device, synchronizes the READY signal to the clock signal on the side of the first device, and outputs the synchronized READY signal to the control section of the first device;

a second delay circuit for delaying a signal corresponding to the synchronized READY signal outputted by the third synchronization circuit and outputting the delayed signal as an ACKNOWLEDGE signal; and a fourth synchronization circuit which synchronizes the ACKNOWLEDGE signal outputted by the second delay circuit to the clock signal on the side of the second device and outputs the synchronized ACKNOWLEDGE signal to the control section of the second device.

12. A symmetric asynchronous interface circuit as claimed in claim 11, wherein the symmetric asynchronous interface circuit is applied to the first device and the second device which are provided with datapaths.

13. A symmetric asynchronous interface circuit as claimed in claim 11, wherein the symmetric asynchronous interface circuit is provided to the first device and the second device externally.

14. A symmetric asynchronous interface circuit as claimed in claim 11, wherein the symmetric asynchronous interface circuit is provided in the first device or the second device.

15. A symmetric asynchronous interface circuit as claimed in claim 11, wherein:

the second synchronization circuit, the third synchronization circuit and the second delay circuit are provided in the first device, and the first synchronization circuit, the fourth synchronization circuit and the first delay circuit are provided in the second device.

16. A symmetric asynchronous interface circuit as claimed in claim 11, wherein the symmetric asynchronous interface circuit is applied to the first device and the second device whose control sections do not have idle states.

17. A symmetric asynchronous interface circuit as claimed in claim 11, wherein delay time of each of the delay circuits is at least 1 clock cycle.

18. A symmetric asynchronous interface circuit as claimed in claim 11, wherein:

delay time of the first delay circuit is set longer than or equal to an interval in the second device between a state in which the control section of the second device informs the control section of the first device that the second device has finished its procedure and a state in which the control section of the second device waits for completion of procedure of the first device, and delay time of the second delay circuit is set longer than or equal to an interval in the first device between a state in which the control section of the first device informs the control section of the second device that the first device has finished its procedure and a state in which the control section of the first device waits for completion of procedure of the second device.

19. A symmetric asynchronous interface circuit as claimed in claim 18, wherein:

the delay time of the first delay circuit is set equal to the interval in the second device between the two states, and the delay time of the second delay circuit is set equal to the interval in the first device between the two states.

20. A symmetric asynchronous interface circuit as claimed in claim 11, wherein memory elements of the synchronization circuits and the delay circuits are composed of D-FFs.

21. A symmetric asynchronous interface circuit which is utilized for interfacing between a first device and a second device which operate asynchronously, comprising:

a first synchronization circuit which receives a READY signal outputted by a control section of the first device, synchronizes the READY signal to a clock signal on the side of the second device, and outputs the synchronized READY signal to a control section of the second device;

a second synchronization circuit which receives an ACKNOWLEDGE signal which corresponds to the output of the first synchronization circuit and synchronizes the ACKNOWLEDGE signal to a clock signal on the side of the first device;

a first pulse generation circuit which generates a pulse signal when the synchronized ACKNOWLEDGE signal is supplied from the second synchronization circuit and outputs the pulse signal to the control section of the first device as an ACKNOWLEDGE signal;

a third synchronization circuit which receives a READY signal outputted by the control section of the second device, synchronizes the READY signal to the clock signal on the side of the first device, and outputs the synchronized READY signal to the control section of the first device;

a fourth synchronization circuit which receives an ACKNOWLEDGE signal which corresponds to the output of the third synchronization circuit and synchronizes the ACKNOWLEDGE signal to the clock signal on the side of the second device; and a second pulse generation circuit which generates a pulse signal when the synchronized ACKNOWLEDGE signal is supplied from the fourth synchronization circuit and outputs the pulse signal to the control section of the second device as an ACKNOWLEDGE signal.

22. A symmetric asynchronous interface circuit as claimed in claim 21, wherein the symmetric asynchronous interface circuit is applied to the first device and the second device which are provided with datapaths.

23. A symmetric asynchronous interface circuit as claimed in claim 21, wherein the symmetric asynchronous interface circuit is provided to the first device and the second device externally.

24. A symmetric asynchronous interface circuit as claimed in claim 21, wherein the symmetric asynchronous interface circuit is provided in the first device or the second device.

25. A symmetric asynchronous interface circuit as claimed in claim 21, wherein:

the first pulse generation circuit, the second synchronization circuit and the third synchronization circuit are provided in the first device, and the second pulse generation circuit, the first synchronization circuit and the fourth synchronization circuit are provided in the second device.

26. A symmetric asynchronous interface circuit as claimed in claim 21, wherein the symmetric asynchronous interface circuit is applied to the first device and the second device whose control sections do not have idle states.

27. A symmetric asynchronous interface circuit as claimed in claim 21, wherein memory elements of the synchronization circuits and the pulse generation circuits are composed of D-FFs.

28. A symmetric asynchronous interface method for interfacing between a first device and a second device which operate asynchronously, comprising the steps of:

a first synchronization step in which a READY signal outputted by a control section of the first device is synchronized to a clock signal on the side of the second device and the synchronized READY signal is supplied to a control section of the second device;

a first delay step in which an ACKNOWLEDGE signal is generated by delaying a signal corresponding to the synchronized READY signal of the first synchronization step;

a second synchronization step in which the ACKNOWLEDGE signal generated in the first delay step is synchronized to a clock signal on the side of the first device and thereby a synchronized ACKNOWLEDGE signal is generated;

a first pulse generation step in which a pulse signal corresponding to the synchronized ACKNOWLEDGE signal of the second synchronization step is generated and the pulse signal is supplied to the control section of the first device as an ACKNOWLEDGE signal;

a third synchronization step in which a READY signal outputted by the control section of the second device is synchronized to the clock signal on the side of the first device and the synchronized READY signal is supplied to the control section of the first device;

a second delay step in which an ACKNOWLEDGE signal is generated by delaying a signal corresponding to the synchronized READY signal of the third synchronization step;

a fourth synchronization step in which the ACKNOWLEDGE signal generated in the second delay step is synchronized to the clock signal on the side of the second device and thereby a synchronized ACKNOWLEDGE signal is generated; and a second pulse generation step in which a pulse signal corresponding to the synchronized ACKNOWLEDGE signal of the fourth synchronization step is generated and the pulse signal is supplied to the control section of the second device as an ACKNOWLEDGE signal.

29. A symmetric asynchronous interface method as claimed in claim 28, wherein the method is applied to the first device and the second device which are provided with datapaths.

30. A symmetric asynchronous interface method as claimed in claim 28, wherein the method is applied to the first device and the second device whose control sections do not have idle states.

31. A symmetric asynchronous interface method as claimed in claim 28, wherein delay time of each of the delay steps is at least 1 clock cycle.

32. A symmetric asynchronous interface method as claimed in claim 28, wherein:

delay time of the first delay step is set longer than or equal to an interval in the second device between a state in which the control section of the second device informs the control section of the first device that the second device has finished its procedure and a state in which the control section of the second device waits for completion of procedure of the first device, and delay time of the second delay step is set longer than or equal to an interval in the first device between a state in which the control section of the first device informs the control section of the second device that the first device has finished its procedure and a state in which the control section of the first device waits for completion of procedure of the second device.

33. A symmetric asynchronous interface method as claimed in claim 32, wherein:

the delay time of the first delay step is set equal to the interval in the second device between the two states, and the delay time of the second delay step is set equal to the interval in the first device between the two states.

34. A symmetric asynchronous interface method for interfacing between a first device and a second device which operate asynchronously, comprising the steps of:

a first synchronization step in which a READY signal outputted by a control section of the first device is synchronized to a clock signal on the side of the second device and the synchronized READY signal is supplied to a control section of the second device;

a first delay step in which an ACKNOWLEDGE signal is generated by delaying a signal corresponding to the synchronized READY signal of the first synchronization step;

a second synchronization step in which the ACKNOWLEDGE signal generated in the first delay step is synchronized to a clock signal on the side of the first device and the synchronized ACKNOWLEDGE signal is supplied to the control section of the first device;

a third synchronization step in which a READY signal outputted by the control section of the second device is synchronized to the clock signal on the side of the first device and the synchronized READY signal is supplied to the control section of the first device;

a second delay step in which an ACKNOWLEDGE signal is generated by delaying a signal corresponding to the synchronized READY signal of the third synchronization step; and a fourth synchronization step in which the ACKNOWLEDGE signal generated in the second delay step is synchronized to the clock signal on the side of the second device and the synchronized ACKNOWLEDGE signal is supplied to the control section of the second device.

35. A symmetric asynchronous interface method as claimed in claim 34, wherein the method is applied to the first device and the second device which are provided with datapaths.

36. A symmetric asynchronous interface method as claimed in claim 34, wherein the method is applied to the first device and the second device whose control sections do not have idle states.

37. A symmetric asynchronous interface method as claimed in claim 34, wherein delay time of each of the delay steps is at least 1 clock cycle.

38. A symmetric asynchronous interface method as claimed in claim 34, wherein:

delay time of the first delay step is set longer than or equal to an interval in the second device between a state in which the control section of the second device informs the control section of the first device that the second device has finished its procedure and a state in which the control section of the second device waits for completion of procedure of the first device, and delay time of the second delay step is set longer than or equal to an interval in the first device between a state in which the control section of the first device informs the control section of the second device that the first device has finished its procedure and a state in which the control section of the first device waits for completion of procedure of the second device.

39. A symmetric asynchronous interface method as claimed in claim 38, wherein:

the delay time of the first delay step is set equal to the interval in the second device between the two states, and the delay time of the second delay step is set equal to the interval in the first device between the two states.

40. A symmetric asynchronous interface method for interfacing between a first device and a second device which operate asynchronously, comprising the steps of:

a first synchronization step in which a READY signal outputted by a control section of the :first device is synchronized to a clock signal on the side of the second device and the synchronized READY signal is supplied to a control section of the second device;

a second synchronization step in which an ACKNOWLEDGE signal which corresponds to the synchronized READY signal of the first synchronization step is synchronized to a clock signal on the side of the first device and thereby a synchronized ACKNOWLEDGE signal is generated;

a first pulse generation step in which a pulse signal corresponding to the synchronized ACKNOWLEDGE signal of the second synchronization step is generated and the pulse signal is supplied to the control section of the first device as an ACKNOWLEDGE signal;

a third synchronization step in which a READY signal outputted by the control section of the second device is synchronized to the clock signal on the side of the first device and the synchronized READY signal is supplied to the control section of the first device;

a fourth synchronization step in which an ACKNOWLEDGE signal which corresponds to the synchronized READY signal of the third synchronization step is synchronized to the clock signal on the side of the second device and thereby a synchronized ACKNOWLEDGE signal is generated; and a second pulse generation step in which a pulse signal corresponding to the synchronized ACKNOWLEDGE signal of the fourth synchronization step is generated and the pulse signal is supplied to the control section of the second device as an ACKNOWLEDGE signal.

41. A symmetric asynchronous interface method as claimed in claim 40, wherein the method is applied to the first device and the second device which are provided with datapaths.

42. A symmetric asynchronous interface method as claimed in claim 40, wherein the method is applied to the first device and the second device whose control sections do not have idle states.

* * * * *